(12) United States Patent
Rashid et al.

(10) Patent No.: US 9,141,904 B2
(45) Date of Patent: Sep. 22, 2015

(54) RFID DEVICE, HOST, RFID-EMBEDDED APPARATUS, AND METHOD OF CONTROLLING RFID DEVICE

(75) Inventors: Mahbub Rashid, Osaka (JP); Michihiro Matsumoto, Kyoto (JP); Masaru Yamaoka, Osaka (JP); Kazunori Kurimoto, Hyogo (JP); Kazuhiro Kuroyama, Osaka (JP); Eiichi Sadayuki, Osaka (JP); Yasuo Yoshimura, Shiga (JP); Shigeru Morimoto, Osaka (JP); Naofumi Nakatani, Shiga (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 294 days.

(21) Appl. No.: 13/697,815

(22) PCT Filed: Mar. 29, 2012

(86) PCT No.: PCT/JP2012/002174
§ 371 (c)(1),
(2), (4) Date: Nov. 14, 2012

(87) PCT Pub. No.: WO2012/132446
PCT Pub. Date: Oct. 4, 2012

(65) Prior Publication Data
US 2013/0063253 A1    Mar. 14, 2013

(30) Foreign Application Priority Data

Mar. 31, 2011   (JP) .................. 2011-077150
Dec. 28, 2011   (JP) .................. 2011-288459
Dec. 28, 2011   (JP) .................. 2011-289684

(51) Int. Cl.
*G06K 7/00*   (2006.01)
*H04B 7/00*   (2006.01)
(Continued)

(52) U.S. Cl.
CPC .................. *G06K 19/07769* (2013.01)

(58) Field of Classification Search
CPC .................. G06K 7/01; G06K 7/10366
USPC .............. 340/10.1–10.5, 5.61, 5.74; 455/411;
235/451, 375, 376; 705/15, 333
See application file for complete search history.

(56) References Cited

U.S. PATENT DOCUMENTS 4,952,928 A *   8/1990   Carroll et al. .............. 340/10.41
6,776,339 B2 *   8/2004   Piikivi .......................... 235/451
(Continued)

FOREIGN PATENT DOCUMENTS

EP   0 945 828   9/1999
EP   2 194 460   6/2010
(Continued)

OTHER PUBLICATIONS

International Search Report issued Jun. 19, 2012 in International (PCT) Application No. PCT/JP2012/002174.
(Continued)

*Primary Examiner* — Nam V Nguyen
(74) *Attorney, Agent, or Firm* — Wenderoth, Lind & Ponack, L.L.P.

(57) ABSTRACT

A radio frequency identification (RFID) device includes: a contact interface for wired communication with a host; a contactless interface for contactless communication with a reader/writer; a command processing unit that obtains a command from the reader/writer in the contactless communication and process the command, the command instructing a data access; and a memory that holds data. The command processing unit determines a communication mode, and (i) executes the data access instructed in the command between the reader/writer and the memory, when the communication mode is determined as a first communication mode, and (ii) executes the data access instructed in the command between the reader/writer and the host, when the communication mode is determined as a second communication mode.

12 Claims, 39 Drawing Sheets

(51) Int. Cl.
*H04M 1/67* (2006.01)
*G06K 19/077* (2006.01)

(56) References Cited

U.S. PATENT DOCUMENTS

| | | | |
|---|---|---|---|
| 7,865,141 B2* | 1/2011 | Liao et al. | 455/41.2 |
| 8,042,743 B2* | 10/2011 | Musella et al. | 235/492 |
| 8,186,591 B2* | 5/2012 | Jolivet | 235/439 |
| 8,432,258 B2* | 4/2013 | Wilkinson et al. | 340/10.4 |
| 2008/0143487 A1* | 6/2008 | Hulvey | 340/10.34 |
| 2009/0236416 A1 | 9/2009 | Morita | |
| 2010/0060415 A1* | 3/2010 | Goyet | 340/5.74 |
| 2010/0141387 A1 | 6/2010 | Kosaka | |
| 2010/0227588 A1* | 9/2010 | Bradley | 455/411 |

FOREIGN PATENT DOCUMENTS

| | | |
|---|---|---|
| JP | 2002-246947 | 8/2002 |
| JP | 2005-160599 | 6/2005 |
| JP | 2006-074588 | 3/2006 |
| JP | 2008-234211 | 10/2008 |
| JP | 2009-267452 | 11/2009 |
| JP | 2010-134672 | 6/2010 |

OTHER PUBLICATIONS

European Search Report issued Jul. 1, 2014 in corresponding European Patent Application No. 12763178.6.

Extended European Search Report issued May 14, 2014 in corresponding European Patent Application No. 12763178.6.

* cited by examiner

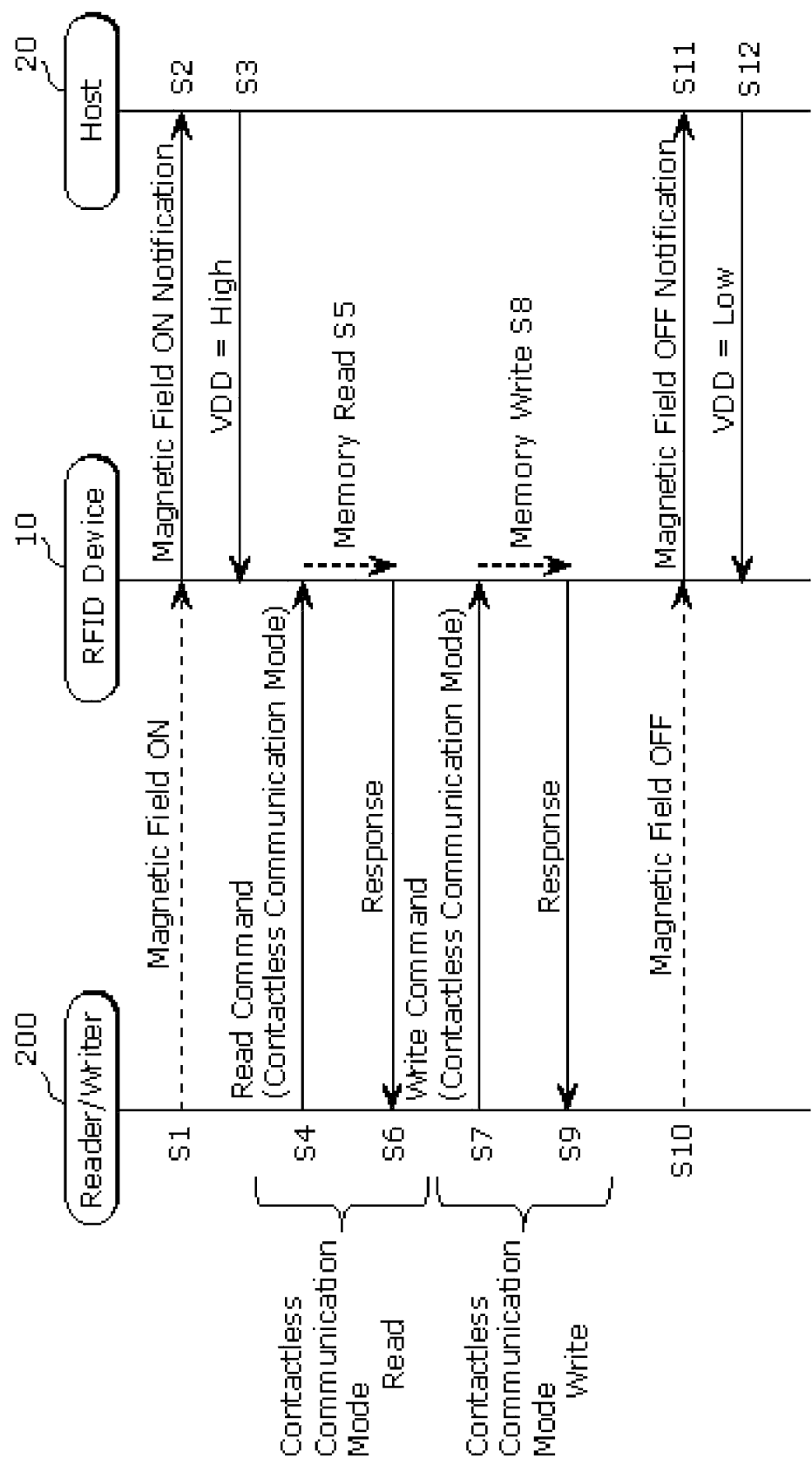

FIG. 5A
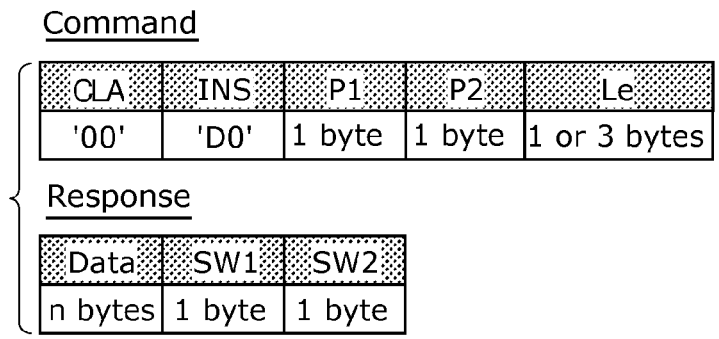
FIG. 5B
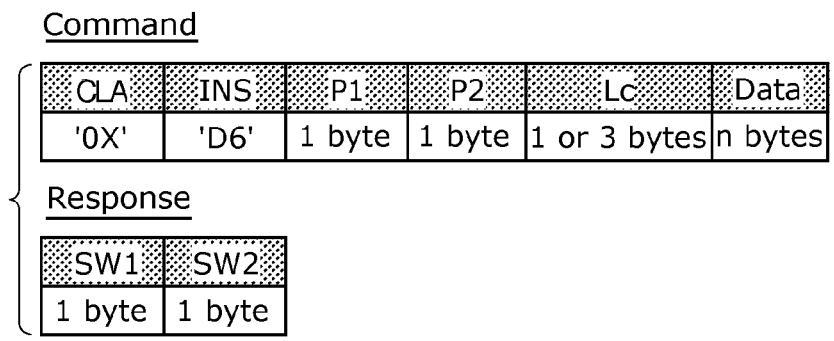
FIG. 5C
| P1 | | | | | | | P2 | Meaning |
|----|----|----|----|----|----|----|----|---------|
| b8 | b7 | b6 | b5 | b4 | b3 | b2 | b1 | | |
| 0 | 0 | X | X | X | X | X | X | 'XX' | Memory Region (P1 b6-b1, P2: Address) |
| 0 | 1 | X | X | X | X | X | X | 'XX' | Tunnel Mode (P1 b6-b1, P2: Address) |

FIG. 6

| Code | Meaning |
|---|---|
| "02" | Magnetic Field ON |
| "03" | Magnetic Field OFF |

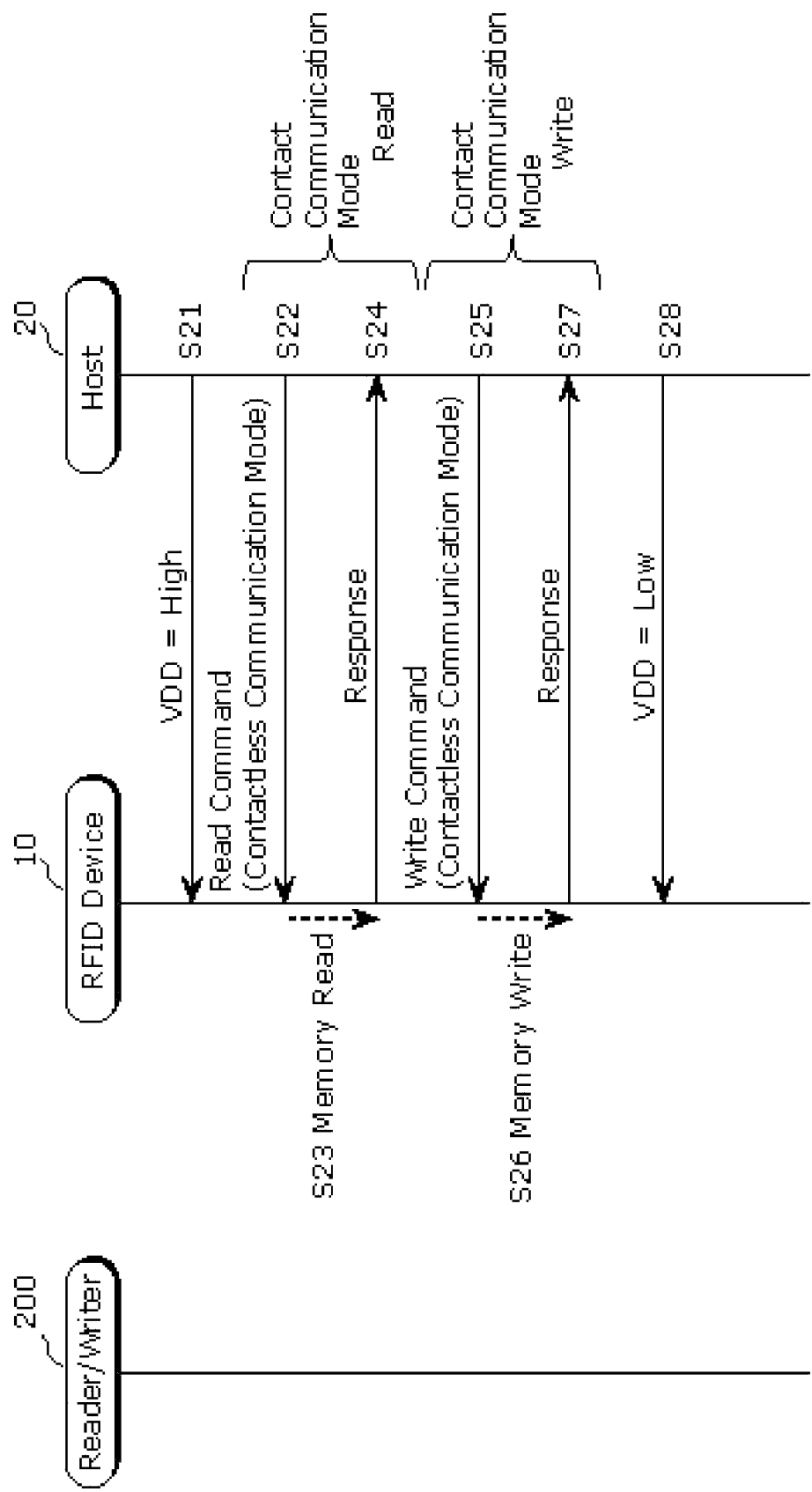

FIG. 8A
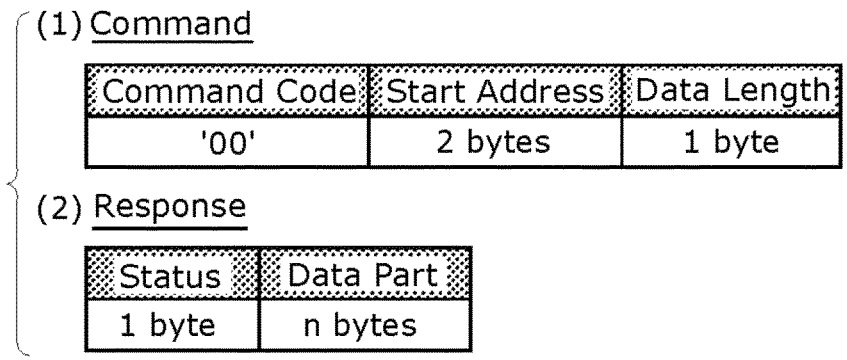
FIG. 8B
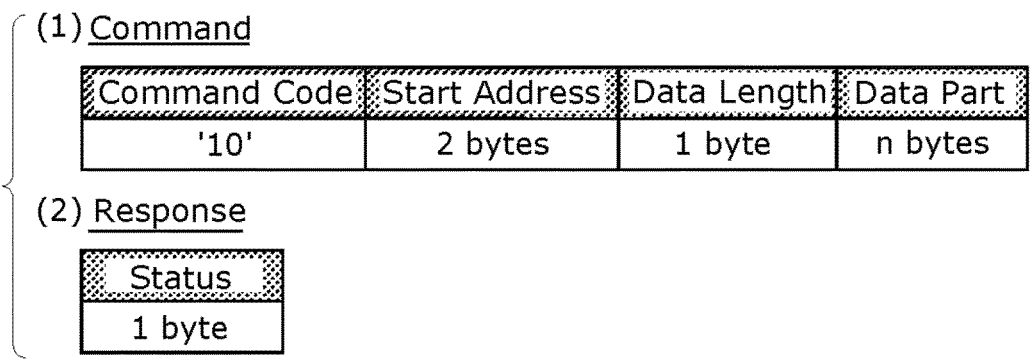
FIG. 8C
| Status | Meaning |
|---|---|
| "F0" | SUCCESS |
| "E0" | FAILURE |
| "D0" | BUSY |

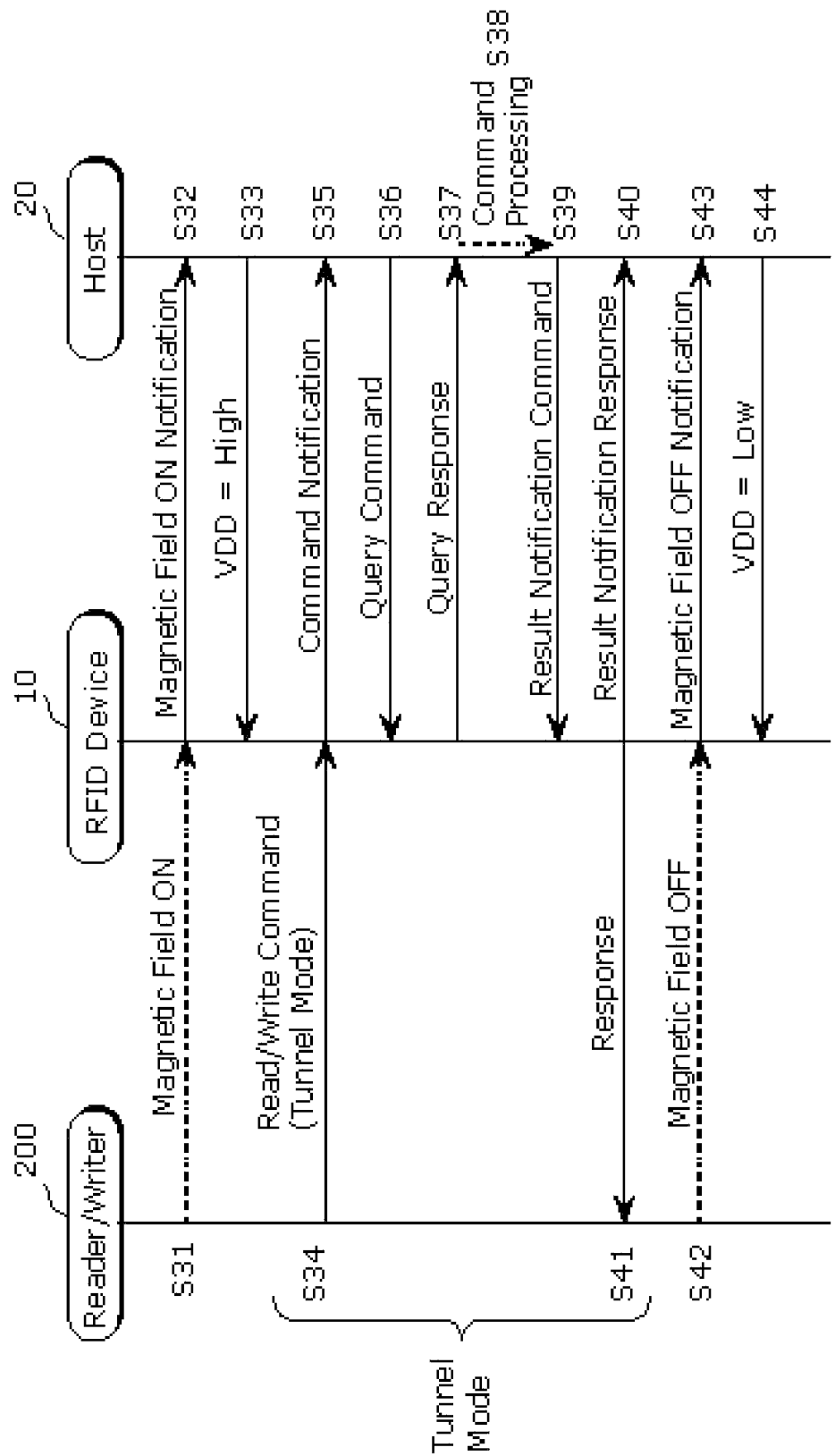

FIG. 14A (1) Command

| Command Code | PICC Identifier | Service File Number n | Service File List | Block Number m | Block List |
|---|---|---|---|---|---|
| '06' | 8 bytes | 1 byte | 2*n bytes | 1 byte | 2(3) × m bytes |

(2) Response

| Response Code | PICC Identifier | Status Flag 1 | Status Flag 2 | Block Number m | Block Data |
|---|---|---|---|---|---|
| '07' | 8 bytes | 1 byte | 2*n bytes | 1 byte | 16 × m bytes |

FIG. 14B

| D0 | D1 | | | | | | | | Meaning |
|---|---|---|---|---|---|---|---|---|---|
| | b8 | b7 | b6 | b5 | b4 | b3 | b2 | b1 | |
| 'XX' | 0 | X | X | X | X | X | X | X | Memory Region (D1 b7-b1: Block Number) |
| 'XX' | 1 | X | X | X | X | X | X | X | Tunnel Mode (D1 b7-b1: Block Number) |

FIG. 20

| Flag Combination | Read Flag | Write Flag |
|---|---|---|
| ① | 0 (OK) | 0 (OK) |
| ② | 0 (OK) | 1 (NG) |
| ③ | 1 (NG) | 1 (NG) |
| ④ | 1 (NG) | 0 (OK) |

OK: Permitted
NG: Prohibited

FIG. 21

| State of Home Appliance | Washing and Drying Machine | Microwave | Rice Cooker | Refrigerator |
|---|---|---|---|---|
| Power OFF | ① Read OK/Write OK | ① Read OK/Write OK | ① Read OK/Write OK | ① Read OK/Write OK |
| Power ON (waiting) | ① Read OK/Write OK | ① Read OK/Write OK | ① Read OK/Write OK | — |
| Power ON (operating) | ② Read OK/Write NG | ③ Read NG/Write NG | ③ Read NG/Write NG | ① Read OK/Write OK |

OK: Permitted
NG: Prohibited

FIG. 24

| Response Pattern | | Assumed Error Cause | Message Example |
|---|---|---|---|
| Normal Response | | — | — |
| No Response | | (i) The home appliance is not powered ON. | "Please power ON and try again." |
| Error Response | | (ii) The home appliance is broken down. | "Error occurs. Please try again after a while." |
| | | (iii) The operation state of the home appliance is changed, and a read or write state is changed to a prohibited state. | |
| | | (iv) Incorrect command is received for uncertain reason. | |

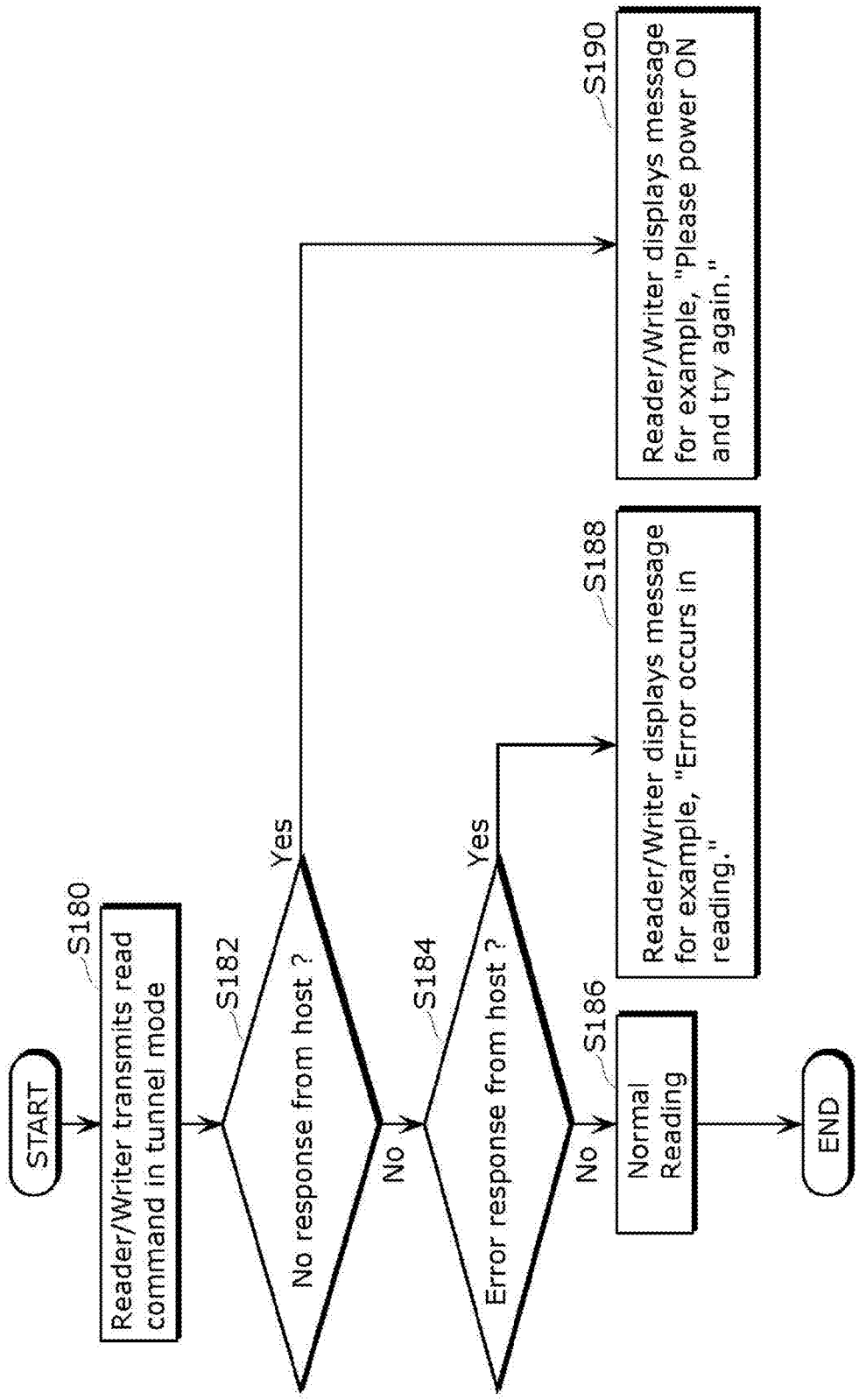

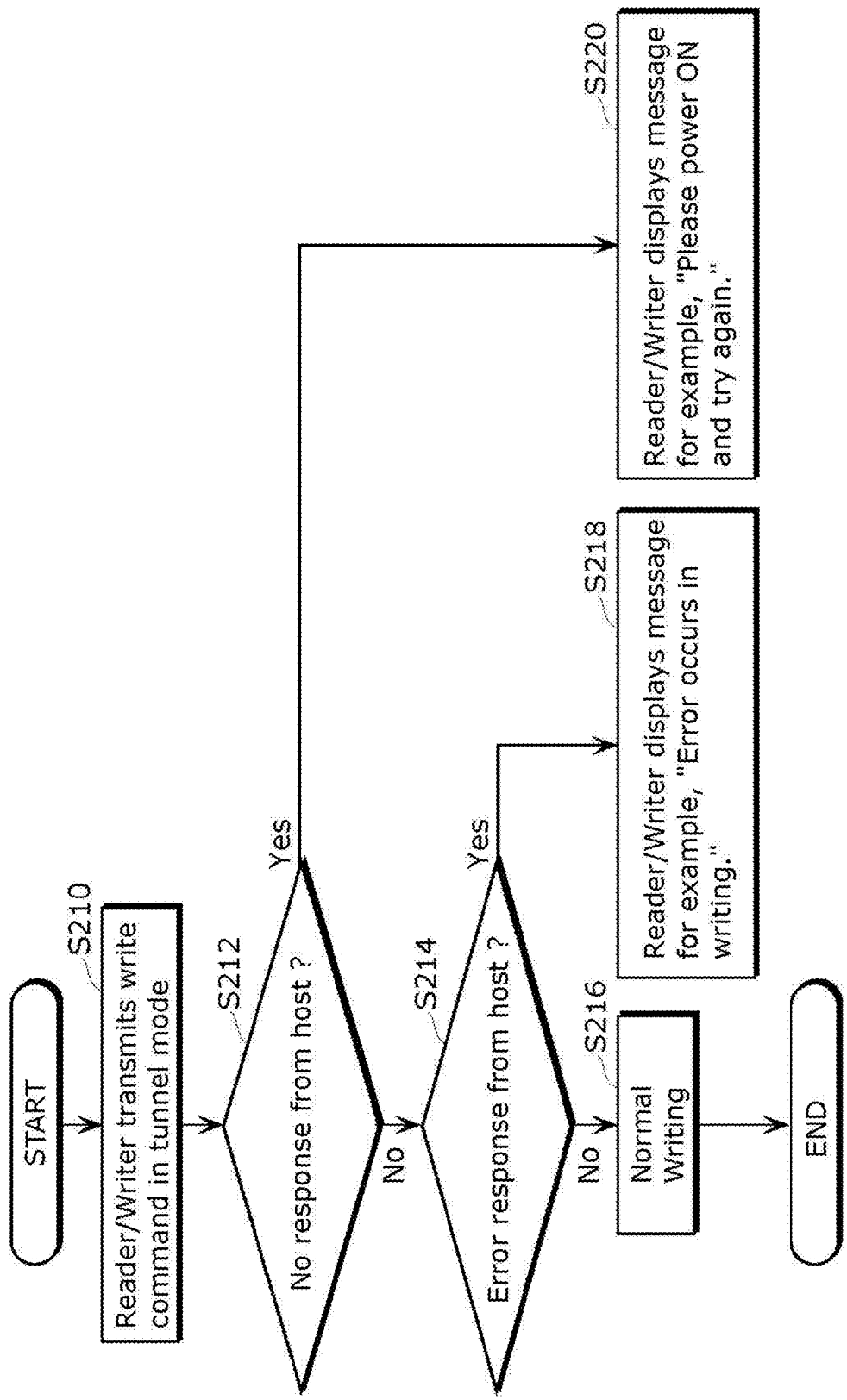

RFID DEVICE, HOST, RFID-EMBEDDED APPARATUS, AND METHOD OF CONTROLLING RFID DEVICE

TECHNICAL FIELD

The present invention relates to radio frequency identification (RFID) devices and the like. More particularly, the present invention relates to a RFID device or the like which includes a contactless interface and a contact interface.

BACKGROUND ART

In the fields of contactless IC cards and RFID, there is an apparatus (hereinafter, referred to also as an "RFID-embedded apparatus") including not only a contactless (wireless) interface but also a contact (wired) interface for connecting a RFID device to a host (hereinafter, referred to also as a "host CPU") (see Patent Literatures 1, 2, and 3).

CITATION LIST

Patent Literatures

[PTL 1] Japanese Unexamined Patent Application Publication No. 2010-134672
[PTL 2] Japanese Unexamined Patent Application Publication No. 2005-160599
[PTL 3] Japanese Unexamined Patent Application Publication No. 2002-246947

SUMMARY OF INVENTION

Technical Problem

However, the above-described conventional RFID-embedded apparatus has a problem of causing a trouble in communicating with an external reader/writer regardless of the state of the apparatus.

In order to address the problem, an object of the present invention is to provide a RFID device capable of appropriately handling data accesses from a reader/writer according to the state of an apparatus embedded with the RFID-device.

Solution to Problem

According to an aspect of the present invention, there is provided a radio frequency identification (RFID) device comprising: a contact interface for wired communication with a host; a contactless interface for contactless communication with a reader/writer; a command processing unit configured to obtain a command from the reader/writer in the contactless communication and process the command, the command instructing a data access; and a memory that holds data, wherein the command processing unit is configured to: determine a communication mode; and (i) execute the data access instructed in the command between the reader/writer and the memory, when the communication mode is determined as a first communication mode, and (ii) execute the data access instructed in the command between the reader/writer and the host, when the communication mode is determined as a second communication mode.

It should be noted that the present invention may be implemented as such a RFID device, host, RFID-em bedded apparatus, or reader/writer. The present invention may be implemented also as a method including steps performed by the characteristic units included in each of the RFID-embedded apparatus, the host, the RFID-embedded apparatus, and the reader/writer in order to control the RFID device, the host, the RFID-embedded apparatus, and the reader/writer. The present invention may be implemented also as a program causing a computer to perform the characteristic steps. Then, the program can be distributed via a recording medium such as a compact disc read only memory (CD-ROM) or via a transmission medium such as the Internet.

Furthermore, according to the present invention, a part or all of functions in each of the RFID device, the host, the RFID-embedded apparatus, and the reader/writer may be implemented into a semiconductor integrated circuit (Large Scale Integration (LSI)). The present invention may be implemented also as an RFID system including the RFID device, the host, the RFID-embedded apparatus, and the reader/writer.

Advantageous Effects of Invention

Thus, according to the present invention, it is possible to provide an RFID device capable of appropriately handling data accesses from a reader/writer according to a state of an RFID-embedded apparatus including the RFID device and a host.

BRIEF DESCRIPTION OF DRAWINGS

FIG. 4 is a sequence diagram of processing performed by the RFID-embedded apparatus and the reader/writer in a contactless communication mode according to Embodiment 1.

FIG. 5A is a table showing a format of a read command (read binary command in ISO/IEC7816-4) used in steps S4 to S6 in FIG. 4

FIG. 5B is table showing a format of a write command (update binary command in ISO/IEC7816-4) used in steps S7 to S9 in FIG. 4.

FIG. 5C is a table showing an example of coding of parameters P1 and P2 which are parameters for the read command in FIG. 5A and the write command in FIG. 5B, respectively.

FIG. 6 is a table showing a specification example of transmission data for a contact interface connecting the RFID device to the host according to Embodiments 1 and 2.

FIG. 7 is a sequence diagram showing processing performed by the RFID-embedded apparatus and the reader/writer in a contact communication mode according to Embodiments 1 and 2.

FIG. 8A is a table showing a specification example of a read command in the contact communication mode which is shown as the steps S22 to S24 in FIG. 7.

FIG. 8B is a table showing a specification example of a write command in the contact communication mode which is shown as the steps S25 to S24 in FIG. 7.

FIG. 8C is a table showing an example of status setting to return the command processing results shown in FIGS. 8A and 8B to the host.

FIG. 9 is a sequence diagram of processing performed by the RFID-embedded apparatus and the reader/writer in a tunnel mode according to Embodiment 1.

FIG. 14A is a table showing a specification of a read command according to Embodiment 1 of the present invention.

FIG. 14B is a table showing a specification of coding according to Embodiment 1 of the present invention.

FIG. 20 is a table showing combinations between read flags and write flags each of which is included in flag information according to Embodiment 2.

FIG. 21 is a table showing examples of flag information that is set by the host based on combinations of an RFID-embedded apparatus type and a home appliance state.

FIG. 24 is a table showing examples of a message displayed by the reader/writer according to a tunnel mode response according to Embodiment 2.

FIG. 25 is a flowchart of processing performed by the reader/writer to read data from the host according to Embodiment 2.

FIG. 26 is a flowchart of processing performed by the reader/writer to write data into the host according to Embodiment 2.

DESCRIPTION OF EMBODIMENTS

Figure 1:
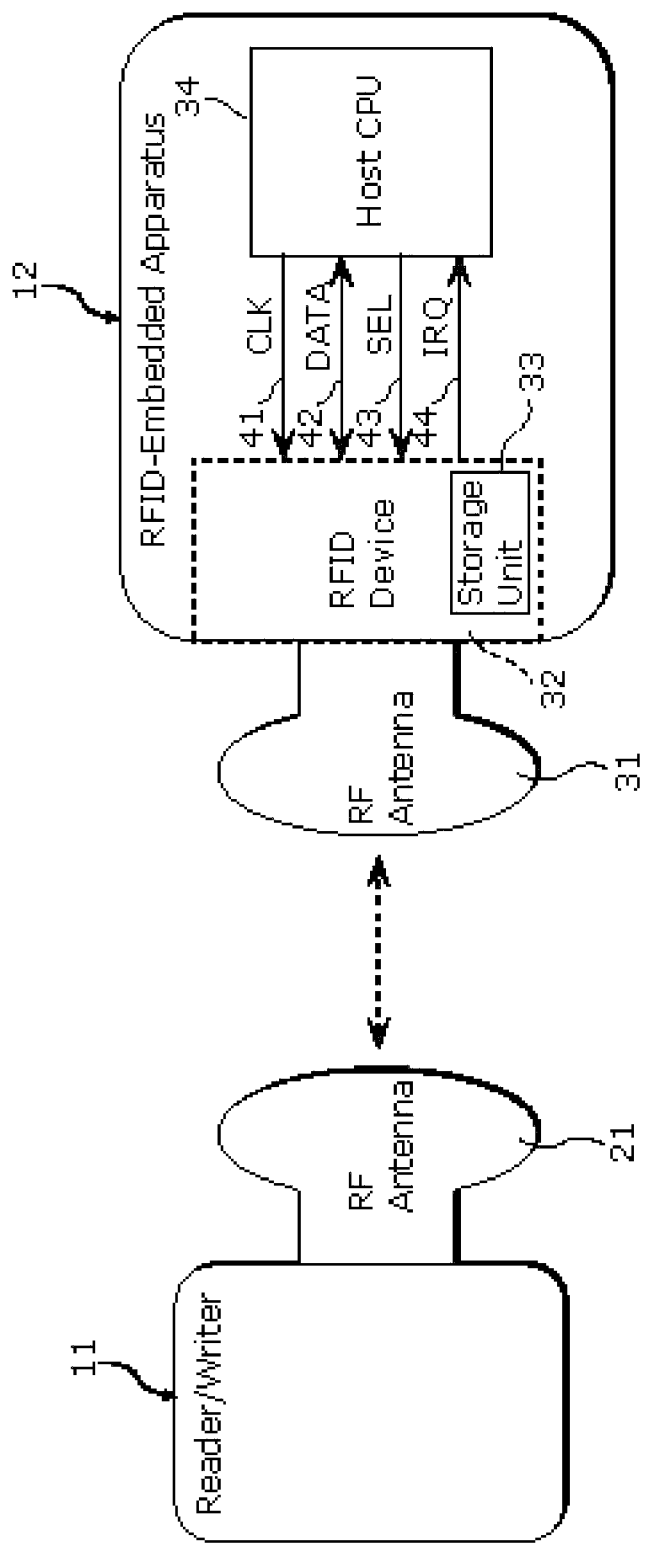
FIG. 1 is a conceptual diagram of a reader/writer and an RFID-embedded apparatus according to a related art of the present invention.

According to an aspect of the present invention, there is provided a radio frequency identification (RFID) device comprising: a contact interface for wired communication with a host; a contactless interface for contactless communication with a reader/writer; a command processing unit configured to obtain a command from the reader/writer in the contactless communication and process the command, the command instructing a data access; and a memory that holds data, wherein the command processing unit is configured to: determine a communication mode; and (i) execute the data access instructed in the command between the reader/writer and the memory, when the communication mode is determined as a first communication mode, and (ii) execute the data access instructed in the command between the reader/writer and the host, when the communication mode is determined as a second communication mode.

In general, the communication between the host and the RFID device has a slower communication speed than that of the communication between the reader/writer and the RFID device. Therefore, the communication between the host and the RFID device requires a longer communication time than that in the case where the same amount of data is transmitted/received in comparison of the communication between the reader/writer and the RFID device. On the other hand, in order to, for example, notify the host of completion of the communication between the reader/writer and the RFID device, it is desirable that the reader/writer and the host can communicate directly to each other. Therefore, the command processing unit selects the communication mode depending on whether the contactless communication is to be performed during online. It is therefore possible to provide an RFID device without delay in the communication processing between the reader/writer and the RFID-embedded apparatus even if the communication speed of the contact interface between the RFID device and the host is slow. In addition, the host provides generated data such as a log to the memory included in the RFID device. Therefore, the reader/writer can read the log provided to the memory in the contactless communication mode, even if the host is turned OFF, the host is at a low power consumption state, or the host is broken down after providing the data. In other words, even if the host is stopped, the reader/writer can read the data from the host. Moreover, when the host is currently operating, reserved for a different operation, turned OFF, or at a low power consumption state, for example, so that the host cannot accept data access from the reader/writer, the RFID device can read, from the memory, information indicating that the communication is prohibited, and then transmit the information to the reader/writer in the first communication mode. Furthermore, it is possible to prohibit access from the reader/writer to the host.

More specifically, the RFID device selects one of different communication modes for a communication request from the reader/writer, depending on a state of the RFID-embedded apparatus, such as a communication speed between the RFID device and the host, and an internal state of the host. As a result, it is possible to solve troubles caused when communicating with an external reader/writer regardless of the state of the RFID-embedded apparatus.

More specifically, it is possible that the command processing unit is configured, when the command processing unit obtains, from the host, the command instructing to read data, to read the data from a region in the memory used in the data access in the first communication mode.

With the above structure, the command processing unit can mediate the data access between the host and the memory.

It is also possible that the command processing unit is configured, when the command processing unit obtains, from the host, the command instructing to write data, to write the data into a predetermined region in the memory.

It is further possible that the command processing unit is configured to determine whether the communication mode is the first communication mode or the second communication mode, based on address information that is included in the command obtained from the reader/writer and that designates an access destination of the data access.

With the above structure, the command processing unit does not need a further command to indicate whether the communication mode is the first communication mode or the second communication mode. As a result, it is possible to designate the first communication mode or the second communication mode by using an existing reader/writer.

It is still further possible that the command processing unit is further configured to record the obtained address information to a predetermined region of the memory. It is still further possible that the address information recorded on the memory holds flag information indicating whether the data access from outside to the host is permitted or prohibited. It is still further possible that the command processing unit is configured to transmit the flag information to the reader/writer prior to the data access to the host.

With the above structure, the command processing unit can notify the reader/writer of the flag information indicating whether or not the host permits data access from the outside, before the reader/writer actually accesses the host in the tunnel mode.

It is still further possible that the flag information is updated by the host based on an operation state of the host.

With the above structure, the host can update the flag information as needed according to a current operation state of the host or the like.

It is still further possible that the command processing unit is configured to prohibit the data access from the reader/writer to the host, when the flag information indicates that the data access from the outside to the host is prohibited.

With the above structure, when the host is at an operation state where the host cannot accept data access from the outside, it is possible to prohibit the reader/writer from accessing the host via the RFID device.

It is still further possible that when the flag information indicates that at least one of a data access for writing data into the host and a data access for reading data from the host is prohibited from among data accesses to the host, the command processing unit is configured to prohibit the data access prohibited in the flag information from among the data accesses from the reader/writer to the host.

With the above structure, the host can designate permission and prohibition independently for reading and writing from among data accesses form the outside. As a result, depending on the operation state of the host, it is possible to perform more detailed control on access to the host.

It is still further possible that the address information includes access destination information indicating whether or not to use encryption in a data access between the reader/writer and the RFID device. It is still further possible that the command processing unit is configured to encrypt data to be transmitted in the contactless communication between the reader/writer and the RFID device and decode received data, when the command processing unit obtains, from the reader/writer, a command including the access destination information indicating that encryption is to be used in the data access.

With the above structure, when the RFID device receives encrypted data from the reader/writer, the RFID device can examine and decode the data and provide the decoded data to the host. Furthermore, when data to be transmitted to the reader/writer is to be encrypted, it is possible to encrypt the data and then transmit the encrypted data to the reader/writer.

According to another aspect of the present invention, there is provided an RFID-embedded apparatus comprising: a host unit; and an RFID unit, wherein the RFID unit includes: a contact interface for wired communication between the RFID unit and the host unit; a contactless interface for contactless communication between the RFID unit and a reader/writer outside the RFID-embedded apparatus; a command processing unit configured to obtain a command from the reader/writer in the contactless communication and process the command, the command instructing a data access; and a memory that holds data, wherein the command processing unit is configured to: determine a communication mode; and (i) execute the data access instructed in the command between the reader/writer and the memory, when the communication mode is determined as a first communication mode, and (ii) execute the data access instructed in the command between the reader/writer and the host unit, when the communication mode is determined as a second communication mode.

It is possible that the command processing unit is configured, when the communication mode is determined as the second communication mode, to notify a result of the determination to the host unit via the contact interface, and the host unit is configured to supply driving power to the RFID unit, when the host unit obtains the notification.

With the above structure, the host in the RFID-embedded apparatus can supply driving power to the RFID device only when necessary. As a result, it is possible to reduce power consumption of the host.

It is also possible that the contactless interface (a) obtains first driving power from the reader/writer by electromagnetic induction, (b) detects existence of an electromagnetical field stronger than a predetermined threshold, and when the existence is detected, notifies a result of the detection to the host unit via the contact interface, and the host unit is configured to supply second driving power different from the first driving power to the RFID unit, when the host unit obtains the notification.

With the above structure, the RFID-embedded apparatus can determine whether or not the reader/writer is at a distance from where the contactless communication is possible.

It is further possible that a host that performs contactless communication with a reader/writer via an RFID device connected by wire to the host, the host comprising: a communication interface for wired communication with the RFID device; an operation state determination unit configured to determine whether an operation mode indicating an internal state of the host that is operating is a normal mode or a low power consumption mode, the low power consumption mode being for reducing power consumption during the operation of the host to be lower than power consumption in the normal mode; and an acceptance possibility information control unit configured to set, into a memory in the RFID device, the information indicating that a data access to the host is prohibited, when the operation state determination unit determines that the operation mode of the host is the low power consumption mode.

With the above structure, if the host is operating in the low power consumption mode such as a so-called sleep state, the RFID device can prohibit data access from the outside.

According to still another aspect of the present invention, there is provided a host that performs contactless communication with a reader/writer via an RFID device connected by wire to the host, the host comprising: a communication interface for wired communication with the RFID device; an operation mode switch unit configured to change an operation mode indicating an internal state of the host that is operating to a normal mode, when the host receives, from the RFID device, a notification signal indicating that the reader/writer writes information into the RFID device while the host is operating at a low power consumption as the operation mode, the low power consumption mode being a mode for reducing power consumption during the operation of the host to be lower than power consumption in the normal mode; and an acceptance possibility information control unit configured to set information into a memory in the RFID device when the host is at a predetermined operation state, the information being associated with the predetermined operation state and indicating whether a data access to the host is prohibited or permitted, wherein the acceptance possibility information control unit is configured, when the operation mode of the host is changed to the normal mode, to perform one of (a) processing of setting, into the memory in the RFID device, information indicating that the data access to the host is permitted and (b) processing of deleting, from the memory in the RFID device, information indicating that the data access to the host is prohibited.

With the above structure, for example, even if the host is operating in the low power consumption mode, when the host is accessed by the outside, the host can immediately change the operation mode to a normal operation mode to perform processing according to the data access.

According to still another aspect of the present invention, there is provided a reader/writer that performs contactless communication with a host via an RFID device, the reader/writer comprising: a control unit configured to generate a command to be transmitted to the RFID device; a communication unit configured to transmit the command to the RFID device in the contactless communication, and receive a response to the transmitted command from the RFID device in the contactless communication; and a display unit configured to display, on a display device, information corresponding to the received response, wherein the control unit is configured to generate a command including address information for designating one of communication modes that are (a) a first communication mode for performing a data access to the memory that is a storage region in the RFID device and (b) a second communication mode for performing a data access to the host.

With the above structure, the reader/writer can start communication between the reader/writer and the RFID device and complete it, regardless of the communication state between the RFID device and the host.

It is possible that the control unit is configured to generate the address information including access destination information indicating whether or not to use encryption in a data access between the reader/writer and the RFID device.

With the above structure, by the address information included in the command, the reader/writer can notify the RFID device of that the communication is to employ encryption.

It is further possible that the control unit is further configured to (i) obtain flag information from the memory in the RFID device before the command including the address information is transmitted to the RFID device, the flag information indicating whether a data access from outside to the host is permitted or prohibited, and the address information designating the data access to the host. It is further possible that the control unit is further configured to (ii) cause the communication unit to transmit the command to the RFID device only when the data access designated in the command to be transmitted to the RFID device is permitted.

With the above structure, the reader/writer can detect whether or not data access to the host is permitted, before starting the data access in the tunnel mode. As a result, it is possible to transmit a command to the host, only when the data access is permitted.

According to still another aspect of the present invention, there is provided a method of controlling an RFID device, the RFID device including: a contact interface for wired communication with a host; a contactless interface for contactless communication with a reader/writer; and a memory that holds data, and the method comprising: obtaining a command from the reader/writer via the contactless interface; determining a communication mode; and (i) executing an data access instructed in the command between the reader/writer and the memory, when the communication mode is determined as a first communication mode, and (ii) executing a data access instructed in the command between the reader/writer and the host, when the communication mode is determined as a second communication mode.

The following describes embodiments according to the present disclosure in detail with reference to the drawings. It should be noted that all the embodiments described below are specific examples of the present disclosure. Numerical values, shapes, materials, constituent elements, arrangement positions and the connection configuration of the constituent elements, steps, the order of the steps, and the like described in the following embodiments are merely examples. They are therefore not intended to limit the present disclosure. The present disclosure is characterized by the appended claims. Therefore, among the constituent elements in the following embodiments, constituent elements that are not described in independent claims that show the most generic concept of the present disclosure are described as elements constituting more desirable configurations, although such constituent elements are not necessarily required to achieve the object of the present disclosure.

Firstly, the related arts of the present invention are described in more detail.

FIG. 1 is a conceptual diagram of a reader/writer 11 and an RFID-embedded apparatus 12 which are disclosed in Patent Literature 1 that is a related art of the present invention. The RFID-embedded apparatus 12 includes an RFID device 32 and a host CPU 34. An RF antenna 31 is connected to the RFID device 32 so as to perform contactless communication with the reader/writer 11. In addition, a CLK line 41, a DATA line 42, a SEL line 43, and an IRQ line 44 are connected to the RFID device 32 so as to communicate with the host CPU 34. The RFID device 32 further includes a storage unit 33.

When receiving data from the reader/writer 11, the RFID device 32 transmits an interrupt signal to the host CPU 34 via the IRQ line 44. In receiving the interrupt signal, the host CPU 34 issues a clock signal via the CLK line 41. According to the clock signal, the RFID device 32 transmits data having a data length via the DATA line 42. The host CPU 34 receives the data by a designated data length and then ends processing related to the data receiving.

When the host CPU 34 transmits data to the reader/writer 11, a direction of transmitting data is set by the SEL line 43, so that a direction of transmitting data via the DATA line 42 becomes a direction from the host CPU 34 to the RFID device 32. Furthermore, the host CPU 34 transmits data to the RFID device 32 on the clock signal. The RFID device 32 transmits the received data to the reader/writer 11 via the RF antenna 31.

Here, in general contactless IC card standards, a command and a response are paired. More specifically, the RFID-embedded apparatus 12 processes the above-described data receiving from the reader/writer 11 and the above-described data transmission to the reader/writer 11 as a pair. The communication processing including the data receiving and the data transmission is performed while the RF antenna 21 of the reader/writer 11 is close (presented) to the RF antenna 31 of the RFID-embedded apparatus 12.

However, the RFID-embedded apparatus disclosed in the above-described related art has the following problems.

As described earlier, until the data receiving and data transmission processing performed between the RFID device 32 and the reader/writer 11 has been completed, the RF antenna 21 and the RF antenna 31 need to be close to each other within a distance enabling contactless communication. In other words, a user needs to present the reader/writer 11 over the RFID device 32.

Therefore, if a communication speed of a contact interface between the RFID device 32 and the host CPU 34 is slow, it takes a long time from when the RFID-embedded apparatus 12 receives a command from the reader/writer 11 to when the RFID-embedded apparatus 12 returns a response. Therefore, the user needs to keep presenting the reader/writer 11 over the RFID-embedded apparatus 12 for a long time. As a result, work efficiency and usability are reduced. In particular, when a data size is large, the problem is significant.

However, depending on use conditions (low power consumption, high noise environments) of the RFID-embedded apparatus 12, it is sometimes almost impossible to increase the communication speed of the contact interface. In this case, a processing time from a command to a response is inevitably long.

Moreover, if the host CPU 34 is stopped by powering OFF or broken, the host CPU 34 is stopped even if the reader/writer 11 transmits a command. Therefore, the RFID-embedded apparatus cannot respond and the wireless communication between the reader/writer and the RFID-embedded apparatus is stopped. One of RFID use applications is detection of error or trouble in the RFID-embedded apparatus 12. In this use application, it is necessary to read a use log or an error log generated by the host CPU 34 by using a RFID function of the external reader/writer 11. However, if the host CPU 34 is stopped, the above-described RFID-embedded apparatus 12 cannot perform command receiving from the reader/writer 11 to the host CPU 34 and response transmission from the host CPU 34 to the reader/writer 11. Therefore, it is almost impossible to use RFID for communication with the RFID-embedded apparatus 12 having the stopped host CPU.

In other words, for the RFID-embedded apparatus including the RFID device and the host, if the communication speed of the contact interface between the RFID device and the host is slow, there is a problem of a long time required for communication from the reader/writer and the RFID-embedded apparatus. There is another problem that the reader/writer cannot read data from the host if the host is stopped or if the host operates in a low power consumption mode. In addition, there is a problem of causing data access from the RFID device to the host if the reader/writer gets close to the RFID device even in the case where the host prohibits data access from the outsides.

Patent Literature 2 that is another related art of the present invention discloses that a rice cooker is controlled by connecting an electronic tag to the rice cooker to cause an electronic tag reader/writer to write a control signal for controlling the rice cooker to the electronic tag. In this case, even if the control signal is written into the electronic tag, the rice cooker sometimes fails to accept the control signal depending on the state of the rice cooker. For example, the rice cooker cannot accept another cooking menu or timer reservation during cooking rice.

For instance, even if the rice cooker cannot accept the control signal depending on the state of the rice cooker in some situations, the electronic tag reader/writer succeeds to write the control signal for the rice cooker to the electronic tag. In this case, there is a risk that a user misunderstands that the control is successful at the time of completing the writing of the control signal to the electronic tag. In other words, for the RFID-embedded apparatus disclosed in this related art, there is a problem of causing a trouble when communicating with an external reader/writer regardless of the state of the RFID-embedded apparatus. Patent Literature 3 discloses two kinds of exclusive control in communication. However, it fails to solve the above-described problems.

In order to address the conventional problems, the present invention provides an RFID device or the like capable of appropriately handling a request for data access from a reader/writer according to a state of an apparatus embedded with the RFID device.

Embodiment 1

The following describes Embodiment 1 of the present invention.

It is assumed in the present embodiment that the communication standard for a contactless interface is ISO/IEC14443 (Type A or Type B), and that a command for contactless communication conforms with ISO/IEC7816-4. It is also assumed that a universal asynchronous receiver transmitter (UART) is used as a communication method for a contact interface. It should be noted that the communication standard for contactless interface, the command, and the contact interface are not limited to the above and any desired method can be used as described later.

Figure 2:
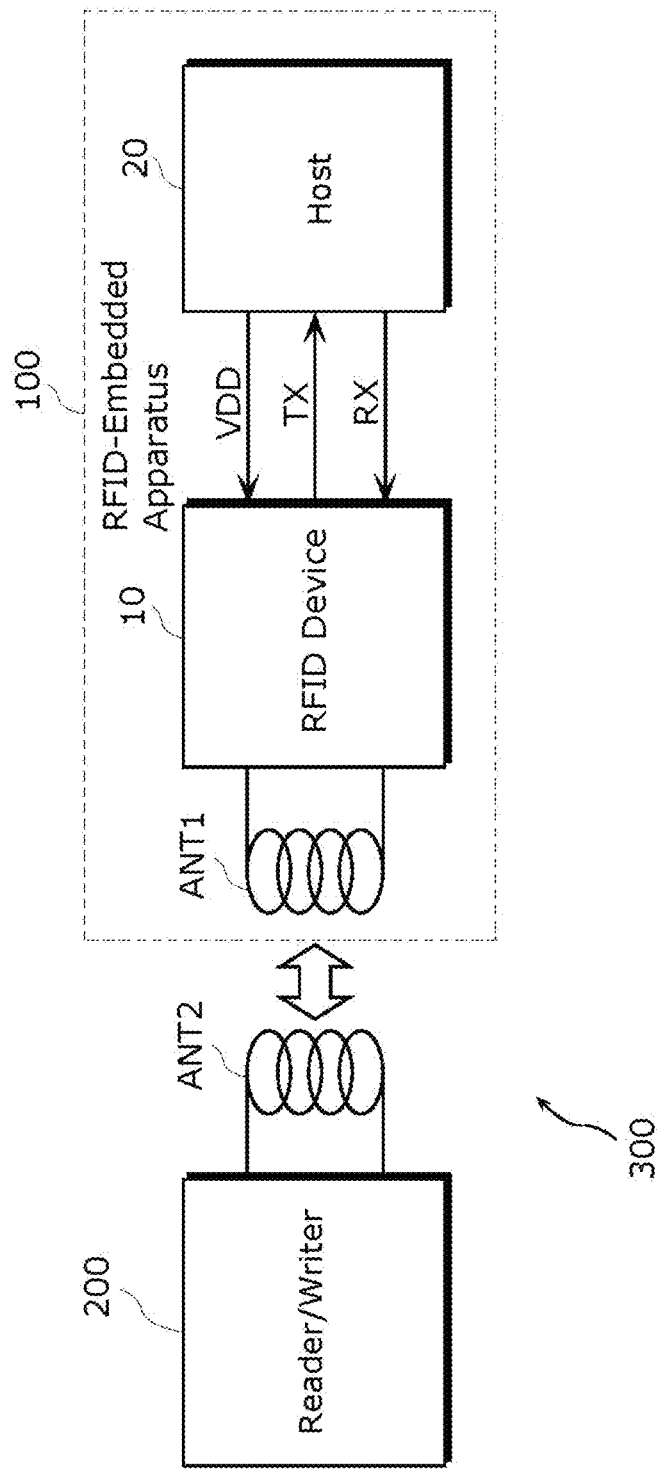
FIG. 2 is a block diagram showing an RFID system having a reader/writer and an RFID-embedded apparatus that includes an RFID device according to Embodiment 1.

FIG. 2 is a block diagram showing a configuration of an RFID system 300 including a reader/writer 200 and an RFID-embedded apparatus 100 that includes an RFID device 10 according to the present embodiment.

The RFID-embedded apparatus 100 includes the RFID device 10, a host 20, and an antenna ANT1. The antenna ANT1 is connected to the RFID device 10. The host 20 supplies a power-supply voltage VDD to the RFID device 10. The RFID device 10 transmits data to the host 20 by a transmission signal TX. The host 20 transmits data to the RFID device 10 by a receiving signal RX. The communication method using these transmission signal TX and receiving signal RX is assumed to conform to the UART communication method, and it is therefore not described in detail.

The RFID-embedded apparatus 100 performs contactless communication with the reader/writer 200 outsides the RFID-embedded apparatus 100. The contactless communication is performed by electromagnetic induction between the antenna ANT1 and an antenna ANT2 connected to the reader/writer 200. Here, the reader/writer 200 performs not only the data exchange but also power supply required to operate the RFID device 10. Therefore, in communication with the reader/writer 200, the host 20 does not always need to supply the power-supply voltage VDD to the RFID device 10.

Figure 3:
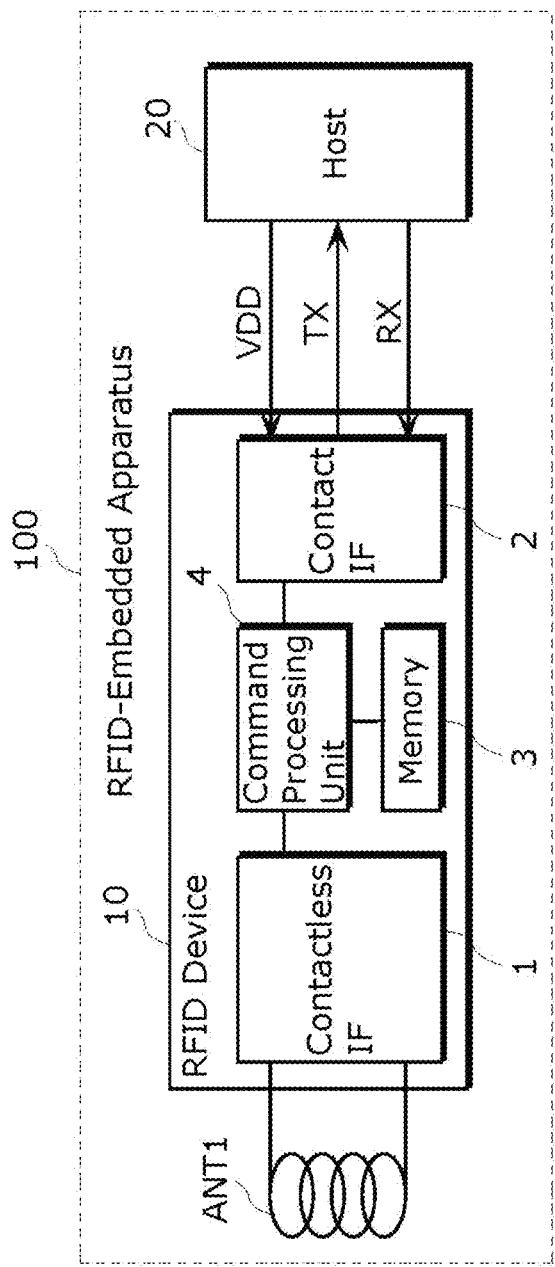
FIG. 3 is a block diagram showing a detailed structure of the RFID-embedded apparatus according to Embodiment 1.

FIG. 3 is a block diagram showing a detailed structure of the RFID-embedded apparatus 100 according to the present embodiment.

The RFID device 10 meditates the contactless communication between the host 20 and the external reader/writer.

The RFID device 10 includes a contactless interface (IF) (hereinafter, referred to also as a "contactless interface") 1, a contact IF (hereinafter, referred to also as a "contact interface") 2, a memory 3, and a command processing unit 4.

The contactless IF 1 is a communication interface for contactless communication with a reader/writer. The contactless IF 1 is connected to the antenna ANT1 in order to communicate with the external reader/writer 200. The contactless IF 1 includes (1) analog circuits such as a rectification circuit, a demodulation circuit, a modulation circuit, and a clock reproduction circuit, (2) digital circuits such as a circuit for coding received/transmitting data, a circuit for detecting/generating frames, and a circuit for Cyclic Redundancy Check (CRC), (3) a receiving/transmitting buffer for temporarily holding the received/transmitting data, and the like (not shown).

The contactless interface 1 detects existence of an electromagnetical field stronger than a predetermined threshold, and notifies the detection result to the host 20 via the contact interface 2.

The contactless IF 1 obtains driving power from the reader/writer 200 by electromagnetic induction. The host 20, which receives the notification of electromagnetical field detection, supplies other driving current to the RFID device 10.

The contact IF2 is a communication interface for wired communication with the host 20. The contact IF 2 is connected to a line used in communication for transmitting or receiving power-supply voltage to VDD, transmission signal TX, and receiving signal RX, and thereby communicates with the host 20. The contact IF 2 has an Input Output (IO) circuit, an UART communication protocol processing circuit, and a receiving/transmitting buffer, and the like (not shown).

The memory 3 is a memory that temporarily holds (records) user data and the like during communication between the host 20 and the reader/writer 200. In general, the memory 3 is implemented as a nonvolatile memory where data is not deleted even if power is OFF. However, a volatile memory is also possible for reasons of a cost for each unit capacity, a processing speed of memory access, and the like. The memory 3 may be used for holding data that is to be always stored in the RFID device 10.

The above-described contactless IF 1 has a receiving/transmitting buffer that temporarily holds data received from the reader/writer 200 or data to be transmitted. The memory 3 differs from the receiving/transmitting buffer in being used as a so-called proxy of the host 20 for the reader/writer 200. It should be noted that the memory 3 is used not only as the proxy of the host 20, in other words, a substitution of the host. For example, the host 20 may use the memory 3 in the RFID device 10 as a nonvolatile memory. In this case, as described above, the memory 3 holds data that is to be always stored in the RFID device 10.

The receiving/transmitting buffer for the contactless IF 1 is a memory that temporarily holds communication data exchanged with the reader/writer 200. Therefore, basically, the receiving/transmitting buffer has a capacity corresponding to a maximum data length of a single command (256 bytes in the case of ISO/IEC7816-4) defined by the contactless communication standard. Furthermore, the data in the case of receiving a command from the reader/writer 200 and the data in the case of transmitting later a response to the reader/writer 200 are recorded on the same receiving/transmitting buffer.

The memory 3 is a memory for holding (recording) data. As described later, the memory 3 is accessed by a read command or a write command issued from the reader/writer 200 or the host 20. The memory 3 has a memory capacity having a size required depending on use.

From the reader/writer 200, the command processing unit 4 obtains a command for instructing data access between the host 20 and the reader/writer 200 in contactless communication, and processes the obtained command. The command processing unit 4 is connected to the contactless IF 1, the contact IF 2, and the memory 3. The command processing unit 4 has three operation modes: a contactless communication mode, a contact communication mode, and a tunnel mode.

More specifically, the command processing unit 4 determines a communication mode based on address information that is included in the command received from the reader/writer 200 to designate an access destination in the data access. If it is determined that the contactless communication mode (hereinafter, referred to also as a "first communication mode") is designated as the communication mode, then the data access designated by the command is performed between the reader/writer 200 and the memory 3. In addition, a response signal, which is a response to the data access to the memory 3, is transmitted to the reader/writer 200. If it is determined that the tunnel mode (hereinafter, referred to also as a "second communication mode") is designated as the communication mode, then the data access designated by the command is performed between the reader/writer 200 and the host 20. In addition, a response, which is a response signal in response to the data access to the host 20, is transmitted to the reader/writer 200.

Furthermore, if the contact communication mode is determined as the communication mode (in other words, a command is obtained from the host 20 via the contact interface), (1) in the case of receiving a command for instructing data reading, data is read from a region in the memory 3 accessed in the contactless communication mode, and (2) in the case of receiving a command for instructing data writing, data is written into a predetermined region in the memory 3.

It should be noted that the command processing unit 4 may determine which of the contactless communication mode and the tunnel mode is designated in the command obtained via the contactless interface, based on bit information included in address information for identifying an access destination of the data access designated by the command.

When the command for which the tunnel mode is designated to notify completion of the data access is obtained from the reader/writer 200, the host 20 accesses the memory 3 included in the RFID device 10.

When data access is to be performed with the host 20, the reader/writer 200 designates the contactless communication mode and transmits a command for instructing the data access to the RFID device 10. When the data access is completed, the reader/writer 200 designates the tunnel mode and transmits, to the RFID device 10, a command for notifying the host 20 of the data access completion.

The following describes the respective operation modes in more detail.

<<Contactless Communication Mode>>

In the contactless communication mode, the reader/writer 200 transmits a command via the antenna ANT2, then the contactless IF 1 receives the command via the antenna ANT1, and the command processing unit 4 interprets the command. Here, the command processing unit 4 reads data from or writes data into the memory 3 as needed, and then transmits the processing result as a response to the reader/writer 200 via the contactless IF 1 and the antenna ANT1.

In this contactless communication mode, the command processing unit 4 is capable of operating by only power received from the reader/writer 200 via the antenna ANT1, even if the power-supply voltage VDD is not supplied with power. However, even in the case of the contactless communication mode, power supply to the power-supply voltage VDD enables the power-supply voltage VDD to steadily supply necessary power to the RFID device 10. Therefore, power supply to the power-supply voltage VDD can increase a communication distance between the reader/writer 200 and the RFID-embedded apparatus 100.

The following describes the contactless communication mode with reference to FIGS. 4 to 6.

FIG. 4 is a sequence diagram of processing performed by the RFID-embedded apparatus 100 and the reader/writer 200 in the contactless communication mode according to the present embodiment.

FIG. 6 is a table showing a specification of a part of data to be transmitted from the contact interface that connects the RFID device 10 to the host 20 according to the present embodiment.

At step S1 of FIG. 4, when the reader/writer 200 gets close to the RFID device 10, the RFID device 10 detects magnetic field ON which means that an intensity of a magnetic filed is greater than or equal to a predetermined threshold. The magnetic filed ON detection is performed when the contactless IF 1 detects existence of a carrier signal transmitted from the reader/writer 200, a level increase of an applied voltage caused by power supply, or the like. More specifically, if the RFID device 10 detects a carrier signal transmitted from the reader/writer 200, or if an applied voltage level is greater than or equal to the predetermined value, the magnetic filed ON is detected.

Next, at step S2, the RFID device 10 notifies the host 20 of the magnetic filed ON detection. This notification is performed by transmitting, as the transmission signal TX, a code "02" indicating the magnetic filed ON as shown in FIG. 6. In receiving this "02", the host 20 determines that the reader/writer 200 is close enough. At step S3, the host 20 applies a high voltage to the power-supply voltage VDD to supply power to the RFID device 10.

As described previously, the host 20 supplies power to the power-supply voltage VDD in order to increase the communication distance between the reader/writer 200 and the RFID-embedded apparatus 100. If the RFID device 10 receives power from the reader/writer 200, the step S3 is not necessary. Although the RFID device 10 performs the magnetic filed ON notification at step S2, the RFID device 10 does not wait for a response (power supply to the power-supply voltage VDD, command transmission, or the like) from the host 20 after the magnetic filed ON notification (in other words, the RFID device 10 proceeds to the next step S4 not waiting for a response from the host 20). That is, in the contactless communication mode, the host 20 may be stopped for some reason such as powering OFF or breakdown.

The sequence of steps S4 to S6 is for processing a read command in the contactless communication mode. The sequence of steps S7 to S9 is for processing a write command in the contactless communication mode. The following describes the command processing sequences with reference also to FIGS. 5A and 5B showing specifications of the RFID contactless communication commands according to the present embodiment.

FIG. 5A shows a format of the read command (read binary command in ISO/IEC7816-4) used in the sequence of steps S4 to S6. FIG. 5B shows a format of the write command (update binary command in ISO/IEC7816-4) used in the sequence of steps S7 to S9. FIG. 5C shows coding of parameters P1 and P2 which are parameters for each of the read command shown in FIG. 5A and the write command shown in FIG. 5B.

Firstly, the read command in the contactless communication mode is described. At step S4, the reader/writer 200 transmits a read command designating the contactless communication mode to the RFID device 10. The format of the read command for which the contactless communication mode is designated is shown in FIG. 5A. In the command format, a byte CLA indicates a secure messaging function or a logical channel number by a class byte. The byte CLA is not used in the present embodiment and is therefore set to "00". A byte INS is an order byte and set to "D0" in the read command.

Bytes P1 and P2 are parameter bytes. An Example of the coded bytes are shown in FIG. 5C. A bit b8 in the byte P1 is for file designation, indicating whether a file is a current file or to be directly designated (direct designation). Although the file designation may be set to direct designation, it is assumed in the present embodiment that the file designation is set to "0" indicating a current file. While the bit b8 is set to a current file as the file designation, remaining 15 bits including (a) bits from b7 to b1 in the byte p1 and (b) the byte P2 are set to an address offset (start address).

In the present embodiment, the highest bit of the 15 bits, namely, the bit b7 in the byte P1 is used to indicate whether the communication mode is the contactless communication mode or the later-described tunnel mode. More specifically, when the bit b7 in the byte P1 is "0", the communication mode is the contactless communication mode, and the remaining 14 bits including the bits b6 to b1 in the byte P1 and the byte P2 are used to designate a start address for accessing (reading from or writing into) the memory 3. When the bit b7 in the byte P1 is "1", the communication mode is the tunnel mode, and the remaining 14 bits are used to indicate an address offset.

A byte Le is a parameter set to a data length of data to be read according to the read command. The byte Le is set to the number of bytes. The data length indicated by the byte Le is 1 or 3 bytes, either of which may be used.

When receiving the command from the reader/writer 200, the command processing unit 4 in the RFID device 10 interprets the command. Here, since the byte INS is "D0" and the bit b7 in the byte P1 is "0", the command processing unit 4 interprets that the read command for which the contactless communication mode is designated, and at step S5, reads data from the memory 3. The address of the memory 3 from which reading starts is indicated by the 14 bits including the bits b6 to b1 in the byte P1 and the byte P2. A data length of data to be read is indicated by the byte Le.

Next, at step S6, the command processing unit 4 sets the data read from the memory 3 by Data in the response format shown in FIG. 5A. Then, the command processing unit 4 transmits the Data together with bytes SW1 and SW2, which are status words indicating the processing result, back to the reader/writer 200 via the contactless IF 1 and the antenna ANT1. Here, the bytes SW1 and SW2 which are status words are parameters indicating whether the processing is successful of fails and indicating a code of the error in the case of failure. For example, when the processing is successful, the byte SW1 and the byte SW2 are set to "9000".

Next, the write command in the contactless communication mode is described. At step S7, the reader/writer 200 transmits a write command of the contactless communication mode. The format of the write command of the contactless communication mode is shown in FIG. 5B. A byte CLA is set to "00", like the read command. An order byte INS is set to "D6" indicating a write command. Bytes P1 and P2 use coding shown in FIG. 5C, like the read command. A bit b7 in the byte P1 is set to "0" indicating the contactless communication mode. Bits b6 to b1 in the byte P1 and the byte P2 are set to a start address of data to be written into the memory 3. A byte Lc is a setting parameter of a data length of the data to be written. The byte Lc designates the data length by the number of bytes.

When the RFID device 10 receives the write command from the reader/writer 200, the command processing unit 4 interprets the command. Here, the command is provided from the contactless IF 1, and the byte INS is "D6" and the bit 7 in the byte P1 is "0". Therefore, the command processing unit 4 interprets that the command is a write command for which the contactless communication is designated, and then at step S8, writes data into the memory 3. For the data to be written to the memory 3, a start address is indicated by 14 bits including bits b6 to b1 in the byte P1 and the byte P2, and a data length is set in the byte Lc.

Next, at step S9, when the writing is completed, the command processing unit 4 transmits a response, in which the status words bytes SW1 and SW2 are set, to the reader/writer 200 via the contactless IF 1 and the antenna ANT1 as the processing result. For example, when the writing is successful, a response in which each of the bytes SW1 and SW2 is set to 9000 is transmitted.

When the predetermined processing is completed and the reader/writer 200 is taken away from the RFID device 10, then at step S10, the magnetic filed becomes OFF (in other words, the intensity of the magnetic filed is less than the predetermined threshold). When the magnetic filed OFF is detected, then at step S11, the RFID device 10 transmits the code "03" indicating magnetic filed OFF shown in FIG. 6 to the host 20 via the transmission signal TX.

In receiving the transmission signal TX designating "03", the host 20 determines that the reader/writer 200 is away from the RFID device 10, then at step S12, applies a low voltage as the power-supply voltage VDD to stop supplying power to the RFID device 10.

The detection of magnetic filed OFF is performed based on existence of a carrier transmitted from the reader/writer 200, a level of an applied voltage, or the like, in the same manner as the detection of magnetic filed ON. More specifically, when the carrier signal transmitted from the reader/writer 200 has not been detected for a predetermined time period, or when an applied voltage level is less than the predetermined threshold, the RFID device 10 detects that the magnetic filed is OFF.

By performing processing of steps S10 to S12, the power supply from the host 20 to the RFID device 10 is performed only when needed. Therefore, the RFID-embedded apparatus 100 itself can operate by lower power consumption. It should be noted that, even if the magnetic Field OFF notification is received at Step S11, the host 20 may not stop power supply to the power-supply voltage VDD at step S12. It should be also noted that the RFID device 10 may not perform the magnetic filed ON detection notification at step S2 and the magnetic filed OFF detection notification at step S11.

<<Contact Communication Mode>>

Next, the contact communication mode is described.

In the contact communication mode, (i) a command transmitted from the host 20 via the receiving signal RX is received by the contact IF 2, then (ii) the command processing unit 4 interprets the command, then (iii) data is read from the memory 3 or written into the memory 3 according to the interpreted command, and then (iv) the processing result is notified as a response to the host 20 via the contact IF 2 and the transmission signal TX. Here, the RFID device 10 operating in this mode needs to supply power to the power-supply voltage VDD.

The following describes the contact communication mode with reference to FIGS. 8A to 8C.

FIG. 7 is a sequence diagram showing processing performed by the RFID-embedded apparatus 10 and the host 20 in a contact communication mode according to the present embodiment. FIGS. 8A to 8C show specifications of commands in the contact communication mode which are used by the RFID device 10 and the host 20 according to the present embodiment.

Firstly, at step S21 in FIG. 7, the host 20 applies a high voltage as the power-supply voltage VDD to supply power to the RFID device 10. The power-supply voltage VDD application is necessary before the host 20 performs processing in the contact communication mode.

Next, the sequence of steps S22 to S24 is for processing a read command in the contact communication mode, and the specification of the command is shown in FIG. 8A. The sequence of steps S25 to S27 is for processing a write command in the contact communication mode, and the specification of the command is shown in FIG. 8B. The specifications of the contact communication commands shown in FIGS. 8A and 8B do not conform to any specific communication standard. It is possible to cause the specification to conform to an appropriate standard such as ISO/IEC7816-4 to have the same standard as that of the command specification of the contactless interface, thereby rationalizing the processing of the command processing unit 4.

Firstly, the read command in the contact communication mode is described. At step S22, the host 20 designates the contact communication mode to transmit the read command. With reference to the format of the read command shown in FIG. 8A, the command code is set to "00" for reading. A start address is two bytes. The start address is set to a start address of the memory 3 from which reading starts. A data length is set to a size of data by to be read according to a response. The data length is set to the data size indicated by the number of bytes.

In receiving the read command from the host 20, the command processing unit 4 in the RFID device 10 interprets the command. Here, since the command is inputted from the contact IF 2 and the command code is "00", the command processing unit 4 interprets that the command is a read command of the contact communication mode, and at step S23, reads data from the memory 3. The data to be read from the memory 3 is set by the start address and data length which are set in the command.

Next, at step S24, the command processing unit 4 sets the data read from the memory 3 into a data part designated in the format of a response shown in FIG. 8A, and sets the processing result into a status in the format. Then, the command processing unit 4 transmits the response to the host 20 via the contact IF 2 and the transmission signal TX. The setting of the status is shown in FIG. 8C. The status where the processing is successful is indicated as "F0", while the status where the processing fails is indicated as "E0". "D0" means busy (currently processing). As described later, for example, if the host 20 transmits a contact communication command while the RFID device 10 is processing a contactless communication command, the status "D0" is used to in a response provided from the RFID device 10.

Next, the write command in the contactless communication mode is described. At step S25, the host 20 transmits a write command of the contact communication mode. The command code is set to "10" for writing to have the write command format of FIG. 8B. A next start address of two types is set to a start address of the memory 3 from which writing starts. The data length is set to the number of bytes indicating a size of the data to be written. The data part is se to the data to be written.

When the RFID device 10 receives the write command from the host 20, the command processing unit 4 interprets the command. Here, since the command is inputted from the contact IF 2 and the command code is "10", the command processing unit 4 interprets that the command is the write command of the contact communication mode, and at step S26, writes data to the memory 3. The data to be written into the memory 3 is set by the start address and data length which are designated in the command.

Next, when the writing is completed, then at step S27, the command processing unit 4 sets the processing result in the status, and transmits the response to the host 20 via the contact IF 2 and the transmission signal TX. Like the read command, it is assumed that the status is set as shown in FIG. 8C.

Finally, when the processing of the command for which the contact communication mode is completed, then at step S28, the host 20 applies a low voltage as the power-supply voltage VDD to stop supplying power to the RFID device 10.

It should be noted that it has been described that the host 20 designates the contact communication mode and then transmits the read/write command, but the host 20 does not need to always designate a communication mode. All of commands provided from the contact IF are commands transmitted from the host 20. Therefore, the RFID device 10 may determine that the commands are to be processed in the contact communication mode. In this case, the host 20 may simply transmit a read or write command to the RFID device 10 without designating a communication mode. Hereinafter, for the sake of convenience, the "command for which the contact communication mode is designated" means either a command for which the host 20 specifies a communication mode or a command which is transmitted from the host 20 but not designated with any specific communication mode.

<<Tunnel Mode>>

Next, the processing in the tunnel mode is described.

In the tunnel mode, (a) the RFID device 10 once receives information of a non-communication command transmitted from the reader/writer 200, and transfers the information to the host 20, (b) the host 20 processes the command, and transmits the processing result to the RFID device 10, and (c) the RFID device 10 transmits the processing result to the reader/writer 200 as a response. Here, in this mode, it is necessary to supply power to the power-supply voltage VDD.

Figure 10A:
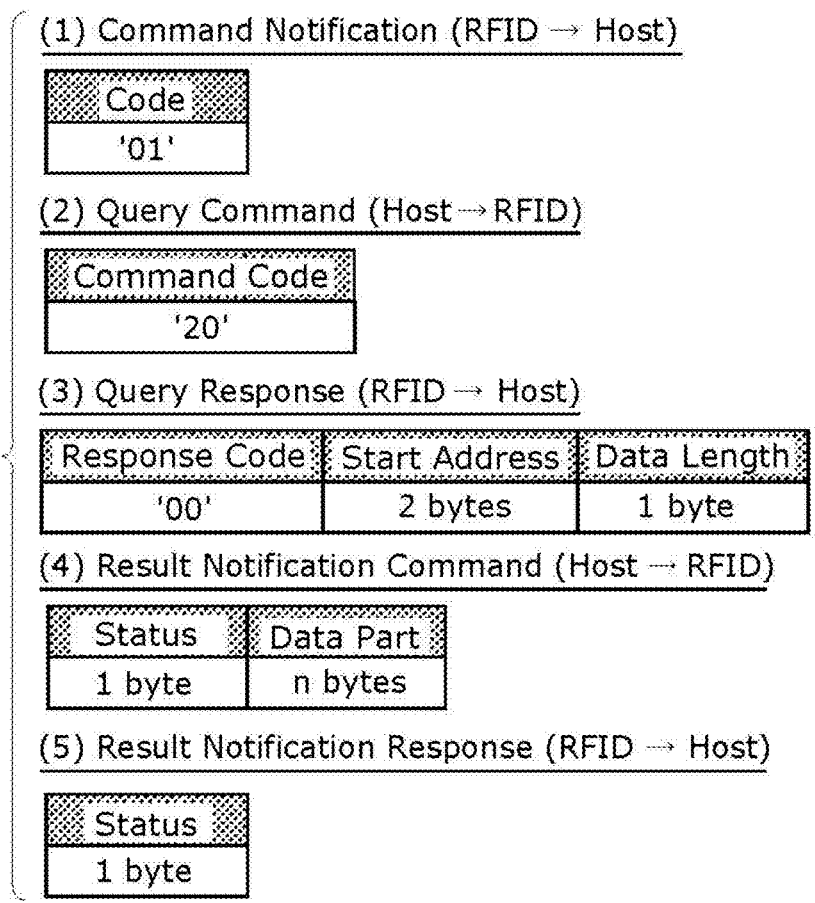
FIG. 10A is a table showing a format of a read command in the tunnel mode which is used of the sequence in FIG. 9.
Figure 10B:
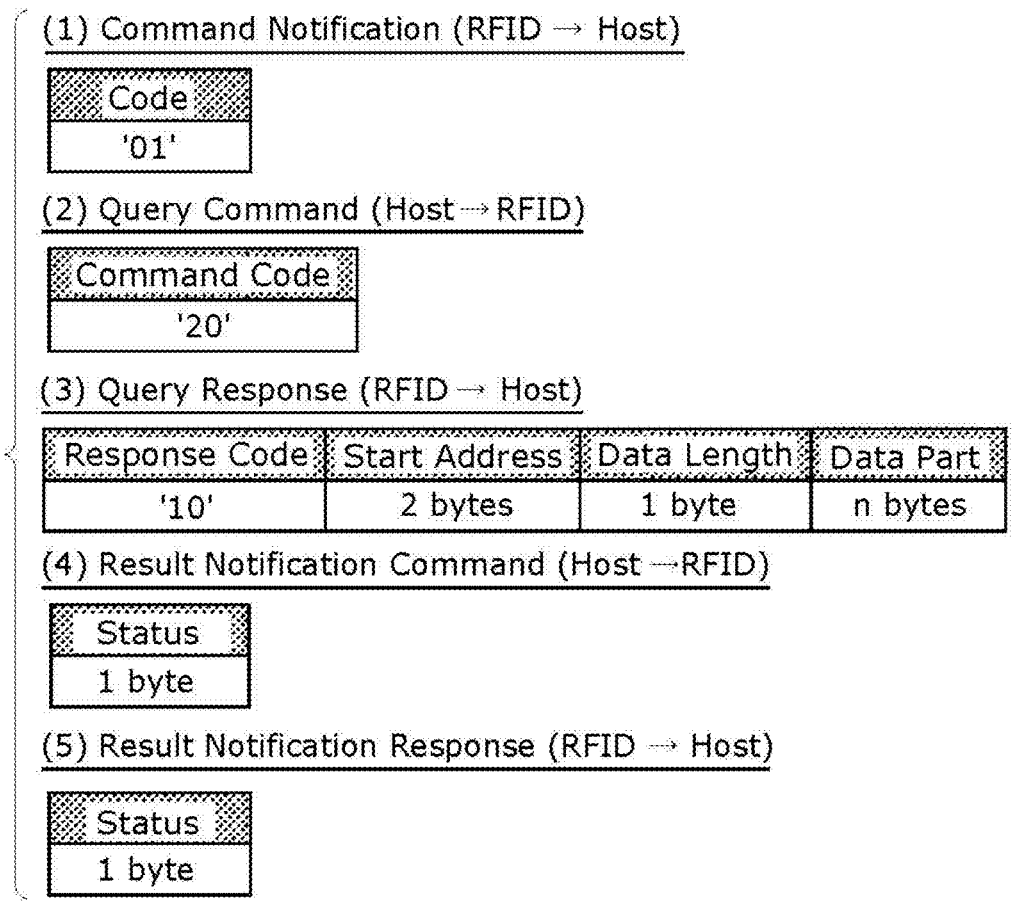
FIG. 10B is a table showing a format of a write command in the tunnel mode which is used in the sequence of FIG. 9.

FIG. 9 is a sequence diagram of processing performed by the RFID-embedded apparatus 100 and the reader/writer 200 in the tunnel mode according to the present embodiment. FIGS. 10A and 10B are diagrams showing specifications of tunnel mode commands used by the RFID device 10 and the reader/writer 200 according to the present embodiment.

Firstly, the sequence of steps S31 to S33 in FIG. 9 corresponds to the sequence of (a) a step of detecting by the RFID device 10 that magnetic filed is ON when the reader/writer 200 gets close to the RFID device 10, (b) a step of notifying the detection result to the host 20, and (c) a step of applying, by the host 20 that receives the detection result, a high voltage as the power-supply voltage VDD. For example, the sequence is the same as the above-described sequence of steps S1 to S3 in FIG. 4.

The sequence of steps S34 to S41 is an operation sequence of a read or write command in the tunnel mode.

Firstly, the processing for the read command is described with reference to the command specifications shown in FIGS. 5A and 10A.

At step S34, the reader/writer 200 designates the tunnel mode and transmits the read command. This read command in the tunnel mode differs from the read command in the contactless communication mode shown in FIG. 5A in that a bit 7 in a byte 1 shown in FIG. 5C is set to "1" indicating the tunnel mode. Bits b6 to b1 in the byte P1 and a byte P2 are set to an address offset (start address). A byte Le is set to a data length of data to be read in response. The data length is indicated by the number of bytes.

When the RFID device 10 receives the read command from the reader/writer 200, the command processing unit 4 interprets the command. Here, the command is provided from the contactless IF 1, and the byte INS is "D0" and the bit 7 in the byte P1 is "1". Therefore, the command processing unit 4 interprets that the command is a read command for which the contactless communication is designated, and then at step S35, performs command notification to the host 20 via the contact IF 2 and the transmission signal TX. A code of the command notification is "01" as shown in (1) of FIG. 10A.

In receiving the code "01", the host 20 determines that the reader/writer 200 issues the command for which the tunnel mode is designated. After that, at step S36, the host 20 transmits a query command to the RFID device 10 via the receiving signal RX. A command code of the query command is "20" as shown in (2) of FIG. 10A.

When the RFID device 10 receives the command code "20" of the query command, at step S37, the command processing unit 4 transmits, as a query response, the information of the command for which the tunnel mode is designated and which is received at S34, to the host 20 via the contact IF 2 and the transmission signal TX. The specification of the query response is shown in (3) of FIG. 10A. The response code "00" indicates a read command. A start address is a start address from which memory reading starts. A data length is a byte length of data to be read. The start address is set to the same address offset as set in the read command of the tunnel mode at S34 to be indicated by the bits b6 to b1 in the byte P1 and the byte P2. The data length is set to the same byte Le as set in the read command of the tunnel mode at S34. At step S37, the information of the read command of the tunnel mode which is received at step S34 are notified to the host 20.

Next, at step S38, the host 20 performs processing according to the information of the received query response. Details of the processing are not especially limited. For example, it is also possible to read data from a memory in the host 20, a different memory connected to the host 20, or the like, based on the set address offset and the data length. It is also possible to generate some kind of information data by the host 20 and set it in data. After completing the processing at step S38, than at step S39, the host 20 transmits a result notification command to the RFID device 10 via the receiving signal RX. The specification of the result notification command is shown in (4) of FIG. 10A. Here, the status is set to the processing result, and the data part is set to the read data. The specification of the status is the same as the specification the contact communication command in FIG. 8C.

When the RFID device 10 receives the result notification command, then at step S40, the command processing unit 4 transmits the result notification response to the host 20 via the contact IF 2 and the transmission signal TX, and then at step S41, transmits a response to the reader/writer 200 via the contactless IF 1 and the antenna ANT1.

The specification of the result notification response has only a status as shown in (5) of FIG. 10A. This status setting is as the same as shown in FIG. 8C. The specification of the response transmitting back to the reader/writer 200 at step S41 is indicated by the response in FIG. 5A. In this setting, the command processing unit 4 appropriately converts the information of the result notification command received at step S39 and sets the data part Data and the bytes SW1 and SW2.

The following mainly describes a difference in processing between (a) the case where the command at step S34 is a write command for which the tunnel mode is designated and (b) the case where the command at step S34 is the above-described read command and.

First, at step S34 in FIG. 9, (a) the write command for which the tunnel mode is designated and which is transmitted from the reader/writer 200 differs from (b) the write command shown in FIG. 5B for which the contactless communication command is designated in that the bit b7 in the byte P1 is set to "1", like the read command for the tunnel mode is designated. The specifications of the other parameters are the same as the parameters in the write command for which the contactless communication mode is designated.

In the sequence of steps S35 to S41 in FIG. 9, the sequence of steps S37 to S39 and step S41 is different between a read command of the tunnel mode and a write command of the tunnel command. The steps S35, S36, and S40 for the write command are the same as the steps for the read command, so that these steps are not described again.

The step S37 is a query response having a specification shown in (3) of FIG. 10B. The response code "10" indicates that the query response is a write command. A start address is set to a start address from which memory writing starts, and a data length is set to a byte length of data to be written. A data part is set to the data to be written. The start address is set to the same address offset as set in the write command at step S34 for which the tunnel command to be indicated by the bits b6 to b1 in the byte P1 and the byte P2. The data length is set to the same byte Lc as set in the above-mentioned write command. The data part is set to the same data part Data set in the above-mentioned write command.

Next, at step S38, the host 20 performs processing according to the information of the received query response. The processing detail is not especially limited. It is also possible to write data into the memory in the host 20 or a different memory connected to the host 20, based on the information of the received data.

At step S39, the host 20 transmits the result processing command to the RFID device 10. The specification of the result processing command is shown in (4) of FIG. 10B. Transmission data included in the result processing command is only the status. The specification of the status is the same as the specification of the contact communication command in FIG. 8C.

At step S41, the RFID device 10 transmits a response back to the reader/writer 200. The specification of the response is shown as a response in FIG. 5B. In the setting of the response specification, the command processing unit 4 appropriately converts the information of the result notification command received at step S39 and sets the bytes SW1 and SW2.

In the sequence of steps S42 to S44, when the reader/writer 200 is taken away from the RFID device 10, the RFID device 10 detects that the magnetic filed is OFF and then notifies the detection result to the host 20, and eventually the host 20 receiving the notification applies a low voltage as the power-supply voltage VDD. For example, the sequence is the same as the above-described sequence of steps S10 to S12 in FIG. 4.

Although the processing in the tunnel mode has been described above, it is also possible that the command notification at step S35 and the query command at step S36 are eliminated, and the RFID device 10 transmits the query response at step S37 to the host 20 after receiving the tunnel mode command at step S34. It is also possible to eliminate the result notification response at step S40. Therefore, it is possible to shorten a time required to command processing in the tunnel mode.

It should be noted that, as shown in FIGS. 5A to 5C, the control of the contactless communication mode and the tunnel mode (in other words, the determination as to whether the communication mode is the contactless communication mode or the tunnel mode) is performed using the parameters of the bytes P1 and P2 which are address offsets of ISO/IEC7816-4 command. Therefore, it is not necessary to issue a new command to distinguish the contactless communication mode from the tunnel mode. As a result, the contactless communication mode and the tunnel mode can be controlled by using an existing reader/writer.

Like the contact communication mode commands shown in FIGS. 8A to 8C and the tunnel mode commands shown in FIGS. 10A and 10B, the first (starting) one byte of a command or response is set to a command (response) code or a status so that the first (starting) one byte can indicate the information of the command or the status. For example, if data is located at the beginning as shown in the response in FIG. 5A, it is necessary to receive all pieces of data of the response, then separate the data part from the status part based on data length information, and eventually make a determination for the status. Therefore, relatively complicated processing is necessary. On the other hand, according to the present embodiment, the host 20 can specify a code of a command or response or a status by detecting the first one byte in received data. As a result, the host 20 needs simple processing.

<<State Transition>>

Figure 11:
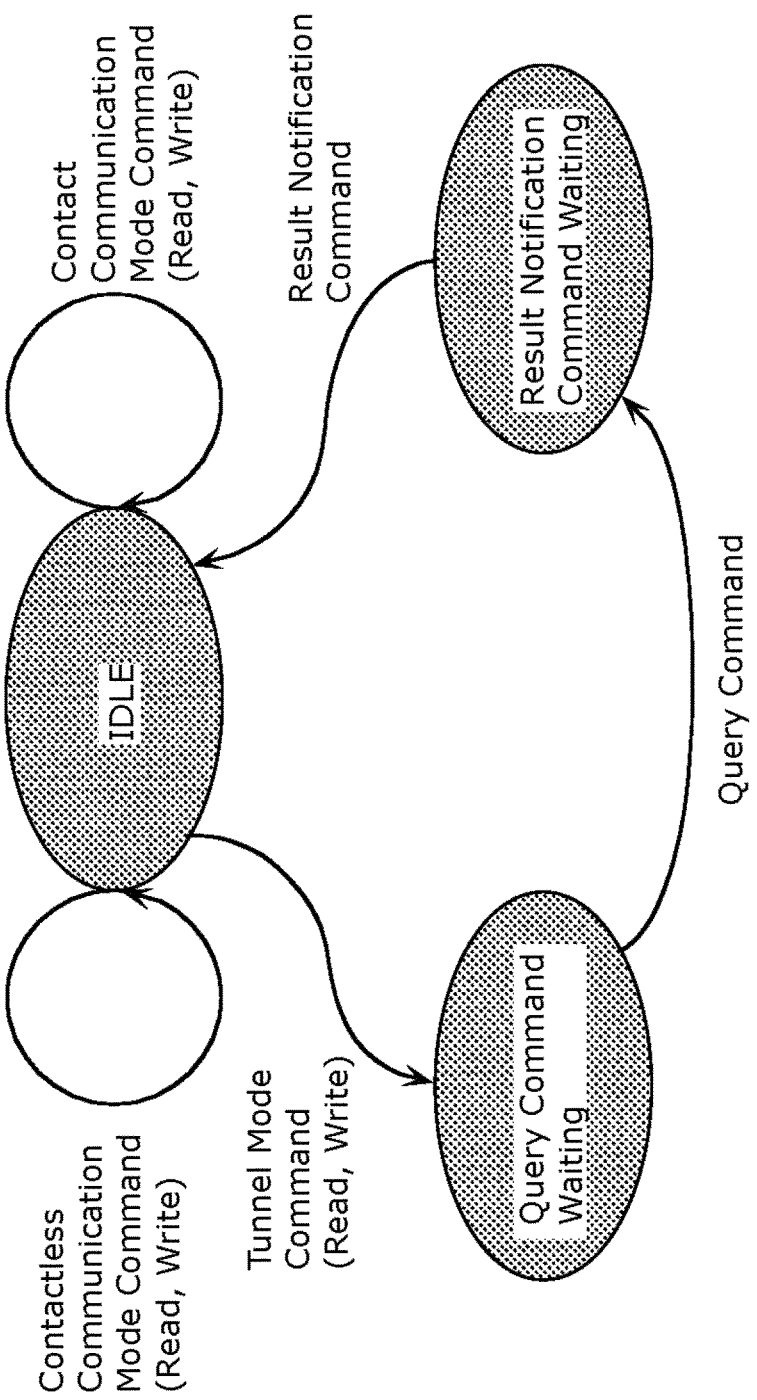
FIG. 11 is a diagram of state transition for showing processing performed by the RFID device according to Embodiments 1 and 2.

FIG. 11 is a state transition diagram showing processing performed by the RFID device 10 according to the present embodiment. Referring to FIG. 11, transition of an inside state of the RFID device 10 receiving a command in each of the modes is described.

In FIG. 11, firstly, if the RFID device 10 does not receive any command, the state is in an idle state. If the RFID device 10 in the idle state receives a command for which the contactless communication mode is designated (for example, a read command, a write command, or the like) and a command such as a request command REQ for causing the reader/writer 200 to detect the RFID-embedded apparatus 100, then the RFID device 10 processes the command of the contactless communication mode as described previously, then transmits a response back to the reader/writer 200, and then returns to the idle state (transition to the original state). During processing the command for which the contactless communication mode is designated, the RFID device 10 does not receive another command for which the contactless communication mode is designate, a command for which the tunnel mode is designated, and a command for which the contact communication mode is designated. For example, if during processing the command for which the contactless communication mode is designated, the RFID device 10 receives a command for which the contact communication mode is designated from the host 20, then the RFID device 10 transmits, to the host 20, a status "D0" indicating BUSY shown in FIG. 8C as a response. In receiving "D0", the host 20 is notified of that a command in another mode is currently processed. The host 20 waits for a while and then transmits the command of the contact communication mode again to resume the processing.

Furthermore, if the RFID device 10 in the idle state receives a command for which the contact communication mode is designated (for example, a read command, a write command, or the like), then the RFID device 10 processes the command corresponding to the contact communication mode as described previously, then transmits a response back to the host 20, and eventually returns to the idle state (transition to the original state).

During processing the command for which the contactless communication mode is designated, the RFID device 10 does not receive a command for which the contactless communication mode is designated, a command for which the tunnel mode is designated, and another command for which the contact communication mode is designated.

Moreover, if the RFID device 10 in the idle state receives a command for which the tunnel mode is designated (for example, a read command, a write command, or the like), then the RFID device 10 performs a command notification at step S35 in FIG. 9, and then changes to a state for waiting for a query command (query command waiting state). In the query command waiting state, the RFID device 10 receives only a query command from the host 20.

In receiving a query command from the host 20 at step S36, the RFID device 10 transmits a query response at step S37, and changes to a state for waiting for a result notification command (result notification command waiting state). In the result notification command waiting state, the RFID device 10 receives only a result notification command from the host 20. In receiving a result notification command form the host 20 at step S39, the RFID device 10 transmits a result notification response to the host 20 at step S40, then transmits a response to the reader/writer 200 at step S41, and changes to the idle state.

The above-described state transition (changing) makes it possible to prevent troubles such as memory access competing due to commands provided from both the contactless interface and the contact interface, and error operations due to receiving of a contact communication command during the tunnel mode.

<<Processing Method 1>>

The following describes the processing method by which, when the reader/writer reads a relatively large amount of data from the host, even if a communication speed of the contact interface between the RFID device and the host is slow, a time required to present the reader/writer over the RFID-embedded apparatus can be short.

Figure 12:
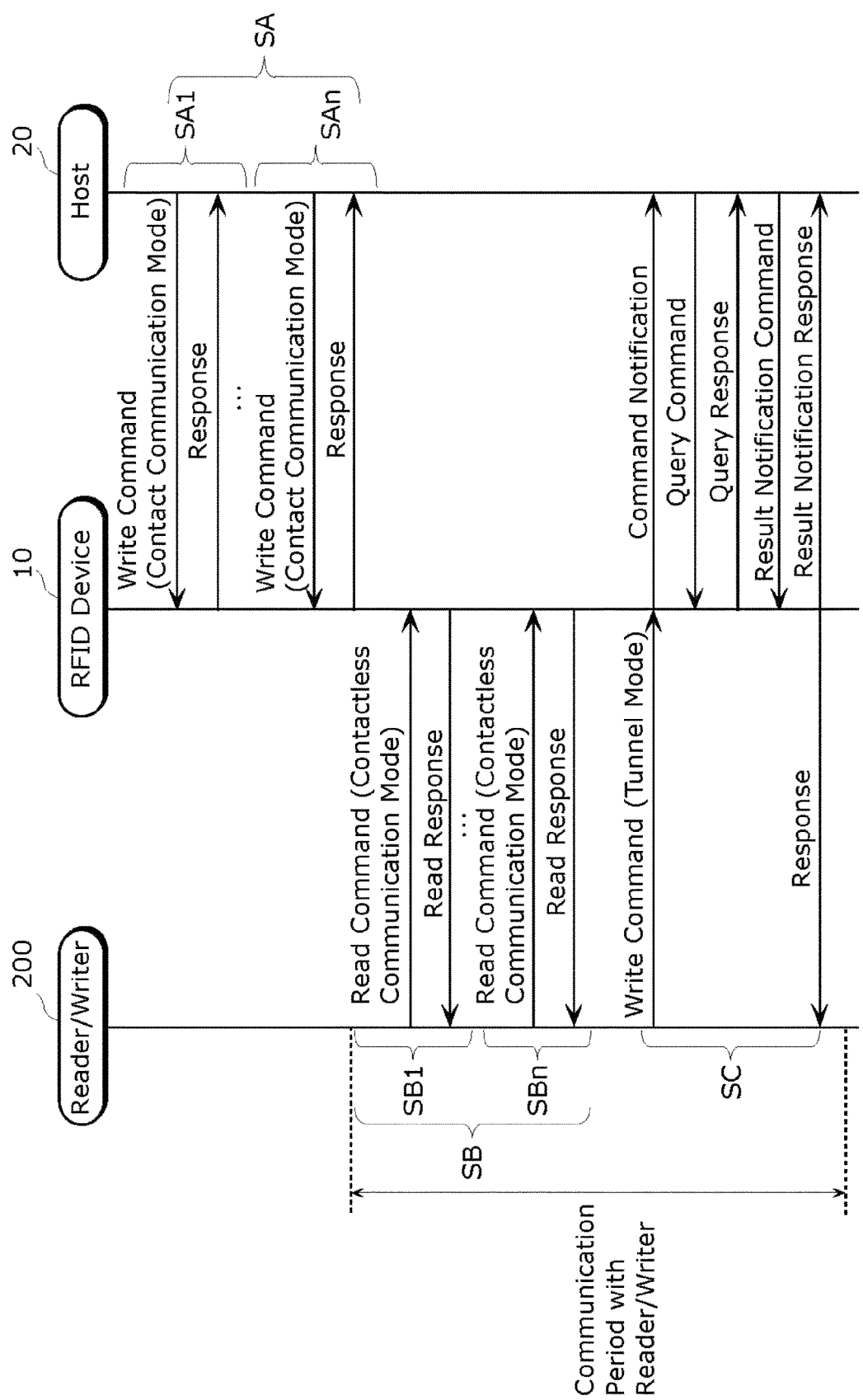
FIG. 12 is a sequence diagram of processing for transmitting data from the host to the reader/writer according to Embodiments 1 and 2.

FIG. 12 is a sequence diagram showing the processing method of transmitting data from the host 20 to the reader/writer according to the present embodiment. The following describes the processing method with reference to FIG. 12.

Firstly, at step SA, the host 20 writes data to be transmitted to the reader/writer 200, into the memory 3 of the RFID device 10 according to a write command of the contact communication mode.

Here, the host 20 may start writing into the memory 3, at the time of obtaining or generating the data to be transmitted to the reader/writer 200, or at the time of detecting that the RFID device 10 gets close to the reader/writer 200. Here, the RFID device 10 may use a smaller threshold than the threshold used for the magnetic filed intensity in the above-described determination of the magnetic filed ON, in order to detect the approach of the reader/writer 200. This is because the RFID device 10 can write data into the memory 3 by contact communication even when the reader/writer 200 is far from the RFID device 10 and the magnetic filed intensity is not enough for correct contactless communication.

Furthermore, the step SA includes steps SA1 to SAn for processing a plurality of write commands in the contact communication mode. This is because a data size writable for a single write command of the contact communication mode is limited to, for example, 256 bytes. Therefore, if the data in the host 20 is 4 Kbytes, for example, and all pieces of the data are not able to be written once by a single write command of the contact communication mode, a plurality of write commands of the contact communication mode are issued to sequentially change a setting of a start address so that pieces of the data are sequentially written into the memory 3 of the RFID device 10. If the data is able to be written by a single write command of the contact communication mode, it is possible to perform the first step SA1 only.

Next, when the reader/writer 200 gets close to the RFID device 10 at step SB, then data is read from the memory 3 included in the RFID device 10 according to a read command for which the contactless communication mode is designated. Like step SA, the step SB includes steps SB1 to SBn for processing a plurality of read commands of the contactless communication mode. Like the write commands, if all pieces of the data in the host 20 are not able to be read by a single read command of the contactless communication mode, then a plurality of read commands of the contactless communication mode are issued to sequentially change a setting of a start address so that pieces of the data are sequentially read.

Here, regarding a data amount read by the reader/writer 200 at step SB, there is, for example, a method of reading as described below. For preparation, the RFID device 10 stores data size information at the beginning of the data to be read. At step SB1 issuing the first read command of the contactless communication mode, the reader/writer 200 obtains the data size information. Sequentially, the reading is performed based on the data size information. It is also possible to read all pieces of data in the memory 3 in the RFID device 10 at step SB, without storing the data size information.

Next, at step SC, the reader/writer 200 notifies the host 20 of that step SB is performed according to the write command of the tunnel mode. One of the methods is the following. The information read at step SB is stored in a data part Data of a contactless communication command shown in FIGS. 5A to 5C. The information includes information indicating reading in the contactless communication mode, a start address of the memory 3, and information of a data length. It is also possible to store an instruction issued by the host 20 (for example, instruction for performing step SA for a next new piece of the data) into the data part Data after step SC. The information to be stored may be determined to appropriately perform control between the reader/writer 200 and the host 20.

Since at step SC the host 20 receives the information read by the reader/writer 200 at step SB, the host 20 is notified of that the external reader/writer 200 obtains the data from the host 20. Then, the host 20 performs step SA again so that the reader/writer 200 is able to read a next new piece of the data after step SC.

Here, in the case where the wireless communication between the reader/writer 200 and the RFID device 10 is near-field communication such as contactless communication, steps SB and SC in single near-field operation allows the apparatus control to be performed smoothly. Here, the near-field operation means a user's operation of getting the reader/writer 200 and the RFID device 10 close to each other to be in a range where the they can perform near-field communication.

The following describes a processing time in the case where a communication speed of the contact interface between the RFID device 10 and the host 20 is slow in the processing sequence shown in FIG. 12. It is assumed that a size of data to be written from the host 20 to the RFID device 10 is 4096 bytes, that the communication speed of the contact interface between the RFID device 10 and the host 20 is 9600 bps, that the communication speed of the contactless communication interface between the reader/writer 200 and the RFID device 10 is 106 kbps. Here, the communication speed of the contactless communication interface needs support of 106 kbps in the case of ISO/IEC14443 (Type A or Type B), and is selectable among 212 kbps, 424 kbps, or 848 kbps.

The estimation of the processing time described below considers only a time required by the communication interface to transmit and receive data, and does not include a time required by the RFID device 10 or the host 20 itself. Furthermore, for the sake of simple estimation, pieces of additional data such as a start of frame (SOF), an end of frame (EOF), a start bit, an end bit, and a check code are not considered. Furthermore, in the estimation of the data communication times at steps SA and SB, the data communication time such as a command code, a start address, and a data length are not considered.

Firstly, at step SA, since the data size is 4096 bytes and the communication speed is 9600 bps, the communication time at step SA is 4096 bytes×8 bits/9600 bps=3.4 s. At step SB, since the data size is also 4096 bytes and the communication speed is 106 kbps, the communication time at step SB is 4096 bytes×8 bits/106 kbps=0.3 s.

At step SC, the data part Data included in the write command of the tunnel mode is set to have total 5 bytes: 1 byte indicating reading, two bytes for start address information, and two bytes for data length information. Here, the command length has total 10 bytes with reference to FIG. 5B because the data part Data has 5 bytes. The response has two bytes. Therefore, the processing time of the contactless communication interface is 12 bytes×8 bits/106 kbps=0.001 s.

Furthermore, with reference to FIG. 10B, if the data part in (3) of FIG. 10B has 5 bytes, the total data size from (1) to (5) of FIG. 10B is 13 bytes. Therefore, the communication time of the contact interface between the RFID device 10 and the host 20 for the write command of the tunnel mode is 13 bytes×8 bits/9600 bps=0.01 s. Eventually, a total processing time of the contactless communication and the contact communication is 0.011 s.

As a result, communication times of steps SA, SB, and SC are 3.4 s, 0.3 s, and 0.011 s, respectively. From them, the data transmission from the host 20 to the RFID device 10 (namely, step SA) needs to be performed prior to presenting the reader/writer 200 over the RFID device 10. Here, a time required to present the reader/writer 200 over the RFID device 10 is necessary in steps SB and SC only. The time of presenting is 0.3 s+0.11 s=0.311 s to approximately 0.3 s.

As shown in FIG. 12, if a data size is large, the RFID device 10 and the reader/writer 200 according to the present embodiment previously perform data transmission from the host 20 to the RFID device 10 which requires a long communication time (before starting contactless communication between the reader/writer 200 and the RFID device 10), and the data is stored into the memory 3 in the RFID device 10. By designating the contactless communication mode, the reader/writer 200 reads the data from the memory 3. After that, for a reading completion notification having a small data size, the reader/writer 200 designates the tunnel mode to transmit the notification directly to the host 20.

As described above, according to a data size exchanged between the host 20 and the reader/writer 200, either the contactless communication mode or the tunnel mode is selected to be used. Therefore, a time required for the contactless communication between the reader/writer 200 and the RFID device 10 is only approximately 0.3 s. As a result, a time required for the user to present the reader/writer 200 by the hand over the RFID device 10 is short. It is also possible to transmit a large amount of data which has conventionally been almost impossible to be transmitted due to a too long communication time between the RFID device 10 and the reader/writer 200. In addition, a usability is also improved.

Thus, the data transmission from the RFID device 10 to the reader/writer 200 has been described. Next, the data transmission from the reader/writer 200 to the RFID device 10 is described.

<<Processing Method 2>>

The following describes the processing method by which, when the reader/writer 200 transmits a relatively large amount of data to the host 20, even if a communication speed of the contact interface between the RFID device 10 and the host 20 is slow, a time required to present the reader/writer 200 over the RFID device 10 can be short.

Figure 13:
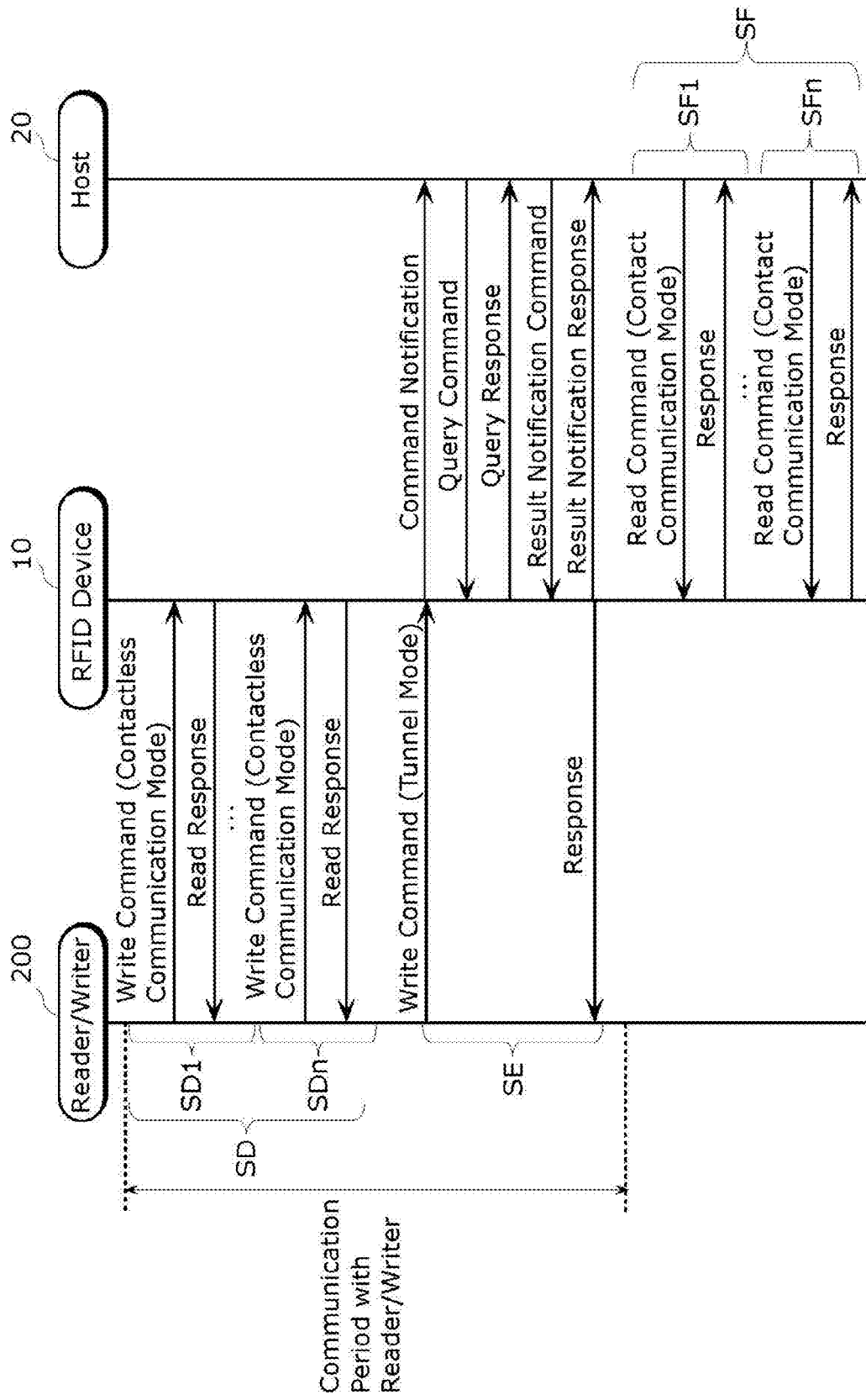
FIG. 13 is a sequence diagram of processing for transmitting data from the reader/writer to the host according to Embodiments 1 and 2.

FIG. 13 is a sequence diagram showing the processing method of transmitting data from the reader/writer 200 to the host 20 included in the RFID-embedded apparatus 100 according to the present embodiment. The following describes the processing method with reference to FIG. 13.

Firstly, at step SD, when the reader/writer 200 gets close to the RFID device 10, the reader/writer 200 transmits, to the RFID device 10, data to be transmitted to the host 20 according to a write command for which the contactless communication mode is designated. The RFID device 10 stores the received data into the memory 3. The step SD includes steps SD1 to SDn for processing a plurality of write commands of the contactless communication mode. The sequence shows that, if all pieces of the data to be transmitted to the host 20 are not able to be written by one write command of the contactless communication mode, a plurality of write commands of the contactless communication mode are issued to sequentially change a setting of an address offset so that pieces of the data are sequentially written.

Next, at step SE, the reader/writer 200 notifies the host 20 of that step SD is completed according to the write command for which the tunnel mode is designated. One of the methods is the following. The information written at step SD is stored in the data part Data of the contactless communication command shown in FIGS. 5A to 5C. The information includes information indicating a writing result in the contactless communication mode, a start address of the memory 3, and information of a data length. It is also possible to store an instruction issued by the host 20 (for example, instruction for performing step SF) into the data part Data after step SE. The information to be stored may be appropriately determined to correctly perform control between the reader/writer 200 and the host 20.

At next step SF, based on the information notified at step SE, the host 20 reads data of the memory 3 from the reader/writer 200 according to the read command for which the contact communication mode is designated. The step SF includes steps SF1 to SFn for processing a plurality of read commands of the contact communication mode. If all pieces of the data are not able to be read by a single read command of the contact communication mode, then a plurality of read commands of the contact communication mode are issued to sequentially change a setting of an address offset so that the pieces of the data are sequentially read.

The following describes a processing time in the case where a communication speed of the contact interface between the RFID device 10 and the host 20 is slow in the processing sequence shown in FIG. 13. It is assumed that a size of data to be transmitted from the reader/writer 200 to the host 20 is 4096 bytes, that the communication speed of the contact interface between the RFID device 10 and the host 20 is 9600 bps, that the communication speed of the contactless communication interface between the reader/writer 200 and the RFID device 10 is 106 kbps. The estimation of the processing time described below considers only a time required by the communication interface to transmit and receive data, and does not include a time required by the RFID device 10 or the host 20 itself. Furthermore, for the sake of simple estimation, pieces of additional data such as a start of frame (SOF), an end of frame (EOF), a start bit, an end bit, and a check code are not considered. Furthermore, in the estimation of the data communication times at steps SD and SF, the data communication time such as a command code, a start address, and a data length are not considered.

Firstly, at step SD, since the data size is also 4096 bytes and the communication speed is 106 kbps, the communication time at step SD is 4096 bytes×8 bits/106 kbps=0.3 s.

At step SE, the data part Data included in the write command of the tunnel mode is set to have total 5 bytes: 1 byte indicating writing, two bytes for start address information, and two bytes for data length information. Here, the command length has total 10 bytes with reference to FIG. 5B because the data part Data has 5 bytes. The response has two bytes. Therefore, the processing time of the contactless communication interface is 12 bytes×8 bits/106 kbps=0.001 s.

Furthermore, with reference to FIG. 10B, if the data part in (3) of FIG. 10B has 5 bytes, the total data size from (1) to (5) of FIG. 10B is 13 bytes. Therefore, the communication time of the contact interface between the RFID device 10 and the host 20 for the write command of the tunnel mode is 13 bytes×8 bits/9600 bps=0.01 s. Eventually, a total communication time of the contactless communication and the contact communication is 0.011 s.

At step SF, since the data size is 4096 bytes and the communication speed is 9600 bps, the communication time at step SF is 4096 bytes×8 bits/9600 bps=3.4 s.

As a result, communication times of steps SD, SE, and SF are 0.3 s, 0.011 s, and 3.4 s, respectively. From them, the data reading by the host 20 from the RFID device 10 (namely, step SF) needs to be performed after the reader/writer 200 is taken away from the RFID device 10 (in other words, after magnetic filed OFF). Here, a time required to present the reader/writer 200 over the RFID device 10 is necessary in steps SD and SE only. The time of presenting is 0.3 s+0.11 s=0.311 s to approximately 0.3 s only.

As described above, as shown in FIG. 13, the RFID device 10 and the reader/writer 200 according to the present embodiment records the data transmitted from the reader/writer 200 to the RFID device 10, into the memory 3 included in the RFID device 10. After that, for a writing completion notification having a small data size, the reader/writer 200 designates the tunnel mode to transmit the notification directly to the host 20. The host 20 receiving the writing completion notification reads the data from the memory 3 by contact communication.

Therefore, it is possible to perform the data reading by the host 20 from the RFID device 10, which requires a long communication time, at a timing independent from a communication status of the contactless communication between the reader/writer 200 and the RFID device 10. As a result, a time required for the contactless communication between the reader/writer 200 and the RFID device 10 is only approximately 0.3 s. A time required for the user to present the reader/writer 200 by the hand over the RFID device 10 can be short. It is also possible to transmit a large amount of data which has conventionally been almost impossible to be transmitted due to a too long communication time between the RFID device 10 and the reader/writer 200. In addition, a usability is also improved.

Furthermore, the host 20 provides generated data such as a log to the memory 3 included in the RFID device 10. Even if the host 20 is, for example, powered OFF or breakdown after the data provision, the reader/writer 200 can read the log from the memory 3 in the contactless communication mode. In other words, even if the host 20 is stopped, the reader/writer 200 can read the data from the host 20.

Thus, the RFID device 10 and the reader/writer 200 according to the present embodiment have been described as above.

It should be noted that the communication standard and the command specification of the contactless interface may be any desired ones rather than the above-described ones in the present embodiment. For example, as described below, they may conform to JISX6319-4. In the following description, the specification of the contact interface is the same as described previously. Furthermore, the structures of the RFID-embedded apparatus 100, the RFID device 10, and the host 20 are the same as those described with reference to FIGS. 2-4 and 6-13.

More specifically, the following describes a control method and the like for the contactless communication mode and the tunnel mode in the case of using commands conforming to JISX6319-4 as a specification for the contactless communication commands shown in FIGS. 5A to 5C.

FIG. 14A shows a specification of a read command. FIG. 14B shows a specification for coding of a block list. Here, the description of the write command is not given.

A command of the read command in FIG. 14A has the following structure. A command code is set to "06" indicating reading. A PICC identifier is an identifier unique to the RFID device 10. A service file number is the number of service files set which is set in a service file list described next. The service file list is a list of the service files, indicating service types, service numbers, etc. of the service files (details are not described). A block number is the number of blocks which is set in a block list described next. The block list is a list of block information, indicating block numbers corresponding to addresses of the memory and attributes of the blocks.

A response of the read command in FIG. 14A has the following structure. A response code is set to "07" indicating a response for reading. A PICC identifier is an identifier of the RFID device 10 which is the same as the PICC identifier in the command. A status flag 1 is information indicating success or failure, and a status flag 2 is information indicating an error code in the case of failure. A block number is the number of read blocks which has the same value as the block number in the command. A block data is readout data. Here, in JISX6319-4, 1 block=16 bytes for data.

In designation of the block list in the command, a designation size of a single block has two kinds of 2 bytes and 3 bytes from which an appropriate one is selected depending on whether a size of the block number information is 1 byte or 2 byte. FIG. 14B shows a specification in the case where the block list designation size is 2 bytes. In the table, a byte D0 indicates information including an attribute of a block and the like (the details are not described). A byte D1 is information of the number of blocks.

According to the present embodiment, in the contactless communication mode, a bit b8 in the byte D1 is set to "0". On the other hand, in the tunnel mode, the bit b8 in the byte D1 is set to "1". The remaining bits b7 to b1 in the byte D1 are used to designate the block number. With the above, even in the case where the standard of the contactless interface is JISX6319-4, it is not necessary to provide a new command to distinguish the contactless communication mode from the tunnel mode. In other words, an existing reader/writer can be used to perform control by selecting the contactless communication mode or the tunnel mode.

Embodiment 2

In the RFID-embedded apparatus 100 according to Embodiment 1, the command processing unit 4 determines a communication mode to be used in communication between the reader/writer 200 and the host 20, based on address information for identifying an access destination of data access instructed by a command.

This aspect is shared with an RFID-embedded apparatus according to Embodiment 2. However, the RFID-embedded apparatus according to the present embodiment can use more-detailed communication modes.

More specifically, the RFID-embedded apparatus according to Embodiment 1 can use, as a communication mode, one of the contactless communication mode that is the first communication mode and the tunnel mode that is the second communication mode.

On the other hand, the RFID-embedded apparatus according to the present embodiment can control accesses to the reader/writer during the second communication mode, in addition to the processing in the first communication mode and the processing in the second communication mode. In addition, the RFID-embedded apparatus according to the present embodiment can encrypt data as needed in communication with the reader/writer.

The following describes the present embodiment in more detail.

Figure 15:
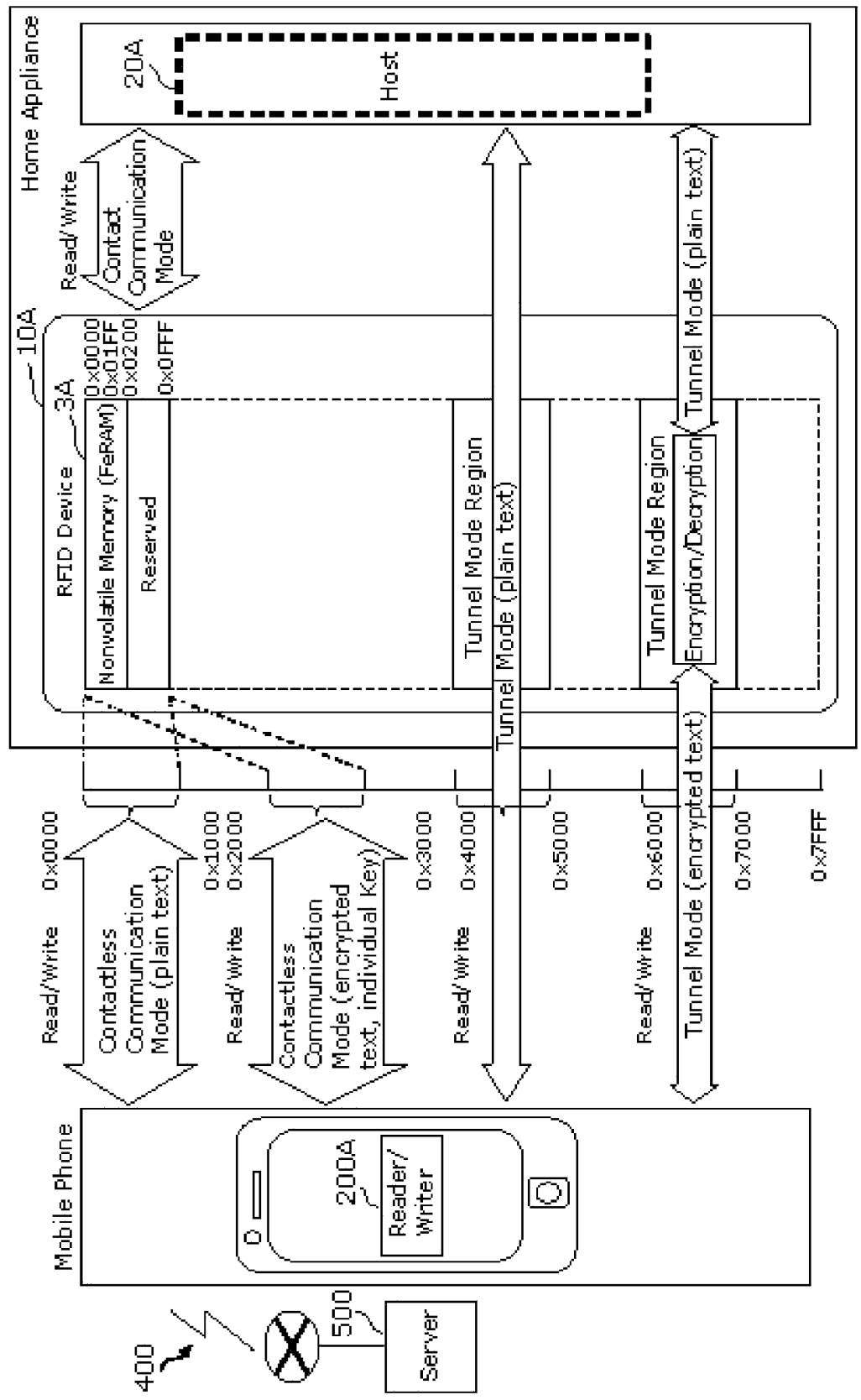
FIG. 15 is a diagram showing a summary of selectable communication modes between the reader/writer and the host according to Embodiment 2.

FIG. 15 shows a summary of available communication modes between the reader/writer and the host according to the present embodiment. The following describes communication between: a mobile phone including a reader/writer 200A according to the present embodiment; and a home appliance including an RFID device 10A and a host 20A according to the present embodiment. Here, the home appliance is an example of the RFID-embedded apparatus. The home appliance means a home electrical appliance. The mobile phone is connected to a server 500 via a network 400. The network 400 and the server 500 are not necessarily connected to each other.

As shown in FIG. 15, it is assumed that the reader/writer 200A included in the mobile phone accesses the home appliance, by designating one of addresses 0x0000 to 0x0FFF. Under the assumption, in the contactless communication mode as described in Embodiment 1, data access is performed between the home appliance and the mobile phone.

It is also assumed that the reader/writer 200A accesses the home appliance by designating one of address 0x4000 to 0x4FFF. Under the assumption, in the tunnel mode as described in Embodiment 1, data access is performed between the home appliance and the mobile phone.

Here, as described below, the address, such as 0x4000, which the reader/writer 200A designates at the data access is address information for designating a communication mode. Therefore, the address does not necessarily correspond to a physical address in the memory. The above processing is the same as described in Embodiment 1.

However, in data access between the reader/writer 200A and the RFID device 10A according to the present embodiment, it is possible to designate whether or not to encrypt data. For example, it is assumed that, as shown in FIG. 15, the reader/writer 200A accesses the home appliance by designating one of addresses 0x2000 to 0x2FFF. Under the assumption, as an encrypted contactless communication mode, data access between the reader/writer 200A and the RFID device 10A is encrypted.

More specifically, when the reader/writer 200A is to write data to the home appliance by designating an address 0x2000, firstly, encrypted data is written into the memory 3A. Next, the RFID device 10A decrypts the data. After that, the decrypted data is transmitted to the host 20A in the contact communication mode. On the other hand, when the reader/writer 200A is to read data from the home appliance by designating an address 0x2000, firstly, the RFID device 10A encrypts plain text data stored in the memory 3A. After that, the reader/writer 200A obtains the encrypted data.

It should be noted that the RFID device 10A may previously encrypt the data read from the host 20A and store the encrypted data to the memory 3A. In this case, the reader/writer 200A obtains the previously-encrypted data from the memory 3A.

It is also assumed that the reader/writer 200A accesses the home appliance by designating one of address 0x6000 to 0x6FFF. Under the assumption, as an encrypted tunnel mode, among data accesses between the host 20A and the reader/writer 200A, an data access between the RFID device 10A and the reader/writer 200A is encrypted.

For example, it is assumed that the reader/writer 200A writes data to the home appliance by designating an address 0x6000. Here, the data written from the reader/writer 200A to the RFID device 10A is subsequently decrypted by the RFID device 10A. After that, the decrypted data is subsequently transmitted to the host 20A. Furthermore, if the reader/writer 200A reads data from the home appliance by designating an address 0x6000, firstly, the RFID device 10A subsequently encrypts the data read from the host 20A in an encryption unit. After that, the encrypted data is subsequently read by the reader/writer 200A. The reader/writer 200A transfers the readout encrypted data to the server 500 via the network 400. The reader/writer 200A may have a structure of decrypting readout encrypted data.

In the above description, the address designated by the reader/writer 200A as an access destination of data access is address information for designating a communication mode, and does not necessarily correspond to an actual physical address in the memory 3A. For example, in FIG. 15, the memory 3A has only memory regions from 0x0000 to 0x0FFF. In this case, the reader/writer 200A writes address information to a fixed region included in physical addresses in the memory 3A. Furthermore, the reader/writer 200A reads the address information from the fixed region. As described above, the reader/writer 200A and the RFID device 10A always perform reading and writing of address information from/to the fixed region in the memory 3A. As a result, it is possible to associate the address information for designating a communication mode with an actual physical address in the memory 3A.

Figure 16:
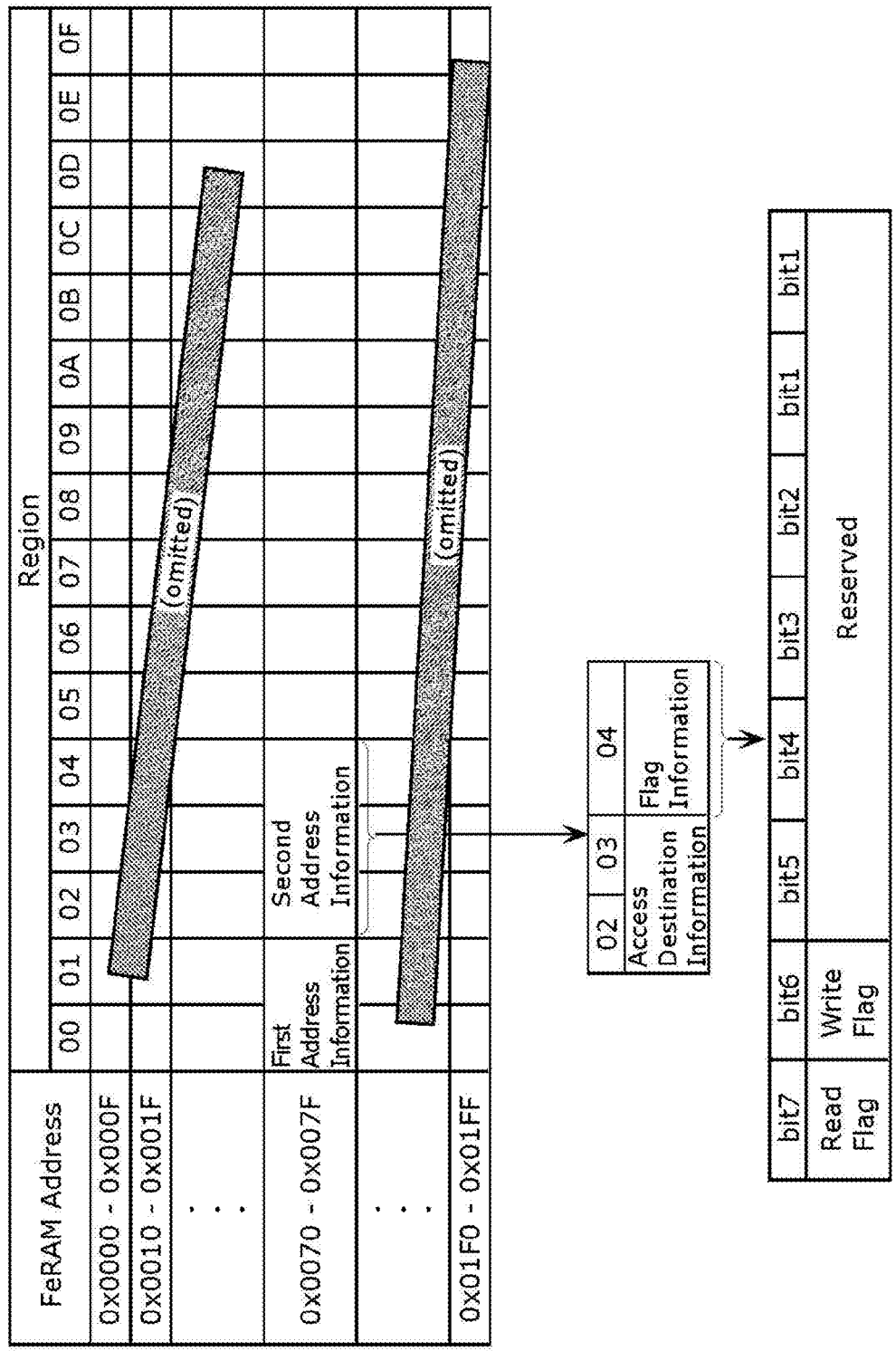
FIG. 16 is a diagram showing an example of pieces of address information stored in a memory included in the RFID-embedded apparatus according to Embodiment 2.

FIG. 16 is an actual example of pieces of the address information stored in the memory 3A. As shown in FIG. 16, the memory 3A has the first address information and the second address information in a partial region having a starting address 0x0070. It should be noted that the number of the pieces of address information is an example, and the third or more pieces of address information may be stored in the memory 3A. Furthermore, it is assumed that the reader/writer 200A and the RFID device 10A always perform data accesses for 0x0070 in the memory 3A.

For example, the second address information shown in FIG. 16 stores address information that includes access destination information and flag information.

Here, the access destination information is information indicating an access destination of data access which the reader/writer 200A designates in a form of an address 0x6000. Therefore, the access destination information indicates (1) which of the tunnel mode and the contactless communication mode is to be used for data access, and (2) whether or not to use encryption in data access between the reader/writer 200A and the RFID device 10A.

On the other hand, the flag information is updated by the host 20A itself based on an operation state of the host 20A. As described later, the flag information indicates whether or not the host 20A permits access from the outsides. For example, as shown in FIG. 16, the highest-order bit 7 in 8 bits is used as a read flag. Then, a bit 6 is used as a write flag. The definition of flags can be determined arbitrarily. Hereinafter, it is assumed that a flag value "0" indicates that corresponding data access is "permitted", and a flag value "1" indicates that corresponding data access is "prohibited". Here, when the reader/writer 200A firstly writes address information into the memory 3A, it is possible to record a predetermined default as the flag information.

The flag information has meaning only in the tunnel mode. Therefore, if the reader/writer 200A needs data access in the contactless communication mode, it is possible to generate address information as two-byte information that does not include flag information. The first address information shown in FIG. 16 is an example of such two-byte address information.

Furthermore, when the reader/writer 200A needs data access in the contactless communication mode, it is possible to generate address information that stores a value, such as null, in flag information in the third byte.

Moreover, it is also possible that the address information includes information indicating a size of data to be read by the reader/writer 200A from the home appliance or a size of data to be written into the home appliance. Furthermore, the address information may include a flag indicating a type of the home appliance. The type of the home appliance is, for example, a refrigerator, a washing machine, a microwave, or the like.

Figure 17:
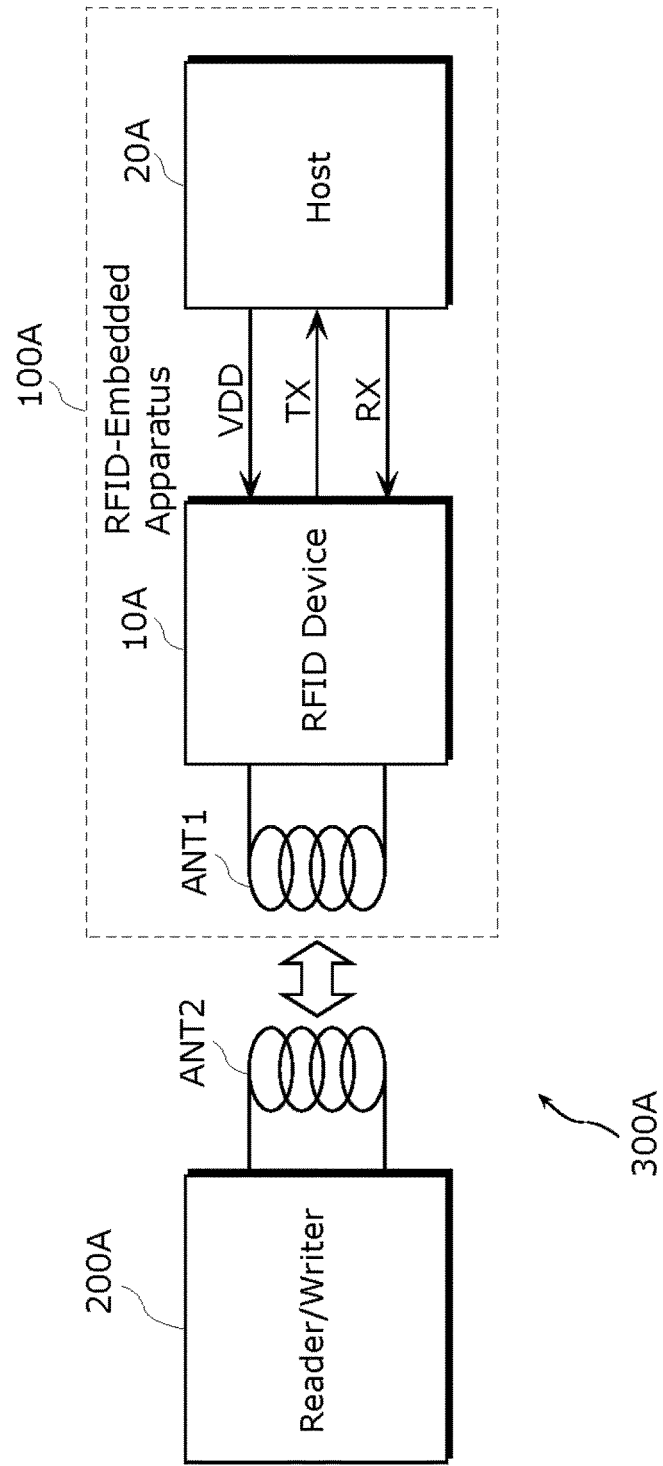
FIG. 17 is a functional block diagram of an RFID system including the reader/writer and the RFID-embedded apparatus according to Embodiment 2.
Figure 18:
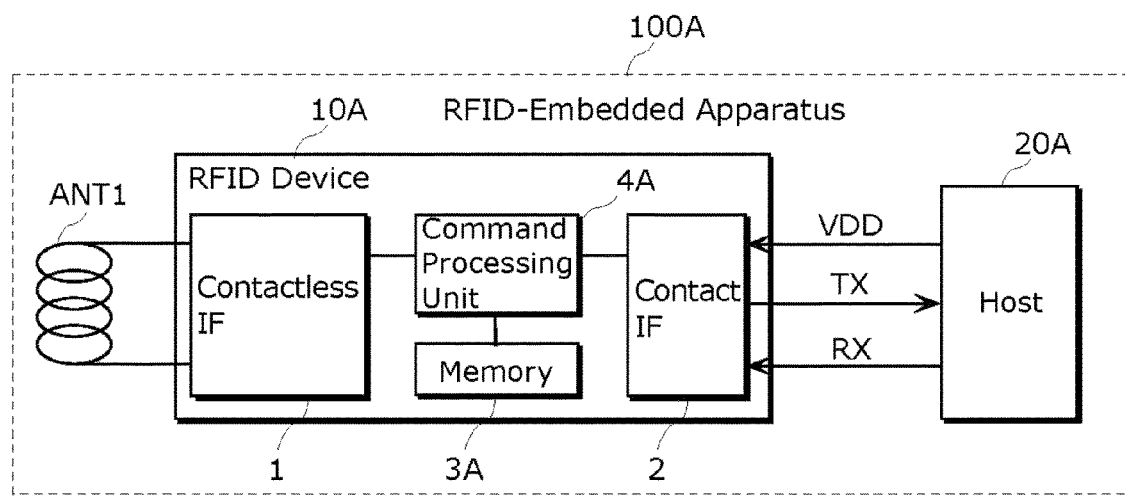
FIG. 18 is a functional block diagram of an RFID device according to Embodiment 2.
Figure 19:
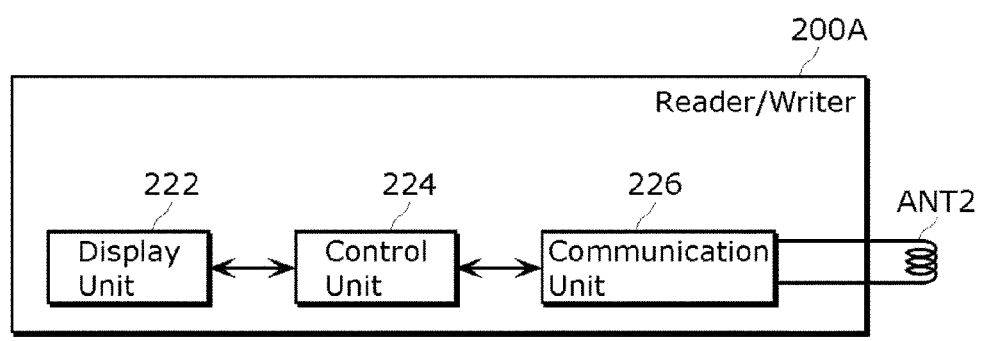
FIG. 19 is a functional block diagram of a reader/writer according to Embodiment 2.

Next, with reference to FIGS. 17 to 19, the structures of the reader/writer and the RFID-embedded apparatus according to the present embodiment are described.

FIG. 17 shows a functional block of an RFID system 300A that includes the reader/writer 200A and the RFID-embedded apparatus 100A according to the present embodiment. The reader/writer 200A and the RFID-embedded apparatus 100A perform contactless communication via the antenna ANT2 and the antenna ANT1, respectively. The RFID-embedded apparatus 100A includes the RFID device 10A and the host 20A. The RFID device 10A and the host 20A perform contact communication each other.

details of the contactless communication between the reader/writer 200A and the RFID-embedded apparatus 100A and the contact communication between the RFID device 10A and the host 20A are the same as described in Embodiment 1.

FIG. 18 is a functional block of the RFID device 10A according to the present embodiment. The description already given with reference to FIG. 3 is not given again.

As shown in FIG. 18, the RFID device 10A includes the contactless IF 1, the contact IF 2, the memory 3A, and the command processing unit 4A.

The memory 3A temporarily stores data in communication between the reader/writer 200A and the RFID-embedded apparatus 100A. Furthermore, the memory 3A stores address information for determining (a) a communication mode between the reader/writer 200A and the RFID-embedded apparatus 100A, and (b) whether or not access to the host 20A is permitted. The memory 3A is generally a non-volatile memory, but may be a volatile memory.

The command processing unit 4A has three major operation modes: the contactless communication mode, the contact communication mode, and the tunnel mode. Furthermore, in each of the contactless communication mode and the tunnel mode, there is an encryption mode in which data access between the reader/writer 200A and the RFID device 10A is encrypted, and a plain text mode in which data access is performed without encrypting a plain text.

More specifically, the command processing unit 4A obtains, from the reader/writer 200A, a command for instructing data access to the RFID-embedded apparatus 100A, and processes the command. The address information included in the obtained command is stored in a predetermined region in the memory 3A. Here, as described earlier, the address information recorded in the memory 3A includes flag information indicating whether data access from the outsides to the host 20A is permitted or prohibited.

The command processing unit 4A transmits the flag information to the reader/writer 200A, before accessing the host 20A. Therefore, the reader/writer 200A can determine whether or not access to the host 20A is permitted in the tunnel mode. The command processing unit 4A may determine whether access to the host 20 is permitted or prohibited, with reference to the flag information included in the address information.

It is still further possible that the address information includes access destination information that indicates whether or not to use encryption in data access between the reader/writer 200A and the RFID device 10A. In this case, if the command processing unit 4A receives, from the reader/writer 200A, a command including access destination information indicating that encryption is to be used in data access, the command processing unit 4A encrypts data to be transmitted in contactless communication between the reader/writer 200A and the RFID device 10A. In addition, the command processing unit 4A decrypts data received in contactless communication between the reader/writer 200A and the RFID device 10A.

The processing performed by the command processing unit 4 will be described in more detail later.

FIG. 19 is a functional block of the RFID device 200A according to the present embodiment. The functional block of the reader/writer 200 according to Embodiment 1 has the same structure as that of the reader/writer 200A.

As shown in FIG. 19, the reader/writer 200A includes a display unit 222, a control unit 224, a communication unit 226, and an antenna ANT2.

The display unit 222 displays information obtained from the RFID-embedded apparatus 100A on a display screen connected to the reader/writer 200A, for example. An example of the information obtained from the RFID-embedded apparatus 100A is information corresponding to a response to a command that has been transmitted from the reader/writer 200A to the RFID-embedded apparatus 100A.

More specifically, if the RFID-embedded apparatus 100A is a home appliance, the display unit 222 obtains information indicating setting information and the like of the home appliance and displays it. It is also possible, for example, that the display unit 222 displays an image for operation in a form of Graphical User Interface (GUI) on a display device such as the display screen of the mobile phone, in order to obtain operation instructions from the user.

The control unit 224 generates a command to be transmitted to the RFID-embedded apparatus 100A via the communication unit 226. It is possible to previously determine information of a command to be generated. It is also possible to generate a command based on an operation instruction from the user which is obtained via the display unit 222.

More specifically, the control unit 224 generates a command including address information for designating a communication mode from among the contactless communication mode and the tunnel mode. It is still further possible that the control unit 224 generates address information including access destination information indicating whether or not to use encryption in data access between the reader/writer 200A and the RFID device 10A.

Furthermore, before transmitting, to the RFID-embedded apparatus 100A, a command including address information for instructing data access to the host 20A, the control unit 224 performs the following determination. In other words, before transmitting, to the RFID-embedded apparatus 100A, a command for instructing a data access in the tunnel mode, the following determination is made.

Firstly, the control unit 224 obtains, from the memory 3A in the RFID device 10A, flag information indicating whether data access from the outsides to the host 20A is permitted or prohibited. As a result, only when data access designated in a command to be transmitted to the RFID device 10A is permitted, the command is transmitted to the RFID device 10A.

For example, before transmitting, to the RFID device 10A, a command in which data reading in the tunnel mode is designated, the control unit 224 reads a value of a read flag from the memory 3A included in the RFID device 10A. Moreover, before transmitting, to the RFID device 10A, a command in which data writing in the tunnel mode is designated, a value of a write flag is read from the memory 3A included in the RFID device 10A. Only when the readout flag values indicate permission of reading or writing from/to the host 20A, the control unit 224 actually transmits a command via the communication unit 226.

According to instructions from the control unit 224, the communication unit 226 transmits the command from the antenna ANT2 to the RFID device 10A by contactless communication. The communication unit 226 receives a response to the transmitted command, from the RFID device 10A by contactless communication.

Next, with reference to FIGS. 20 and 21, the flag information indicating whether or not access to the host 20A is permitted is described in more detail. Specifically, in the tunnel mode, when the reader/writer 200A determines whether or not to access the host 20A, the flag information is referred to by the reader/writer 200A.

FIG. 20 shows combinations of a read flag and a write flag which are included in the flag information. If both the flags are 0, it means that access to the host 20 is permitted. If both the flags are 1, it means that access to the host 20 is prohibited.

As shown in FIG. 20, each of the read flag and the write flag may be 0 or 1. Therefore, there are total four kinds of combinations of these flags.

However, a combination of the read flag of 1 and the write flag of 0, such as the fourth combination shown in FIG. 20, is not actually used. This is because it is generally not expected to permit data writing and prohibit data reading.

FIG. 21 shows examples of the flag information that is set by the host 20A based on a combination of a type of the RFID-embedded apparatus 100A as a home appliance and a state of the home appliance.

For example, if the home appliance is powered OFF, the host 20A sets the flag information to permit reading and permit writing, regardless of the type of the home appliance. This is because there is no reason to restrict data access from the reader/writer 200A if power is OFF. Therefore, the user causes, for example, a mobile phone or the like including the reader/writer 200A to touch the home appliance in order to change the setting of the home appliance. For example, it is possible to set a next selection reservation for a washing and drying machine or a rice cooker. Furthermore, it is possible to add a new recipe to a microwave. It is also possible to change a temperature setting of a refrigerator.

On the other hand, if the home appliance is powered ON (waiting), the host 20A is basically considered as setting the same flag information as that in the case where the home appliance is OFF. However, regarding a refrigerator, if power is ON, the refrigerator is considered as always operating, so that the flag information is not set in FIG. 21.

Furthermore, if the home appliance is powered ON (operating), the host 20A is considered as setting flag information to permit reading and prohibit writing for the washing and drying machine. This is because that a remaining washing/drying time and the like can be read from the washing and drying machine although the setting is not able to be changed during operation.

Likewise, if the home appliance is powered ON (operating), the host 20A is considered as setting the flag information to prohibit reading and prohibiting writing for a microwave or a rice cooker. The microwave outputs strong electromagnetic waves during operating. The rice cooker would emit steam or the like during operating. Therefore, if the reader/writer 200A is taken close to such a currently-operating home appliance, the reader/writer 200A would operate improperly, for example. The host 20A according to the present embodiment prohibits any access from the reader/writer 200A to prevent such improper operations and the like.

Furthermore, if the home appliance is powered ON (operating), the host 20A is considered as setting flag information to permit reading and permit writing for a refrigerator. This is because any trouble does not occur in a refrigerator even if the setting is changed or read out during its operation.

Figure 22:
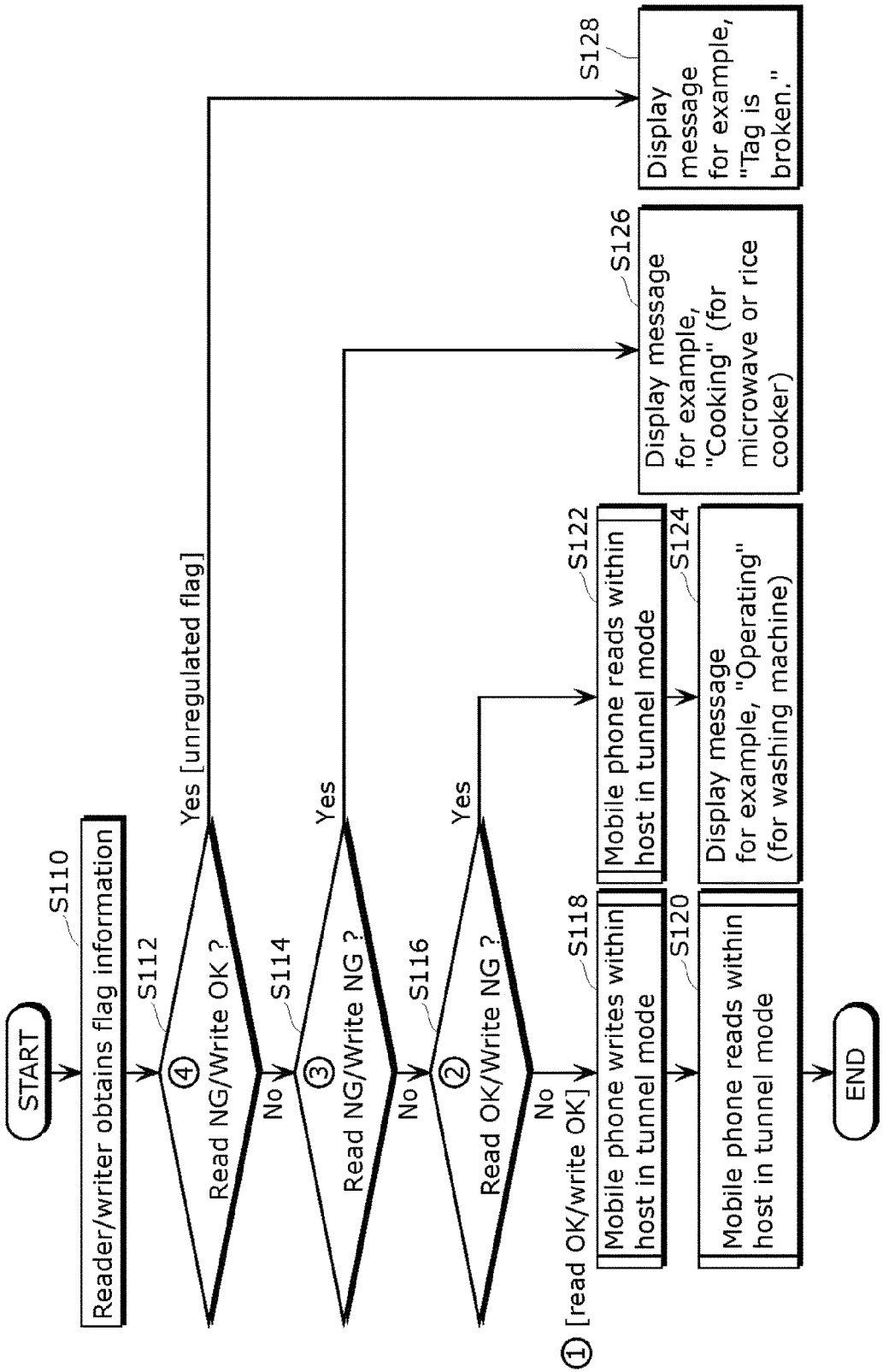
FIG. 22 is a flowchart of processing performed by the reader/writer to transmit a command to the RFID-embedded apparatus to execute data access in a tunnel mode according to Embodiment 2.

Next, with reference to FIG. 22, the processing performed by the reader/writer 200A to access the RFID-embedded apparatus 100A in the tunnel mode is described.

FIG. 22 shows a flow of processing performed by the reader/writer 200A included in a mobile phone to transmit a command for accessing the RFID-embedded apparatus 100A in a home appliance in the tunnel mode.

Before transmitting a command to the RFID-embedded apparatus 100A by designating the tunnel mode, the reader/writer 200A firstly obtains the flag information from the RFID-embedded apparatus 100A (S110). More specifically, the control unit 224 in the reader/writer 200A obtains address information from a predetermined region in the memory 3A. Furthermore, the control unit 224 obtains the flag information included in the address information and determines a value of the read flag and a value of the write flag.

As a result of the determination, if the flag information indicates that reading is prohibited and writing is permitted (Yes at S112), then the display unit 222 displays a message on a display screen of the mobile phone as an unregulated flag (S128). Indication in the message is, for example, information or the like indicating a possibility that the RFID device 10A is broken down.

As a result of the determination, if the flag information indicates that reading is prohibited and writing is prohibited (No at S112 and Yes at S114), then the control unit 224 determines that any access to the host 20A is prohibited. Therefore, the display unit 222 displays, on the display screen of the mobile phone, information or the like indicating that the target home appliance is currently operating and access to the target home appliance is impossible (S126).

As a result of the determination, if the flag information indicates that reading is permitted and writing is prohibited (No at S114 and Yes at S116), then the control unit 224 determines that only reading from the host 20A is possible. Therefore, the control unit 224 reads data from the host 20A in the tunnel mode as needed (S122). If user has instructed data writing, the display unit 222 displays, on the display screen of the mobile phone, information or the like indicating that the target home appliance is currently operating and access to the target home appliance is impossible (S124).

As a result of the determination, if the flag information indicates that reading is permitted and writing is permitted (No at S116), then the control unit 224 determines that reading from the host 20A and writing to the host 20A are possible. Therefore, the control unit 224 writes data into the host 20A in the tunnel mode (S118). Furthermore, the control unit 224 reads data from the host 20A as needed (S120).

Figure 23:
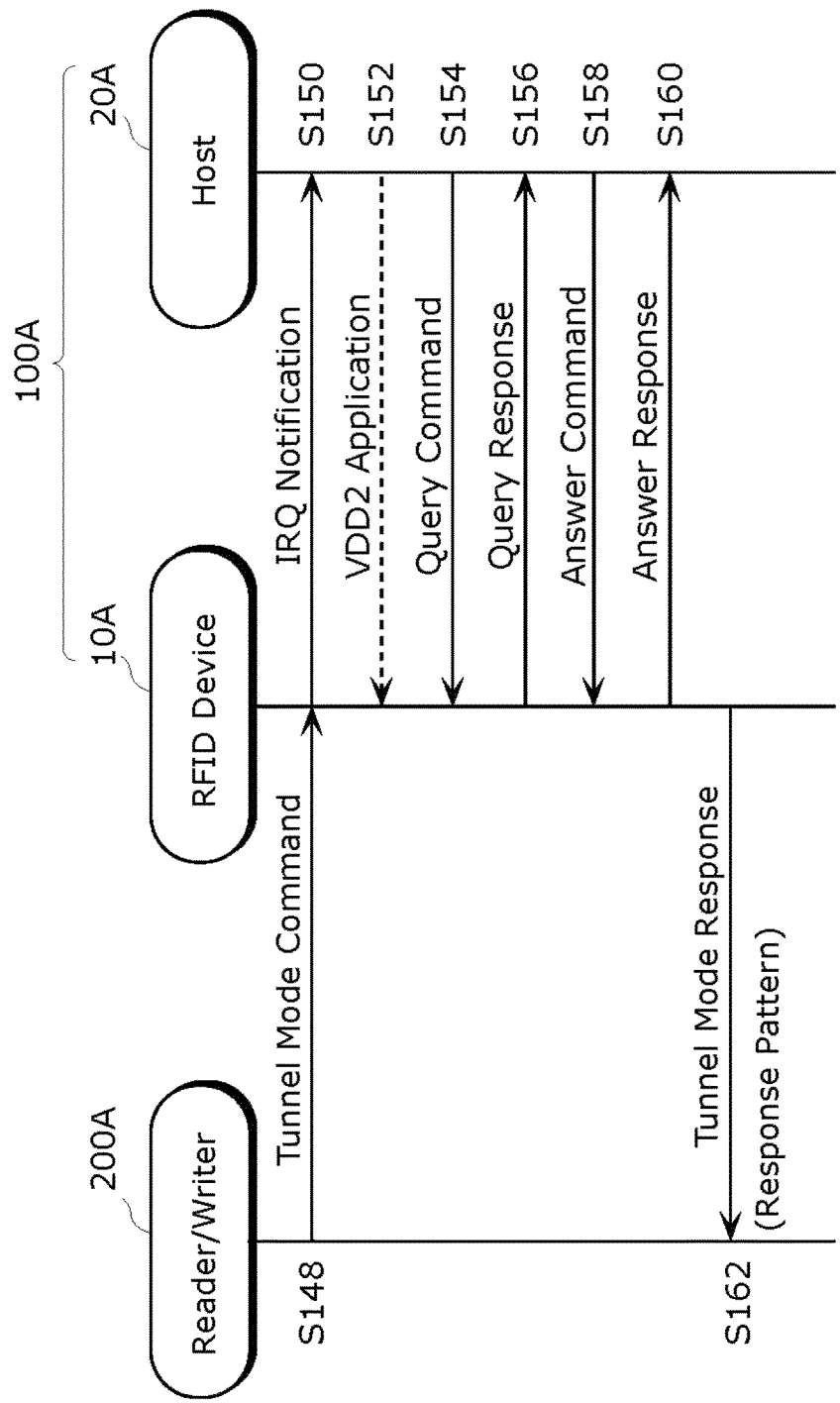
FIG. 23 is a flowchart of processing sequence performed by the reader/writer and the RFID-embedded apparatus in the tunnel mode according to Embodiment 2.

FIG. 23 shows a processing sequence in the tunnel mode between the reader/writer 200A and the RFID-embedded apparatus 100A.

When the reader/writer 200A transmits a command to the RFID-embedded apparatus 100A by designating the tunnel mode (S148), then the RFID device 10A receiving the command issues an interrupt signal (IRQ) to the host 20A (S150).

In receiving the interrupt signal, the host 20A supplies power (VDD2) to the RFID device 10A (S152).

More specifically, if it is determined that the communication mode is the second communication mode, the command processing unit 4A notifies the determination result to the host 20A via the contact interface 2. The host 20A obtaining the notification supplies driving power (VDD2) to the RFID device 10A.

Subsequently, the host 20A transmits, to the RFID device 10A, a query command for inquiring a demand (S154).

When receiving the query command, the RFID device 10A transmits, to the host 20A, a query response for notifying the demand received form the reader/writer 200A (S156).

Next, the host 20A transmits, to the RFID device 10A, an answer command in response to the demand received as the query response (S158).

The RFID device 10A receiving the answer command transmits an answer response as an acknowledgement to the host 20A (S160).

Finally, the RFID device 10A transmits, to the reader/writer 200A, an answer obtained from the host 20A according to the answer command, as a tunnel mode response (S162).

Here, after obtaining the tunnel mode response at step S162, the reader/writer 200A may display a message corresponding to the obtained tunnel mode response on, for example, the display screen of the mobile phone.

FIG. 24 shows examples of a message which the reader/writer 200A displays on the display screen according to a tunnel mode response.

The reader/writer 200A does not display a message, if the obtained tunnel mode response is a correct response to the command transmitted at step S148.

On the other hand, if the tunnel mode response is not obtained from the RFID device 10A after over a predetermined time has passed, the reader/writer 200A may display a message persuading to power the home appliance ON to perform the operation once more. Reasons of failing to receive a response from the RFID-embedded apparatus 100A would be (i) that the home appliance is powered OFF, (ii) that the home appliance is broken down, and the like.

When the reader/writer 200A receives a tunnel mode response including error information from the RFID-embedded apparatus 100A, the reader/writer 200A may display a message indicating that error occurs. Reasons of receiving such error information would be (iii) that the operating state of the home appliance is changed so as to change the read flag originally permitting reading or the write flag originally permitting writing to prohibit reading/writing, (iv) that a command in an incorrect format is received, and the like.

With reference to FIGS. 25 and 26, the following describes the reading and the writing performed by the reader/writer 220A in more detail.

FIG. 25 shows a flow of processing performed by the reader/writer 200A to read data from the host. More specifically, the step S120 or S122 in FIG. 22 is described in more detail.

The reader/writer 200A examines the flag information. If the read flag is 1, the reader/writer 200A transmits, to the RFID-embedded apparatus 100A, a read command for reading data from the host 20A in the tunnel mode (S180).

If the reader/writer 200A does not receive a response from the host 20A after that (Yes at S182), then the display unit 222 included in the reader/writer 200A displays, on the display screen of the mobile phone for example, a message for persuading to power the home appliance ON and perform the operation once again (S190).

On the other hand, if a response is received from the host 20A (No at S182), then the control unit 224 examines the information of the response. After a result of the examination, if the response from the host 20A is an error response including error information (Yes at S184), then the display unit 222 displays, on the display screen of the mobile phone, a message indicating that an error occurs in reading (S188).

On the other hand, as a result of the examination, if the response from the host 20A is a correct response (No at S186), the control unit 224 reads data from the host 20A (S186).

Next, FIG. 26 shows a flow of processing performed by the reader/writer 200A to write data from the host. More specifically, the step S118 in FIG. 22 is described in more detail.

The reader/writer 200A examines the flag information. If the write flag is 0, then the reader/writer 200A transmits a write command for writing data into the host 20 in the tunnel mode (S210).

If the reader/writer 200A does not receive a response from the host 20A after that (Yes at S212), then the display unit 222 included in the reader/writer 200A displays, on the display screen on the mobile phone for example, a message for persuading to power the home appliance ON and perform the operation once again (S220).

On the other hand, if a response is received from the host 20A (No at S212), then the control unit 224 examines the information of the response. After a result of the examination, if the response from the host 20A is an error response including error information (Yes at S214), then the display unit 222 displays, on the display screen of the mobile phone, a message indicating that an error occurs in writing (S218).

On the other hand, as a result of the examination, if the response from the host 20A is a correct response (No at S214), the control unit 224 writes data to the host 20A (S216).

Figure 27:
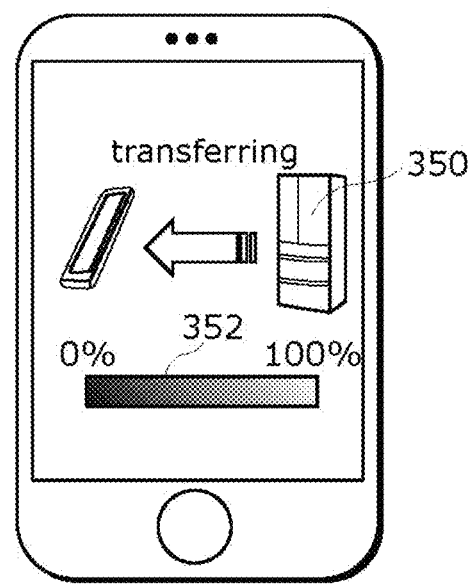
FIG. 27 is a diagram showing an example of a display screen of a mobile phone having a reader/writer.

FIG. 27 shows an example of the display screen of the mobile phone including the reader/writer 200A. The display unit 222 displays, on the display screen of the mobile phone, an image showing how data reading from a refrigerator to the mobile phone is progressing.

Here, the display unit 222 may change the image of the home appliance to be displayed on the display screen, with reference to the type of the host 20A which is included in the address information. For example, if the address information includes information indicating a washing and drying machine as the type of the host 20A, it is possible to display the image of the washing and drying machine instead of the image 350 of the refrigerator.

If the address information includes information of a size of data to be transferred as described above, the display unit 222 may calculate, as a progress degree, a ratio of a transferred data size to a to-be-transferred data size. In this case, the display unit 222 may display the calculated progress degree as a progress bar 352, for example.

As described above, the RFID-embedded apparatus 100A and the reader/writer 200A according to the present embodiment can encrypt communication in the tunnel mode between the reader/writer 200A and the RFID-embedded apparatus 100A as needed.

Furthermore, the host 20A can control accesses from the reader/writer 200A. As a result, if it is not desirable that the reader/writer 200A accesses the host 20A, the host 20A can designate prohibition of reading/writing.

It should be noted that the RFID-embedded apparatus 100A and the reader/writer 200A may have only one of the encryption/plain text selection and the access control function for the host 20A.

It should also be noted that it has been described in the above-described Embodiments 1 and 2 that the one-bit parameter corresponding to an address of a contactless communication command is used to switch between the contactless communication mode and the tunnel mode, but a plurality of bits may be used for the switching. For example, it is also possible that the higher-order two bits are set to "00", "10", or "01" to indicate the contactless communication mode, and set to "11" to indicate the tunnel mode, so that a memory space is set by an appropriate different size.

It should also be noted that the parameter for distinguishing between the contactless communication mode and the tunnel mode may be any other parameter rather than the parameter described in Embodiments 1 and 2. For example, the parameter is a file identifier in ISO/IEC7816 standard, and the parameter is a service number in JISX6319-4 standard.

Embodiment 1 describes two cases: the case where the contactless interface conforms to ISO/IEC14443 standard and the command specification conforms to ISO/IEC7816-4 standard, and the case where the contactless interface and the command specification conform to JISX6319-4 standard. However, the contactless interface specification and the command specification are not limited to the above. For example, the contactless IF 1 in the RFID device 10 may have functions of both standards to conform to various contactless communication standards. In this case, the command processing unit 4 may appropriately convert a command, and set only one kind of the command specification which is to be processed in the tunnel mode as shown in FIGS. 10A and 10B, regardless of the communication standards of the contactless interface. Therefore, the host 20 can operate according to one standard without distinguishing differences among the contactless communication standards. As a result, software in the host 20 can be simplified.

It should be noted that the contact interface is UART in Embodiments 1 and 2, but may be a different serial interface such as SPI or I2C. In shot, the type of the contact interface is not specifically limited in the present invention.

It should also be noted that the power-supply voltage VDD has been described as being supplied from the host, but may be applied directly from a power supply circuit.

As shown in FIGS. 12 and 13, after data access from the RFID device 10 (in other words, data transmission to the RFID device 10 or data receiving from the RFID device 10) is completed, the reader/writer 200 according to Embodiment 1 designates the tunnel mode and notifies the host 20 of the designation. Here, if the host 20 is powered OFF in steps SC in FIG. 12 or step SE in FIG. 13, for example, the reader/writer 200 may perform the steps SC and SE firstly in a next data access. Therefore, even if the power supply to the host 20 is stopped, the reader/writer 200 can meditate communication between the reader/writer 200 and the RFID-embedded apparatus 100.

It should be noted that it has been described in Embodiments 1 and 2 that each of the read flag and the write flag included in the flag information has two kinds of states which are prohibition and permission as an example. However, a flag indicating a different state may be set. For example, a stop flag may be set. As described previously, getting the reader/writer close to the home appliance that is currently operating would cause improper operation or the like in the home appliance. Therefore, if the stop flag is set as the flag information and the reader/writer is close to the RFID-embedded apparatus by a predetermined distance, the reader/writer may transmit a stop command, to the home appliance, which instructs the home appliance to stop the operation. The RFID-embedded apparatus receiving the stop command may stop the operation immediately, and be changed to a waiting state.

The following describes, in more detail, the structure of the RFID-embedded apparatus according to the present embodiment to control data access from the outsides to be permitted or prohibited depending on an operation state of the host.

Figure 28:
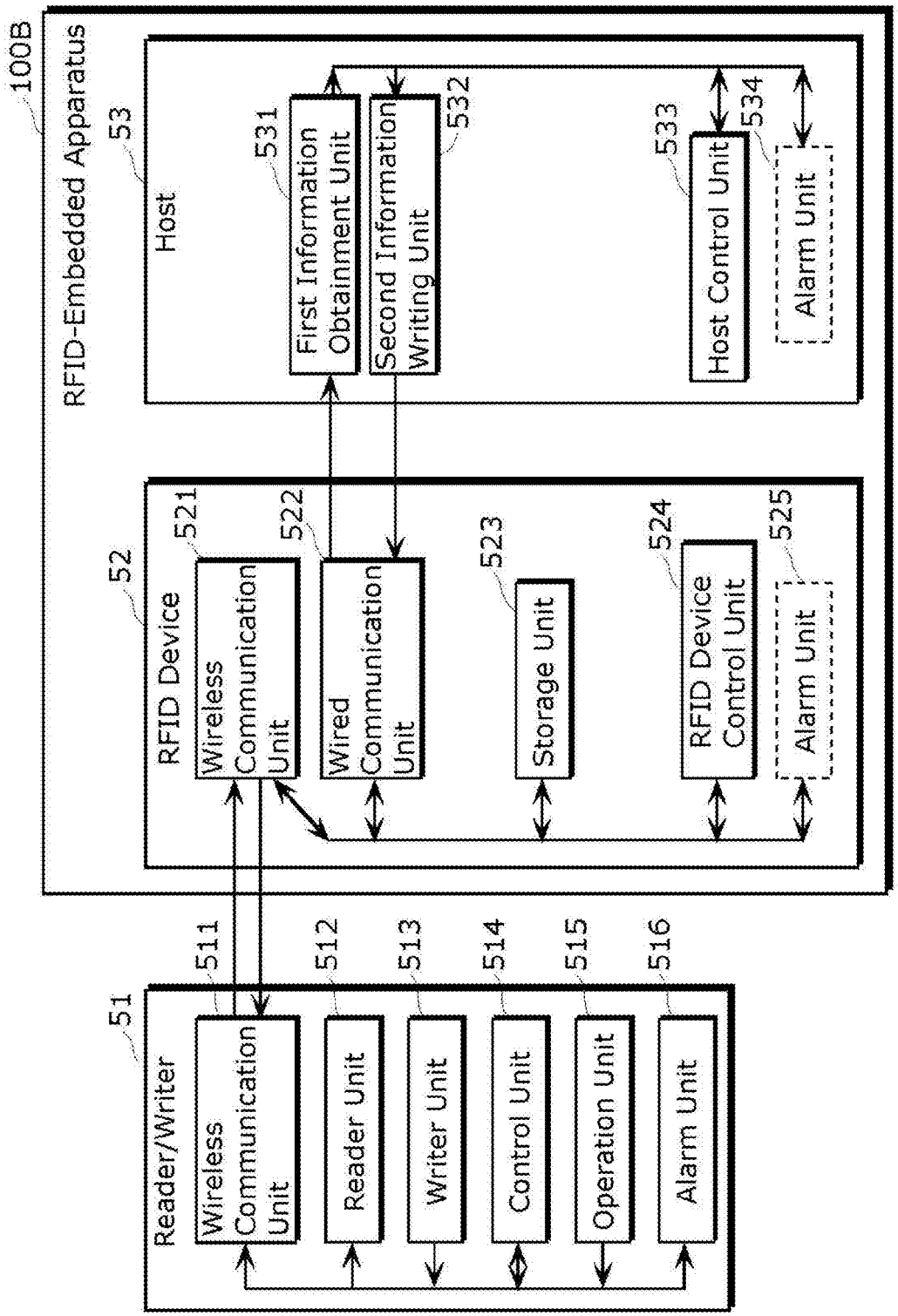
FIG. 28 is a block diagram showing a configuration of a wireless communication system according to a variation of the present invention.

FIG. 28 is a diagram showing an overall configuration of a wireless communication system including an RFID-embedded apparatus 100B according to a variation of the present embodiment.

The wireless communication system shown in FIG. 28 includes: a reader/writer 51 as an electronic tag reader/writer; and the RFID-embedded apparatus 100B. The RFID-embedded apparatus 100B includes: an RFID device 52 including an electronic tag; and a host 53. Hereinafter, the RFID device is referred to also as an RFI unit, and the host is referred to also as a host unit.

The reader/writer 51 and the RFID device 52 communicate each other by wireless communication. For example, the reader/writer 51 is a mobile phone that reads and writes information from/to the RFID device by contactless communication.

The RFID device 52 and the host 53 are connected to each other by wired communication. For example, it is also possible that the RFID device 52 is embedded in the main body of the host 53, a remote controller for the host 53, an AC power source adaptor, and the like.

The reader/writer 51 includes a wireless communication unit 511, a reader unit 512, a writer unit 513, a control unit 514, an operation unit 515, and an alarm unit 516.

The wireless communication unit 511 wirelessly communicates with the RFID device 52. An example of the wireless communication unit 511 is a wireless communication module including an electronic tag.

The reader unit 512 reads information from the storage unit 523 in the RFID device 52 via the wireless communication unit 511.

The writer unit 513 writes desired information to the storage unit 523 in the RFID device 52 via the wireless communication unit 511.

The control unit 514 controls the above-described wireless communication unit 511, reader unit 512, and writer unit 513 in order to perform reading control and writing control for the RFID device 52.

The operation unit 515 is a user interface used to designate information which the user intends to read from the RFID device 52 in the above-described reading control. In the above-described writing control, the operation unit 515 is used also by the user to input information to be written to the RFID device 52.

The alarm unit 516 displays information read from the RFID device 52 in the above-described reading control. The alarm unit 516 displays, to the user, the information which the user inputs in the above-described writing control.

It should be noted that the wireless communication unit 511, the reader unit 512, and the writer unit 513 may be integrated into a single module. It is also possible that the operation unit 515 and the alarm unit 516 are integrated into one module such as a touch panel.

With the above-described configuration, the reader/writer 51 wirelessly communicates with the RFID device 52 to read information from the storage unit 523 in the RFID device 52. Furthermore, the reader/writer 51 writes desired information to the storage unit 523 in the RFID device 52. Then, the reader/writer 51 controls the RFID device 52 and the host 53 connected by wire to the RFID device 52.

The RFID device 52 includes a wireless communication unit 521, a wired communication unit 522, a storage unit 523, an RFID device control unit 524, and an alarm unit 525.

The wireless communication unit 521 wirelessly communicates with the RFID device 51. An example of the wireless communication unit 521 is a wireless communication module.

The wired communication unit 522 wirelessly communicates with the host 53. An example of the wired communication unit 522 is a wired communication module.

The storage unit 523 holds information to be stored in the RFID device 52. The reader/writer 51 performs reading/writing processing for the storage unit 523 via the wireless communication unit 521. The host 53 performs reading/writing processing for the storage unit 523 via the wired communication unit 522.

The RFID device control unit 524 controls the above-described wireless communication unit 521, wired communication unit 522, and storage unit 523 to control the reading/writing processing for the storage unit 523. The RFID device control unit 524 also controls the processing performed by the RFID device 52.

The alarm unit 525 displays information which the above-described RFID device 52 reads from the storage unit 523. The alarm unit 525 also displays information written in the storage unit 523.

It should be noted that the wireless communication unit 521, the wired communication unit 522, the storage unit 523, and the RFID device control unit 524 may be implemented into a single module. The alarm unit 525 is not essential in the RFID device 52. Therefore, the RFID device 52 may not include the alarm unit 525.

Hereinafter, in functional blocks in the figures, a block shown by a broken line, such as the alarm unit 525, is not an essential structural element.

As described above, the RFID device 52 communicates with the reader/writer 51 and the host 53 so as to perform data writing/reading for the storage unit 523 included in the RFID device 52. Then, as described later, the reader/writer 51 writes data to the storage unit 523 in the RFID device 52 to control the host 53.

The host 53 includes a first information obtainment unit 531, a second information writing unit 532, a host control unit 533, and an alarm unit 534.

The first information obtainment unit 531 performs wired communication with the RFID device 52 to obtain information from the storage unit 523 in the RFID device 52. In the present embodiment, for the sake of description simplicity, the information which the host 53 obtains from the storage unit 523 in the RFID device 52 is referred to as the first information.

The first information includes initialization information, control information, and the like of the host 53. The first information may be an error state information request signal that is a signal for obtaining error state information such as error state information of the host 53.

The second information writing unit 532 performs wired communication with the RFID device 52 to write information into the storage unit 523 in the RFID device 52. In the present embodiment, for the sake of description simplicity, the information which the host 53 writes into the storage unit 523 in the RFID device 52 is referred to as the second information.

The second information includes information indicating a result of control performed based on the first information, information indicating a response to processing requested in the first information, and the like. The second information also includes information, such as a use history of an electrical apparatus, which is transmitted to the reader/writer 51 at regular intervals regardless of the first information.

The host control unit 533 controls the above-described first information obtainment unit 531 and second information writing unit 532 to cause data obtainment and data writing between the host 53 and the RFID device 52. Of course, the host control unit 533 may control other functions of the host 53.

Under the above-described control of the host 53, the alarm unit 534 displays, to a user of the host 53, the information read from the storage unit 523. Furthermore, the alarm unit 534 displays, to the user of the host 53, the information written into the storage unit 523.

It should be noted that the alarm unit 534 is not essential in the host 53. Therefore, the host 53 may not include the alarm unit 534.

It should also be noted that the first information obtainment unit 531, the second information writing unit 532, and the host control unit 533 may be implemented into a single module.

With the above structure, the host 53 communicates with the RFID device 52 to obtain and write information from/to the storage unit 523 in the RFID device 52.

As described later, the information (the first information) to be obtained from the storage unit 523 in the RFID device 52 includes control information of the host 53. The information (the second information) to be written into the storage unit 523 in the RFID device 52 includes state information of the host 53.

An example of processing performed by the above-described reader/writer 51, RFID device 52, and host 53 is described with reference to a flowchart of FIG. 29.

Firstly, after communication between the wireless communication unit 511 in the reader/writer 51 and the wireless communication unit 521 in the RFID device 52 becomes possible at step S501, the first information is written from the writer unit 513 in the reader/writer 51 into the storage unit 523 in the RFID device 52. Here, indication of the first information is determined, for example, by a user of the reader/writer 51 operating the operation unit 515.

Subsequently, the first information obtainment unit 531 in the host 53 transmits an information request signal to the RFID device 52 via the wired communication unit 522 of the RFID device 52. The information request signal is used to examine whether or not new first information is written into the storage unit 523 in the RFID device 52. The host 53 regularly transmits the information request signals to the RFID device 52.

Here, if the new first information is written, then the first information obtainment unit 531 obtains the new first information (step S502). When a specific event occurs, the host 53 may transmit the information request signal to the RFID device 52 to communicate to check the new first information, instead of regularly transmitting the information request signals.

The first information which the first information obtainment unit 531 newly obtains includes the control information of the host 53. According to the control information, the host control unit 533 controls the host 53 (step S503).

At step S504, the second information writing unit 532 writes new second information into the storage unit 523 of the RFID device 52 via the wired communication unit 522 of the RFID device 52. The second information includes the state information of the host 53 which is a result of the apparatus control performed at step S503. This is also a response information in response to the first information at step S502.

Then, after communication between the wireless communication unit 511 in the reader/writer 51 and the wireless communication unit 521 in the RFID device 52 becomes possible at step S505, the reader unit 512 in the reader/writer 51 examines whether or not new second information is written into the storage unit 523 of the RFID device 52. As a result, if new second information is written, the reader unit 512 reads the information.

At step S506, the alarm unit 525 displays the state information of the apparatus which is included in the obtained second information. As a result, the user of the reader/writer 51 checks the state information of the host 53 which is displayed on the alarm unit 525 and therefore learns the response state as a result of the operation using the operation unit 515.

In addition, at step S507, the host 53 causes the alarm unit 534 in the host 53 to notify the result of the apparatus control performed at step S503.

As described above, according to the RFID-embedded apparatus 100B according to the variation of the present invention, when the first information is transmitted to the host 53 connected to the RFID device 52 so as to perform control, the first information is written from the reader/writer 51 to the RFID device 52. Furthermore, when the reader/writer 51 obtains the second information that is information of the host 53, the second inflammation is read from the RFID device 52. Therefore, it is possible to implement a wireless communication system capable of bi-directional communication with a lower cost and more space-saving in comparison to a system in which the host 53 is provided with an RFID reader device.

Figure 29:
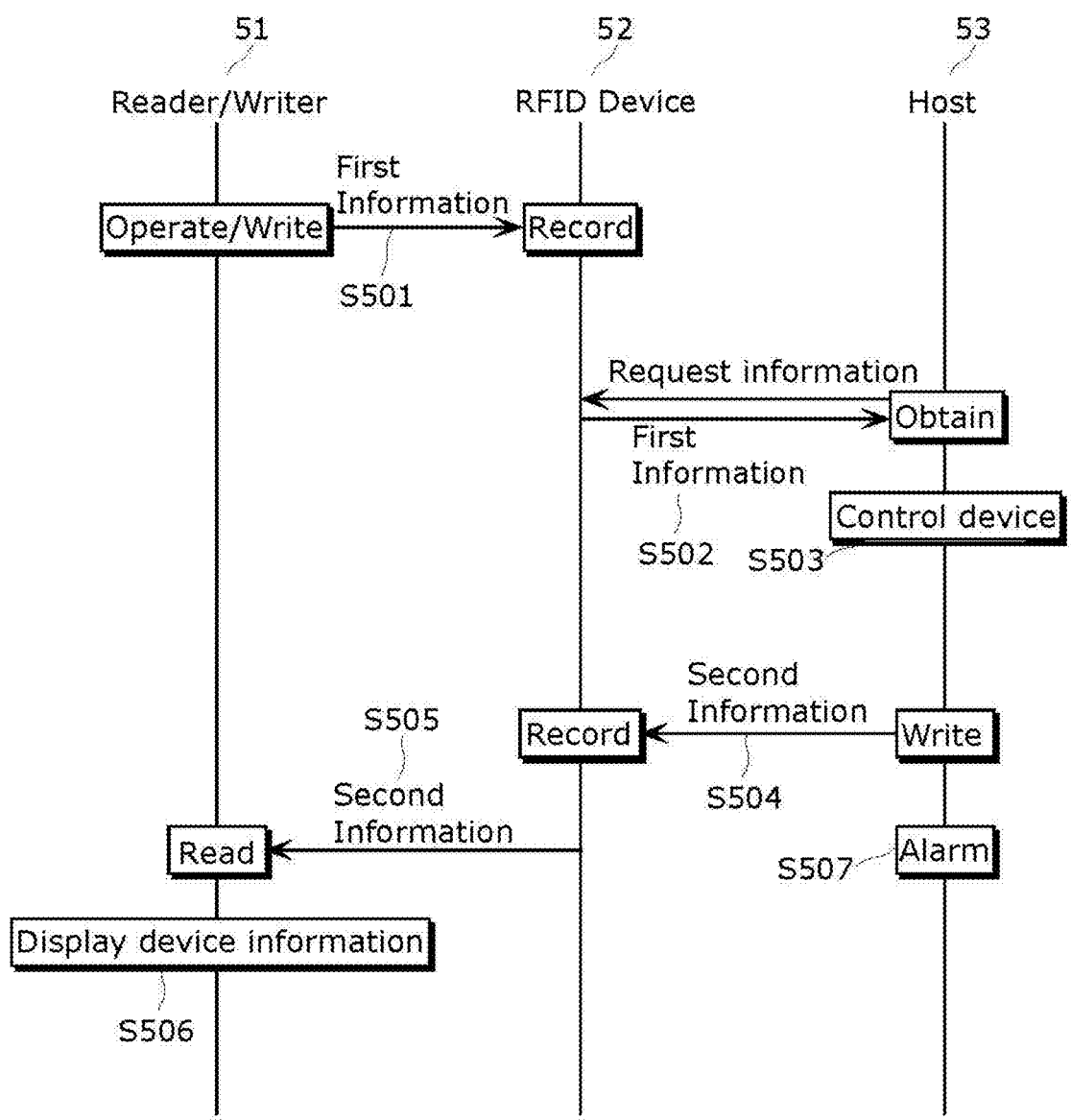
FIG. 29 is a flowchart for explaining processing performed by the wireless communication system according to the variation of the present invention.

It should be noted in FIG. 29 that the steps S501 to S503 where the reader/writer 51 controls the host 53 via the RFID device 52 and the steps S504 to S506 where the reader/writer 51 notifies the state information of the host 53 via the RFID device 52 are described as a series of steps.

Here, the method by which the reader/writer 51 controls the host 53 via the RFID device 52 may include the steps S501 to S503 and step S507 only, without including the steps S504 to S506.

It should also be noted that the method may include the steps S504 to S506 only, if the reader/writer 51 merely notifies the state information of the host 53 via the RFID device 52.

Here, the first information is not limited to the control signal of the host 53. For example, the first information may be a request signal for requesting information of a current operating state of the host 53.

In the above-described variation, the reader/writer 51 writes the first information to the RFID device 52 (step S501 in FIG. 29). After that, the host 53 obtains the first information (step S502). Next, the second information including the response information is written from the host 53 to the RFID device 52 (step S504). After that, the reader/writer 51 reads the second information (step S505).

On the other hand, the host 53 is not capable of detecting when the first information is written into the RFID device 52. Therefore, at step S502, the RFID-embedded apparatus 100B performs communication using an information request between the host 53 and the RFID device 52 so as to regularly examine whether or not there is new first information. The following describes another variation of the present invention in consideration of the above aspect.

Figure 30:
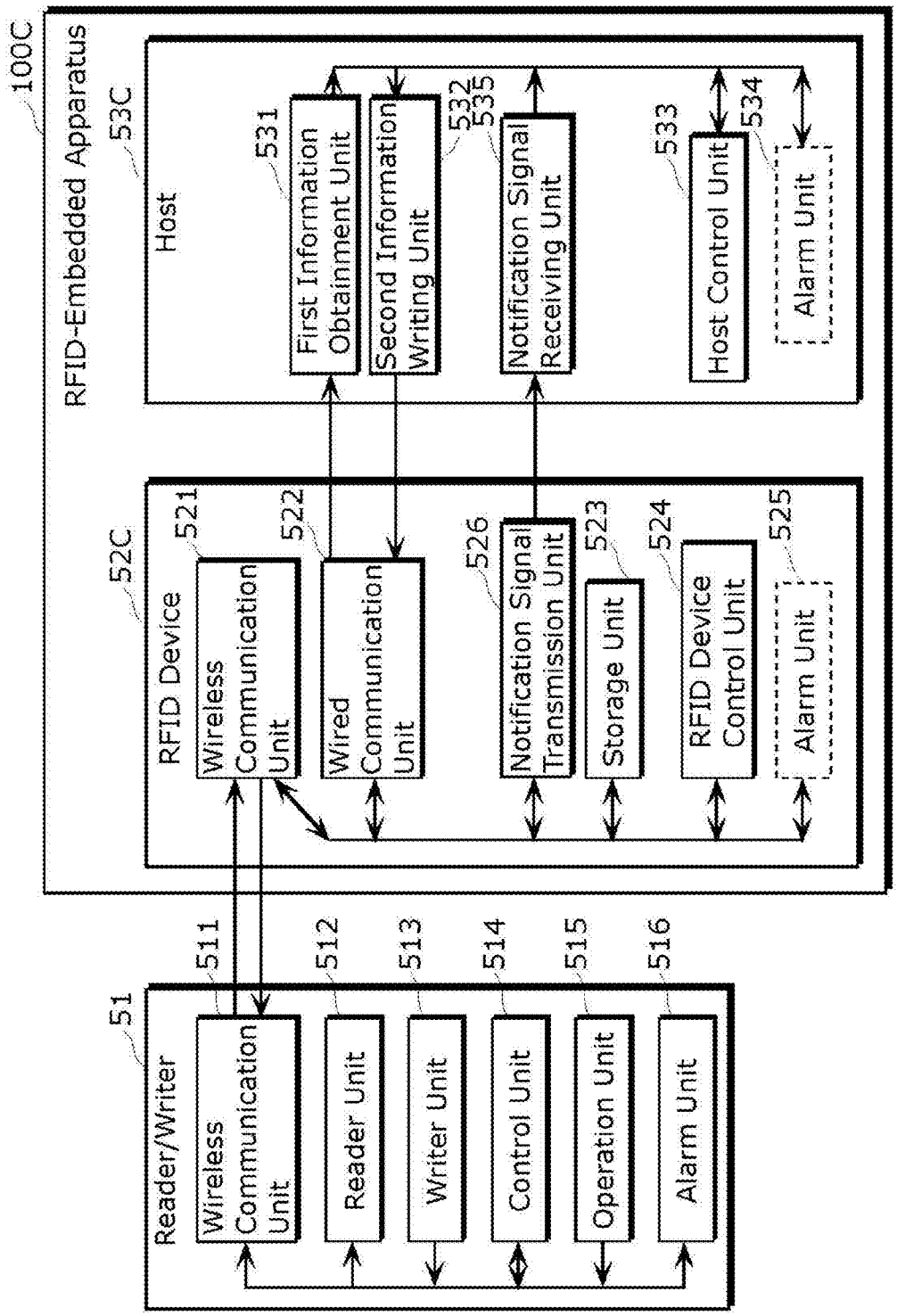
FIG. 30 is a block diagram showing a configuration of a wireless communication system according to another variation of the present invention.

FIG. 30 is a diagram showing an overall configuration of a wireless communication system including an RFID-embedded apparatus 100C according to the other variation of the present embodiment. The same elements as those in FIG. 28 are not described again.

As shown in FIG. 30, an RFID device 52C includes a notification signal transmission unit 526. In addition, a host 53C includes a notification signal receiving unit 535.

The notification signal transmission unit 526 detects that the first information is written into the storage unit 523 in the RFID device 52C, and transmits notification signal information (interrupt signal) to the host 53C. The notification signal information is actually an interrupt signal to a CPU in the host 53C. Therefore, the notification signal information corresponds to the IRQ notification shown in FIG. 23.

The notification signal receiving unit 535 receives the notification signal information from the RFID device 52C to invoke the first information obtainment unit 531.

An example of the processing is described with reference to a flowchart of FIG. 31.

Figure 31:
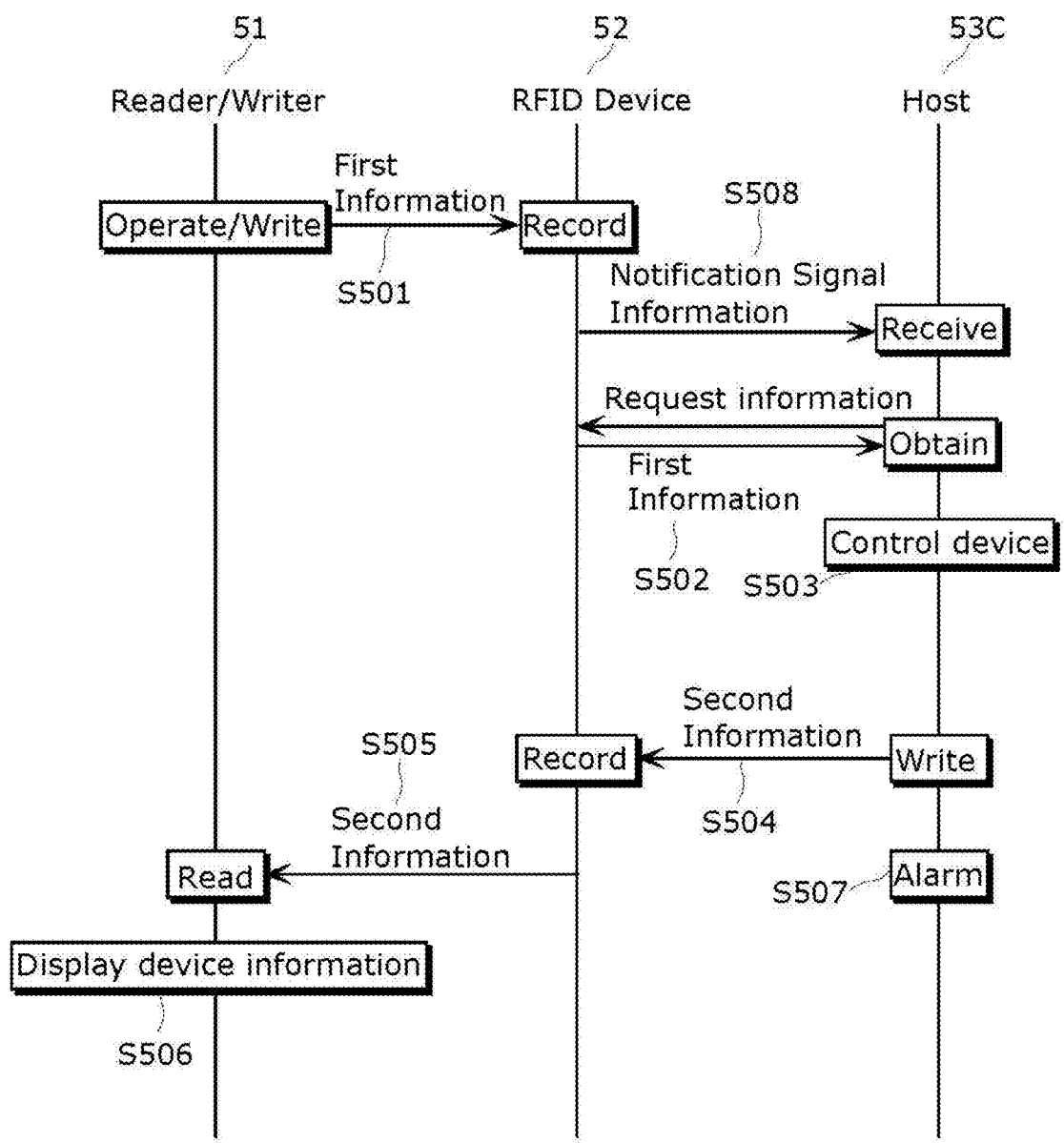
FIG. 31 is a flowchart for explaining processing performed by the wireless communication system according to the other variation of the present invention.

In FIG. 31, the step S501 is the same as that in the variation shown in FIG. 29. More specifically, firstly, it is assumed that communication between the wireless communication unit 511 in the reader/writer 51 and the wireless communication unit 521 in the RFID device 52C is possible. Next, the user of the reader/writer 51 operates the operation unit 515 to cause the writer unit 513 in the reader/writer 51 to write the first information to be stored into the storage unit 523 in the RFID device 52C.

At step S508, when new first information is written into the storage unit 523 in the RFID device 52C, the notification signal transmission unit 526 in the RFID device 52C issues notification signal information to the host 53C.

The notification signal receiving unit 535 in the host 53C receives the notification signal information and thereby immediately detects that the new first information is written into the storage unit 523 in the RFID device 52C.

Subsequently, as shown in FIG. 29, at step S502, the first information obtainment unit 531 in the host 53C transmits an information request signal to the RFID device 52C via the wired communication unit 522 of the RFID device 52C so as to request the storage unit 523 in the RFID device 52C to provide the new first information. If the new first information is written in the RFID device 52C, then the first information obtainment unit 531 obtains the information.

As described above, the notification signal information allows the host 53C to detect that the first information is written from the reader/writer 51 to the RFID device 52C. Therefore, the host 53C can immediately obtain the first information and perform operation according to the first information.

In the above-described variation, the notification signal transmission unit 526 transmits the notification signal information to the host 53C every time the first information is detected as written into the storage unit 523 in the RFID device 52C. However, the notification signal transmission unit 526 may determine whether or not to transmit the notification signal information, depending on the indication of the first information. The writer unit 513 in the reader/writer 51 may designate, in the first information, whether or not to transmit the notification signal information, and write the designation into the storage unit 523 in the RFID device 52C.

Therefore, the following selective processing is possible. If indication of the first information is to be immediately notified to the host 53C, the notification signal information is transmitted. Otherwise, the notification signal information is not transmitted.

It should be noted that the first information may include a control signal (set signal) that is a signal for controlling the host 53C, and a state obtainment signal (get signal) that is a signal for obtaining the latest state of the host 53C. The reader/writer 51 is capable of selectively use three kinds of the first information including the control signal and the state obtainment information, depending on operation of the user.

With reference to FIG. 31, the first information including the control signal only has been described. On the other hand, in the case of the first information including the state obtainment information only, as shown in FIG. 31, the step S503 is eliminated, and at step 502, the state information of the host 53C is transmitted as the second information. The subsequent processing is the same as that in FIG. 31.

It should be noted that in the case of the first information including the state obtainment information only, at step S502 in FIG. 31, the information of the host 53C is included in the second information to be transmitted. The second information including the information of the host 53C may not to be transmitted when the first information includes the control signal only. The subsequent processing is the same as that in FIG. 31.

It should be noted in the above-described variation that the steps S501 to S503 where the reader/writer 51 controls the host 53C via the RFID device 52C and the steps S504 to S506 where the reader/writer notifies the state information of the host 53C as response information in response to the control are described as a series of steps. However, as shown in the flowchart of FIG. 32, the steps S541, S551, and S561 may be inserted before the steps S501 to S506.

More specifically, the following is also possible. At step S501, the user of the reader/writer 51 operates the operation unit 515. Then, before writing the first information for controlling the host 53C into the RFID device 52C, the third information indicating the state of the host 53C is firstly read (step S541, S551). After that, the alarm unit 516 in the reader/writer 51 displays the state information of the 53C (step S561).

Figure 32:
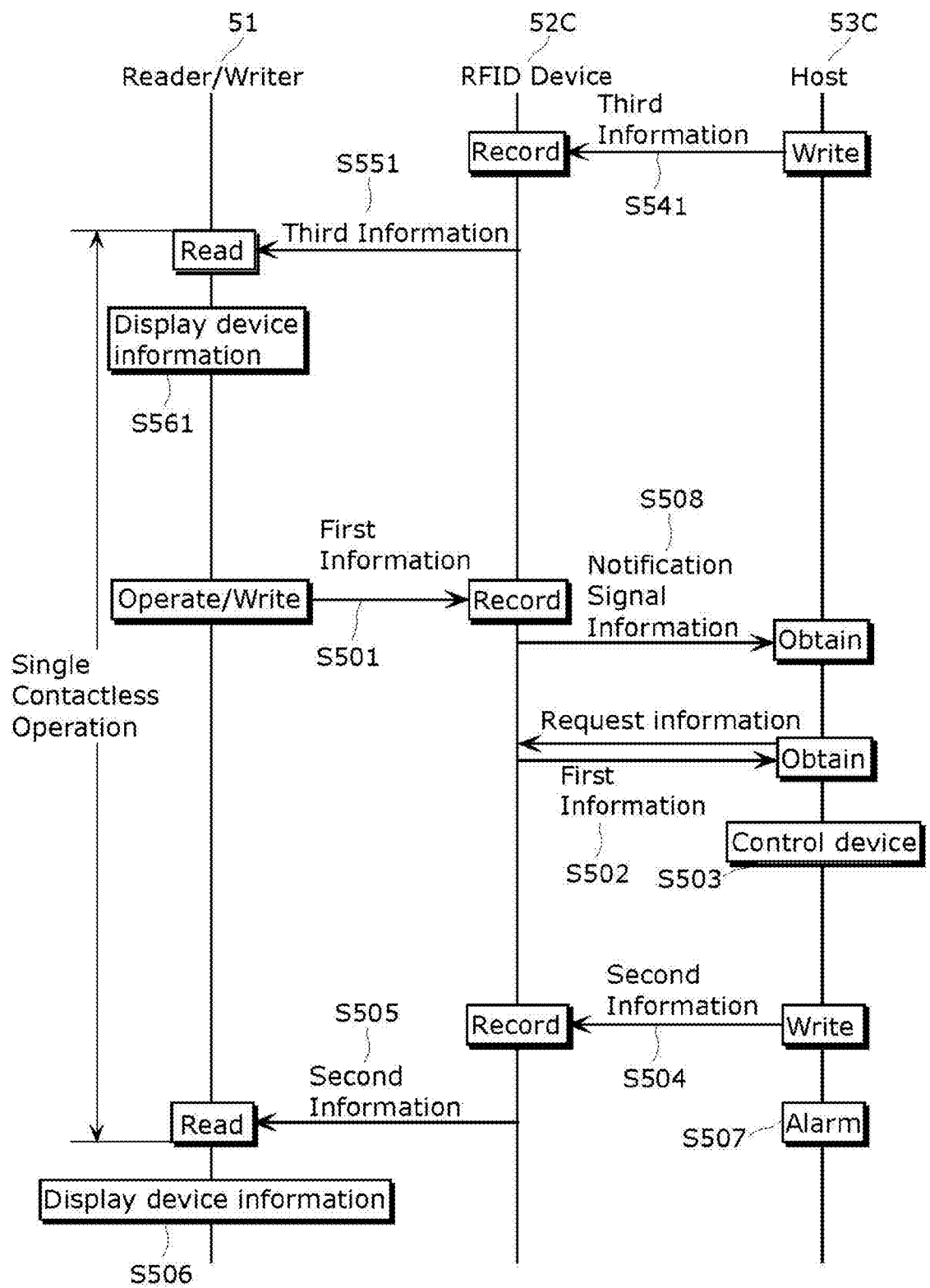
FIG. 32 is a flowchart for explaining processing performed by a wireless communication system according to still another variation of the present invention.

In particular, in the case where wireless communication between the reader/writer 51 and the RFID device 52C is near-field communication such as contactless communication, in FIG. 32, the series of steps S551 to S505 is performed in single near-field operation. As a result, the apparatus can be controlled smoothly. Therefore, if, for example, the host 53C is to be controlled after the user checks the internal state of the host 53C, the usability is increased. Here, the near-field operation refers to an operation of the user to take the reader/writer 51 and the RFID device 52C to be close to each other to be in a range where they can perform near-field communication. It is also possible that, in the series of steps S551 to S505, the user checking the third information inputs, into the reader/writer 51, instructions for the host 53 after step S561.

Therefore, in order to notify the user of that the communication is currently performed, the alarm unit 516, 525, or 534 may raise alarm sound in a period from step S551 to S505. It is also possible to display a progress degree of the communication, for example, by blinking a light-emitting diode (LED) in the alarm unit. Thereby, the usability can be more effectively increased.

Moreover, the first information may be included in the notification signal at step S508 (not shown). In this case, it is possible to perform the communication between the RFID device 52C and the host 53C so that the step S502 is included in the step S08.

Embodiment 3

In each of the RFID-embedded apparatuses 100B and 100C according to the above-described variations, the first information is written from the reader/writer 51 into the RFID device, and then transmitted to the host connected with the RFID device, thereby controlling the host.

Here, there is a problem that the host cannot be controlled depending on the state of the host even thought the first information is obtained from the RFID device.

For example, if a power plug of the host is not inserted into an electrical outlet, or if the host is not powered ON, the host is not capable of starting its operation. It is also considered that the host currently performs some operation or is reserved for other operation. In these case, it is also inappropriate to control the host, ignoring the current operation or the operation reservation. As described above, the situation where the host cannot immediately perform operation even though the host obtains the first information.

The following describes an embodiment of the present invention in consideration of the above situation.

Figure 33:
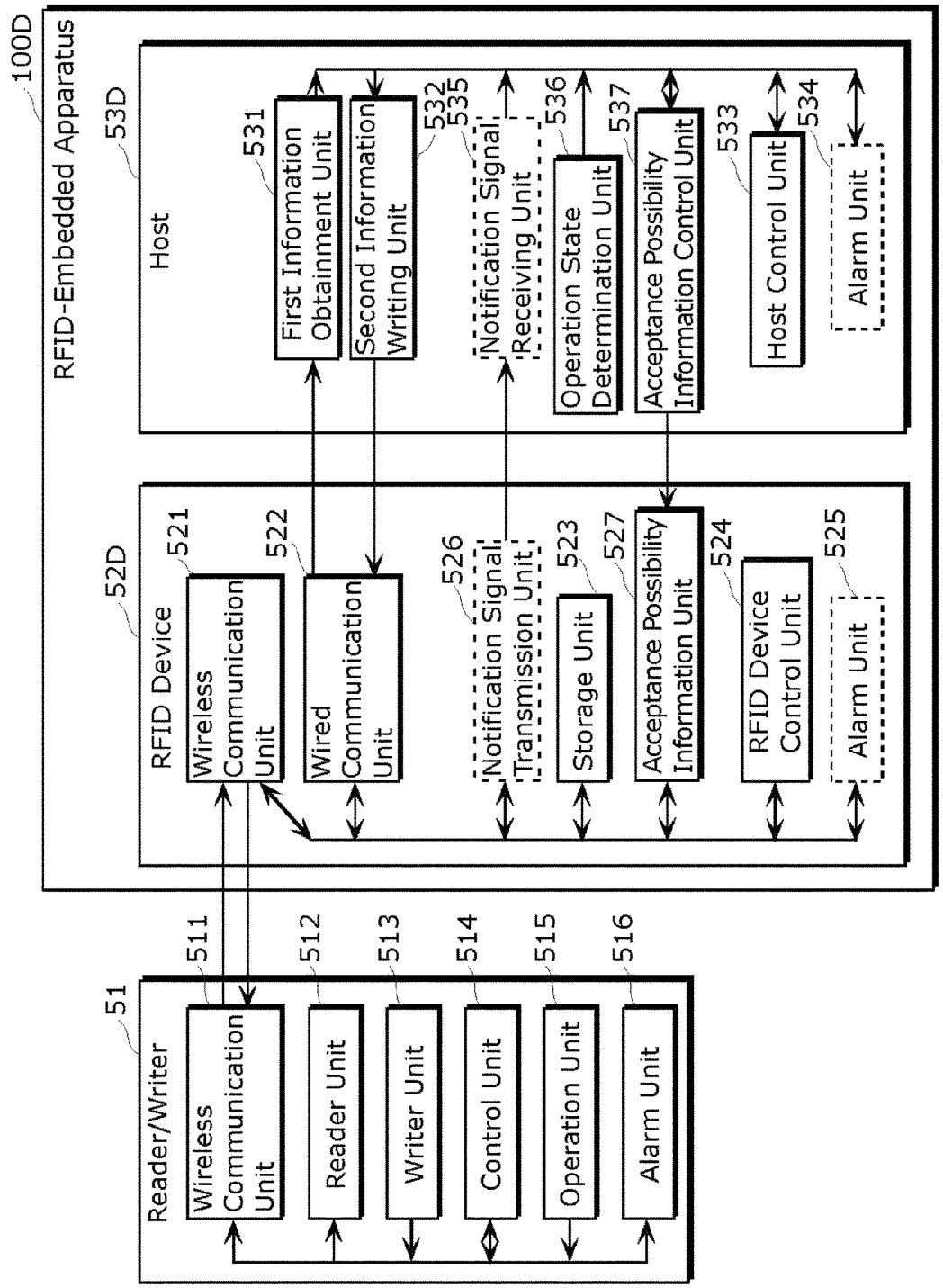
FIG. 33 is a block diagram showing a configuration of a wireless communication system according to Embodiment 3.

FIG. 33 is a diagram showing an overall configuration of a wireless communication system including an RFID-embedded apparatus 100D according to Embodiment 3 of the present invention.

The same elements as those shown in FIGS. 28 and 30 according to the variations are not described again.

In FIG. 33, an RFID device 52D includes an acceptance possibility information unit 527. A host 53D includes an operation state determination unit 536 and an acceptance possibility information control unit 537.

Here, the wireless communication unit 521 included in the RFID device 52D corresponds to the contactless IF 1 according to Embodiment 1. The wired communication unit 522 corresponds to the contact IF 2 according to Embodiment 1. A set of the storage unit 523 and the acceptance possibility information unit 527 corresponds to the memory 3 according to Embodiment 1. The RFID device control unit 524 corresponds to the command processing unit 4.

The operation state determination unit 536 determines an operation state of the host 53D. Based on the determination result of the operation state determination unit 536, the acceptance possibility information control unit 537 updates control acceptance possibility information that is recorded on the acceptance possibility information unit 527 in the RFID device 52D. Here, the control acceptance possibility information according to the present embodiment corresponds to the flag information according to Embodiment 2.

More specifically, the operation state determination unit 536 determines whether or not the host 53D cannot accept a new control instruction even if the host 53D obtains the first information from the RFID device 52D. After that, the acceptance possibility information control unit 537 records the control acceptance possibility information onto the acceptance possibility information unit 527. The control acceptance possibility information is information indicating whether or not the host 53D can accept a new control instruction. For example, if the operation state determination unit 536 determines that the host 53D cannot accept a new control instruction, then NG information is set. The NG information indicates that the host 53D is incapable of accepting a new control instruction. The NG information may be a value such as "impossible", "No", or "0". On the other hand, if the operation state determination unit 536 determines that the host 53D can accept a new control instruction, then the acceptance possibility information control unit 537 clears (cancels) the NG information from the acceptance possibility information unit 527. It is also possible that the acceptance possibility information control unit 537 sets OK information, such as a value of "possible", "OK", or "1", in the acceptance possibility information unit 527.

If the NG information is set in the acceptance possibility information unit 527, a command processing unit included in the RFID device 52D prohibits the reader/writer 51 from accessing (data writing, for example) the storage unit 523 included in the RFID device 52D. The command processing unit included in the RFID device 52D may notify the reader/writer 51 of that the NG information is set in the acceptance possibility information.

A flow of the processing performed by the RFID-embedded apparatus 100D according to the present embodiment is described with reference to a flowchart of FIG. 34.

Figure 34:
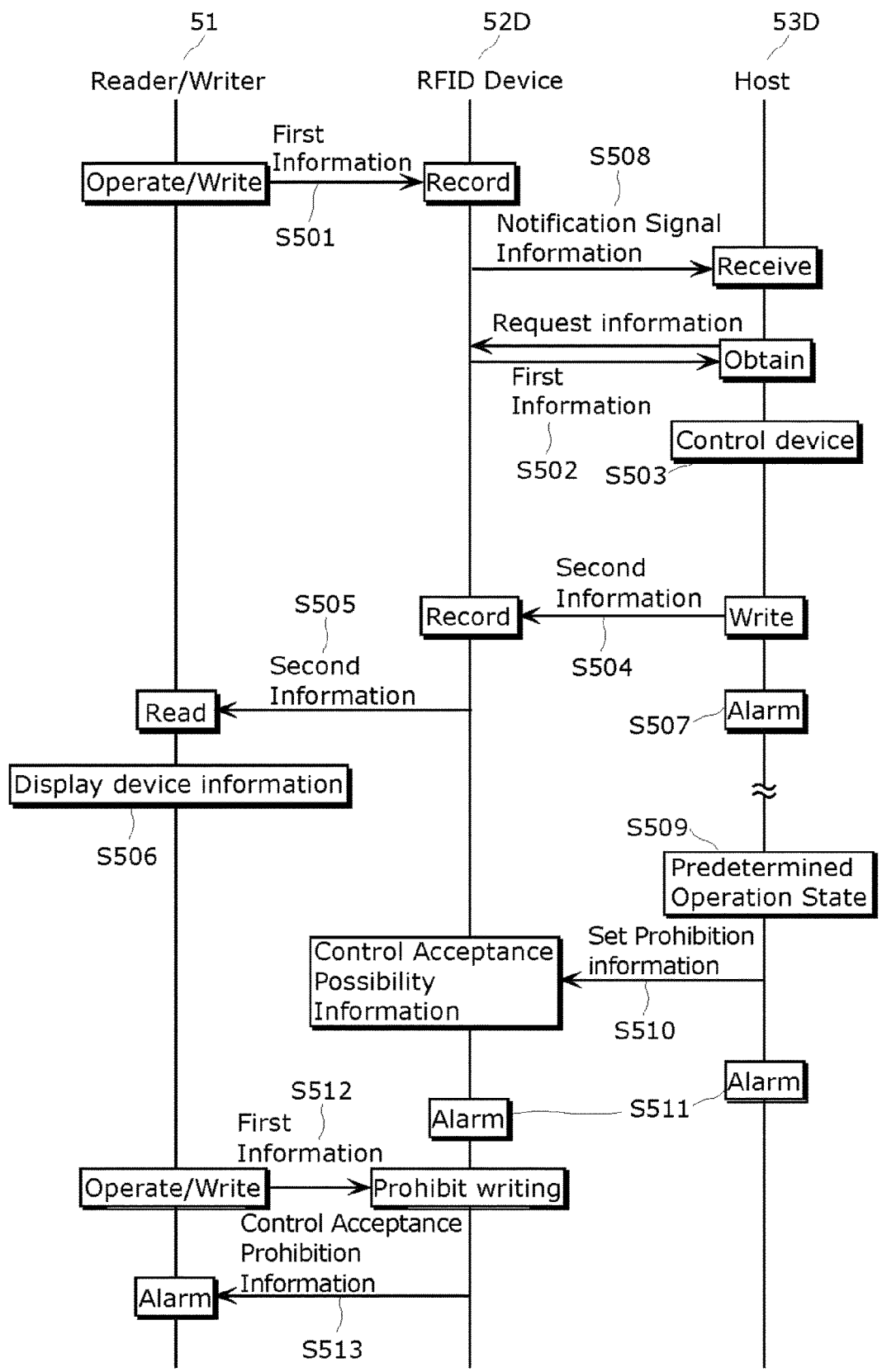
FIG. 34 is a flowchart for explaining processing performed by the wireless communication system according to Embodiment 3.

In FIG. 34, the steps S501 to S508 are the same as those in FIG. 31.

Here, it is assumed that the operation state of the host 53D is chanted after step S507. More specifically, it is assumed at step S509 that the host 53D is at a predetermined operation state where the host 53D cannot accept the first information even though the first information is transmitted from the RFID device 52D to the host 53D. An example of the above situation is that the host 53D that is an electrical rice cooker cannot accept a new control instruction from the reader/writer 51 because rice cooking is reserved in the host 53D. Another example is that the host 53D that is a washing machine cannot accept a new control instruction from the reader/writer 51 because the washing machine is currently operating.

In this case, at step S510, the operation state determination unit 536 examines the operating state of the host 53D. As a result, the operation state determination unit 536 determines that the first information is currently not accepted even if the first information is obtained. After that, the acceptance possibility information control unit 537 sets NG information, as the control acceptance possibility information, to the acceptance possibility information unit 527 in the RFID device 52D.

After that, at step S511, both or one of the alarm unit 525 in the RFID device 52D and the alarm unit 534 in the host 53D notifies the user of that the NG information is set.

For example, the alarm unit 516 in the reader/writer 51 alarms the user by sound or a character sequence indicating "Currently, communication with the host is impossible".

It is also possible that the acceptance possibility information control unit 537 divides the NG information to be set to the acceptance possibility information unit 527 of the RFID device 52D into the following four kinds.

NG information (A): information indicating that a power plug of the host 53D is not inserted into an electrical outlet NG information (B): information indicating that the host 53D is not powered ON.

NG information (C): information indicating that the host 53D is currently performing a different operation and a different user sets the different operation.

NG information (D): information indicating that the host 53D is reserved for a different operation.

The RFID device 52D is capable of causing the control acceptance possibility information unit 527 to cause the alarm unit 516 in the reader/writer 51 to notifies information including information indicating which of the above-described pieces of NG information (A) to (D) is set.

When, for example, the NG information (A) is set, the alarm unit 516 can present the user with a message "Please insert the power plug into the electrical outlet".

It should be noted that, by notifying the NG information (A) or (B), the reader/writer 51 utilizes merits of contactless communication, even if the RFID device 52D does not have a power source, such as a buttery, and does not receive any power supply.

As described above, the present embodiment may be completed by notifying that the NG information is set. However, the subsequent processing is described.

Meanwhile, at step S512, communication between the wireless communication unit 511 in the reader/writer 51 and the wireless communication unit 521 in the RFID device 52D is possible. The user of the reader/writer 51 operates the operation unit 515 to cause the writer unit 513 in the reader/writer 51 to write the first information to be stored into the storage unit 523 in the RFID device 52D. However, when the NG information is set in the acceptance possibility information unit 527, it is prohibited to write data.

Then, at step S513, the NG information is transmitted from the acceptance possibility information unit 527 in the RFID device 52D to the reader/writer 51 via the wireless communication units 521 and 511. The alarm unit 516 notifies the user of the above fact. Thereby, the user of the reader/writer 51 is notified of that it is impossible to control the host 53D.

Not shown in FIG. 34, the following is the processing performed by the operation state determination unit 536 to release the predetermined operation state where the host 53D cannot accept a control instruction included in the first information.

If the operation state determination unit 536 determines that the host 53D can accept the control instruction included in the first information, then the acceptance possibility information control unit 537 clears the NG information from the acceptance possibility information unit 527 in the RFID device 52D. Thereby, the host 53D is now at the state where the host 53D can accept the first information.

It should be noted that the notification signal information is not essential in the RFID-embedded apparatus 100D according to the present embodiment. Therefore, in FIG. 33, the notification signal transmission unit 526 and the notification signal receiving unit 535 may be eliminated. Furthermore, in FIG. 34, the step S508 of the notification signal information may be eliminated. Likewise, the RFID-embedded apparatus 100D may not include the alarm unit 525 and the alarm unit 534. Furthermore, the host 53D may not include the host control unit 533. For example, the RFID-embedded apparatus 100D may include the host control unit 533 outsides the host 53D. It is also possible to provide the alarm unit 525 and the alarm unit 534 outsides the RFID device 100D.

As described above, in the present embodiment, by using the control acceptance possibility information, it is possible to notify the user of that the host 53D cannot accept the first information even thought the first information is transmitted. In addition, when the host 53D cannot accept the first information even thought the first information is transmitted, it is possible to prohibit writing to the RFID device 52D.

An example of the situation where the host 53D cannot accept a control instruction included in the first information is that power is not supplied to the host 53D. Other examples are that the host 53D is currently operated by the user and that the host 53D is performing an operation or is reserved for an operation, so that, even if the host 53D obtains the instruction included in the first information, the host 53D cannot switch to an operation indicated in the obtained instruction A still another example is that the host 53D is in an error state so that the host 53D cannot operate.

For example, it is assumed that a lid is provided to the host that is an electrical apparatus such as a microwave, a rice cooker, a refrigerator, or a washing machine. Under the assumption, when the lid is open, it is considered that a user is taking cooked item, rice, food, or clothes in or from the host. Therefore, this state would be one of the states (state where the user is operating the host) where the host cannot accept the first information even if the host receives the first information.

Furthermore, it is assumed that the host has not only a normal mode but also a low power consumption mode to reduce power consumption of the electrical apparatus. In the low power consumption mode, for example, the power supply to the first information obtainment unit 531 and the second information writing unit 532 included in the host 53D is stopped.

In the low power consumption mode, the host 53D cannot obtain the first information even if the notification signal information is provided from the RFID device 52D.

Even if the host having such a low power consumption mode is included, the configuration of the wireless communication system according the present embodiment can be applied.

More specifically, the operation state determination unit 536 in FIG. 33 determines whether or not the host 53D is in the low power consumption mode. After that, if the operation state determination unit 536 determines that the host 53D is in the low power consumption mode, then the acceptance possibility information control unit 537 sets NG information in the acceptance possibility information unit 527 of the RFID device 52D.

An example of the above processing is described with reference to a flowchart of FIG. 35.

Figure 35:
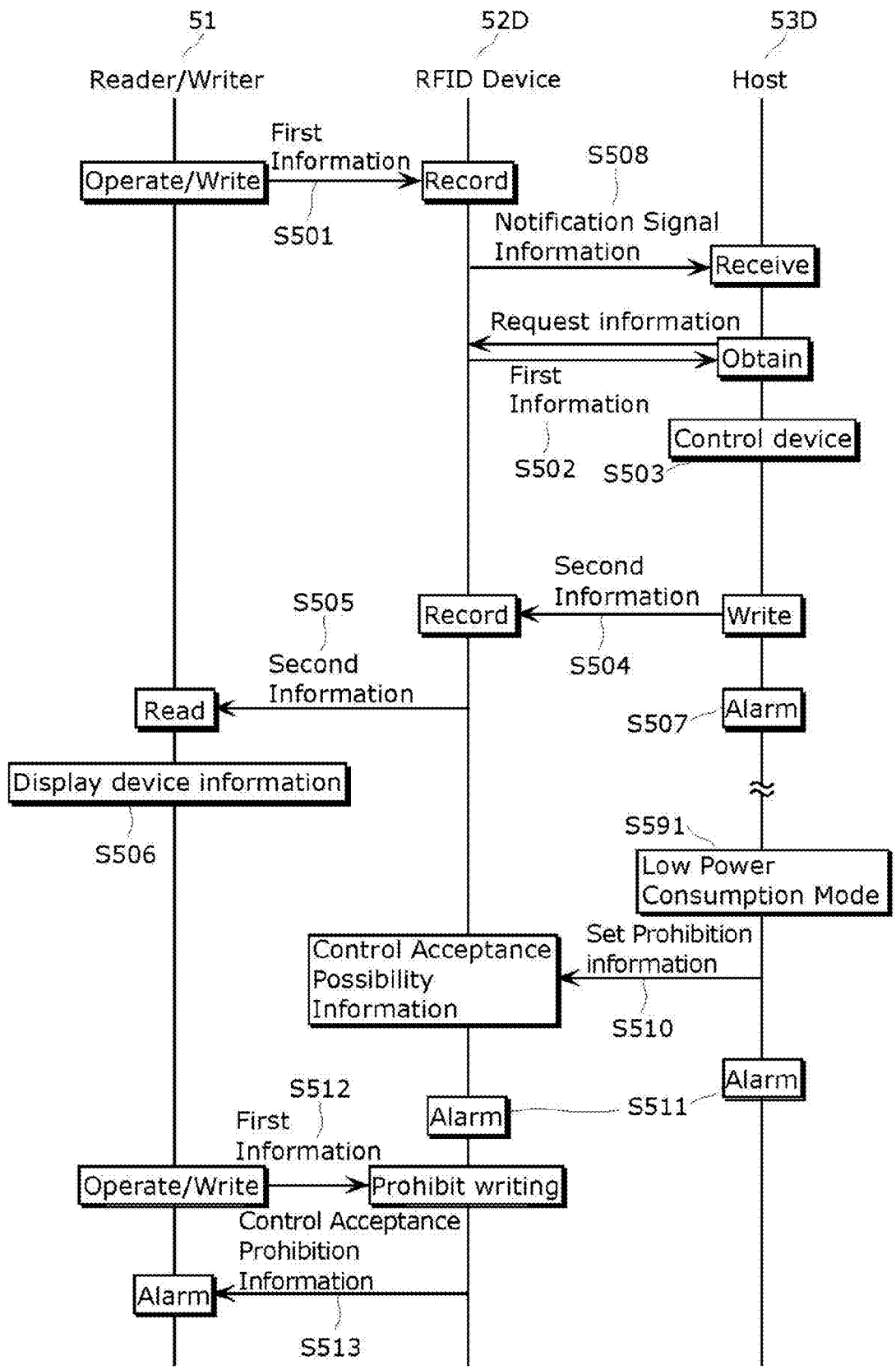
FIG. 35 is a flowchart for explaining another processing performed by the wireless communication system according to Embodiment 3.

FIG. 35 differs from FIG. 34 in that the predetermined operation state at step S509 in FIG. 34 is replaced by step S591 for changing the operation mode to the low power consumption mode.

Then, at step S510, the operation state determination unit 536 examines the operating state of the host 53D. If it is determined that the host 53D is in the low power consumption mode, then the acceptance possibility information control unit 537 sets NG information in the acceptance possibility information unit 527 of the RFID device 52D. The subsequent steps S511 to S513 are the same as those in FIG. 34.

More specifically, the host 53D according to the present embodiment is a host that performs contactless communication with the reader/writer 51 via the RFID device 52D connected by wire to the host 53D. The host 53D includes: the communication interface (the first information obtainment unit 531, the second information writing unit 532, and the notification signal receiving unit 535) for performing wired communication with the RFID device 52D; the operation state determination unit 536 that determines whether the operation mode of the host 53D is the normal mode or the low power consumption mode for reducing power consumption during operation to be lower than that in the normal mode; and the acceptance possibility information control unit 537 that sets, in the memory (the acceptance possibility information unit 527) included in the RFID device 52D, information indicating that data access to the host is prohibited, when the operation state determination unit 536 determines that the operation mode is the low power consumption mode.

After that, if the operation state determination unit 536 determines that the host 53D is changed to a mode rather than the low power consumption mode, then the acceptance possibility information control unit 537 clears the NG information from the acceptance possibility information unit 527 of the RFID device 52D.

In FIG. 31, it is not until the step S502 or S503 that it is determined that the host 53C cannot accept the first information even if the host 53C obtains the first information. In FIG. 34, on the other hand, when the reader/writer 51 writes the first information into the RFID device 52D (step S512), it is determined that the host 53C cannot accept the first information even if the host 53D obtains the first information. Therefore, the determination result can be immediately notified to the user of the reader/writer 51.

It should be noted that the host 53D may stop power supply to the RFID device 52D in the low power consumption mode. In this case, in the low power consumption mode, the RFID device 52D and the host 53D cannot perform wired communication. A flow of the communication processing between the RFID device 52D and the host 53D in the above situation is described with reference to FIG. 36.

Figure 36:
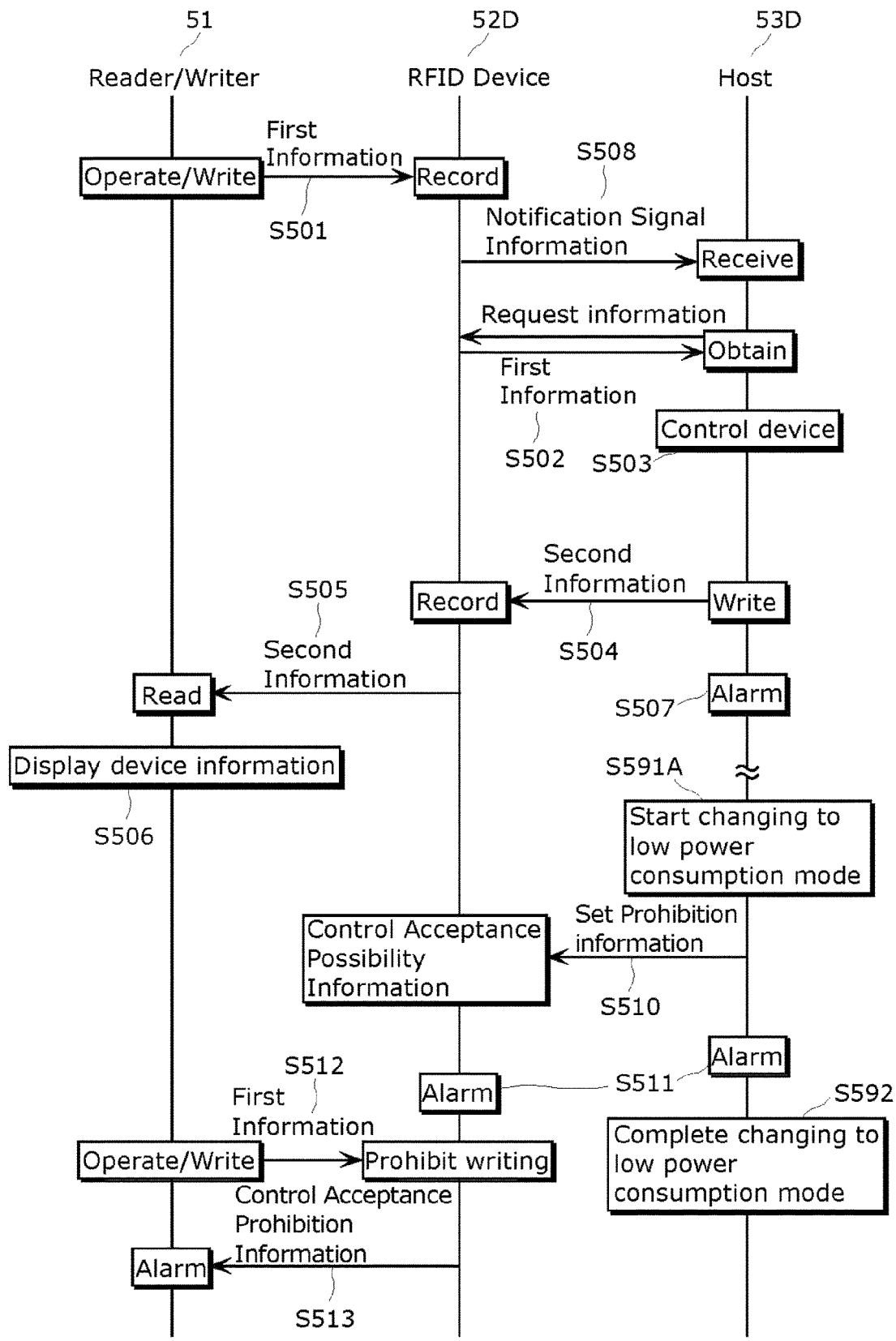
FIG. 36 is a flowchart for explaining still another processing performed by the wireless communication system according to Embodiment 3.

FIG. 36 is another example of the processing performed by the wireless communication system according to the present embodiment.

At step S591A, the host 53D starts being changed to the low power consumption mode. After that, before the host 53D has been completely changed to the low power consumption mode (S592), the host 53D transmits NG information as the control acceptance possibility information to the RFID device 52D (S510).

It should be noted that it has been described in the variations of the present invention that the first information may include the control signal (set signal) for controlling the host or the state obtainment signal (get signal) for obtaining the latest state of the host. More specifically, it has been described that the reader/writer 51 can select one of various kinds of pieces of the first information including the control signal and the state obtainment information, depending on an operation of the user.

Therefore, the acceptance possibility information unit 527 may independently record the control acceptance possibility information for the first information that is the control signal for controlling the host 53D, and the control acceptance possibility information for the first information that is the state obtainment signal for obtaining the latest state of the host 53D. In this case, the acceptance possibility information control unit 537 in the host 53D independently sets the control acceptance possibility information for the control signal and the control acceptance possibility information for the state obtainment signal. Therefore, the host 53D can, for example, reject the control signal but accept the state obtainment signal. This means that the reader/writer 51 is prohibited from writing into and permitted to read from the RFID device 52D. In reverse, it is also possible that the control signal is accepted and the state obtainment signal is rejected. This means that the reader/writer 51 is permitted to write into and prohibited from reading from the RFID device 52D. Of course, it is possible to prohibit both writing and reading, or permit both writing and reading.

For example, if the control signal is rejected and the state obtainment signal is acceptable, the following processing is possible. When the host 53D that is an electrical apparatus is currently operated by the user, is performing an operation, or is reserved for an operation, the operation state is included in the second information and transmitted. Therefore, the reader/writer 51 can display the state of the host 53D for the user. Furthermore, when the host 53D is in an error state and cannot be operated, the error information is included in the second information and transmitted. As a result, the reader/writer 51 can display details or solution of the error.

More specifically, when the flag information (control acceptance possibility information) prohibits at least one of data writing to the host 53D and data reading from the host 53D from among data accesses to the host 53D, the command processing unit included in the RFID device 52D according to the present embodiment prohibits the data access that is prohibited in the flag information from among the data accesses from the reader/writer 51 to the host 53D.

Therefore, the host 53D can designate permission and prohibition independently for reading and writing from among data accesses from the outside. As a result, depending on the operation state of the host 53D, it is possible to perform more detailed control on accesses to the host 53D.

Embodiment 4

In Embodiment 4 of the present invention, when the host receives notification signal information from the RFID device in the low power consumption mode, the host is changed from the low power consumption mode to the normal mode. As a result, the host can obtain the first information. The following describes the present embodiment in more detail.

Figure 37:
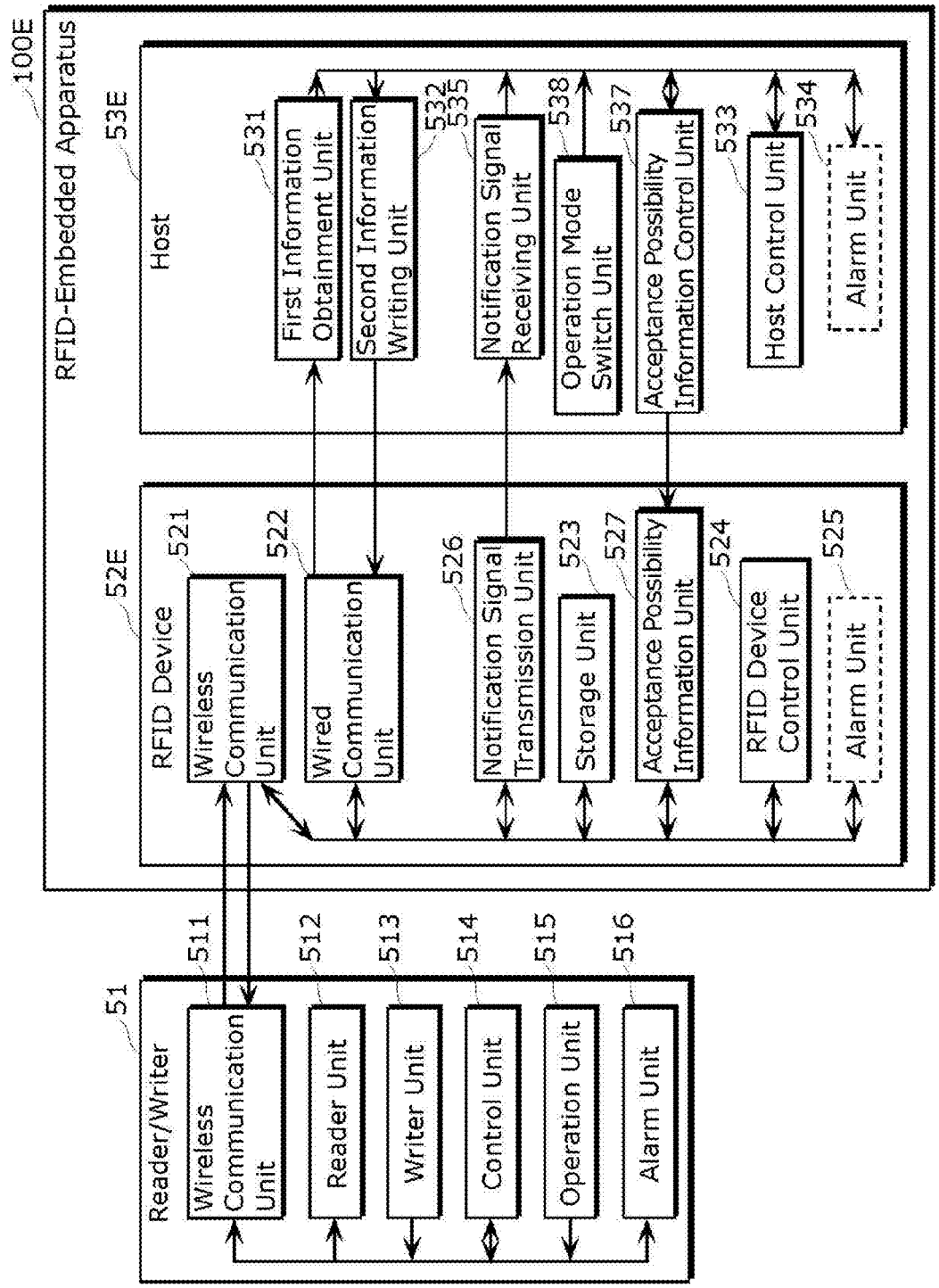
FIG. 37 is a block diagram showing a configuration of a wireless communication system according to Embodiment 4.

FIG. 37 is a diagram showing an overall configuration of a wireless communication system including an RFID-embedded apparatus 100E according to Embodiment 4 of the present invention. The same elements as those in FIG. 33 are not described in detail again.

When the notification signal receiving unit 535 receives a notification signal from an RFID device 52E, an operation mode switch unit 538 switches the low power consumption mode to the normal mode.

Figure 38:
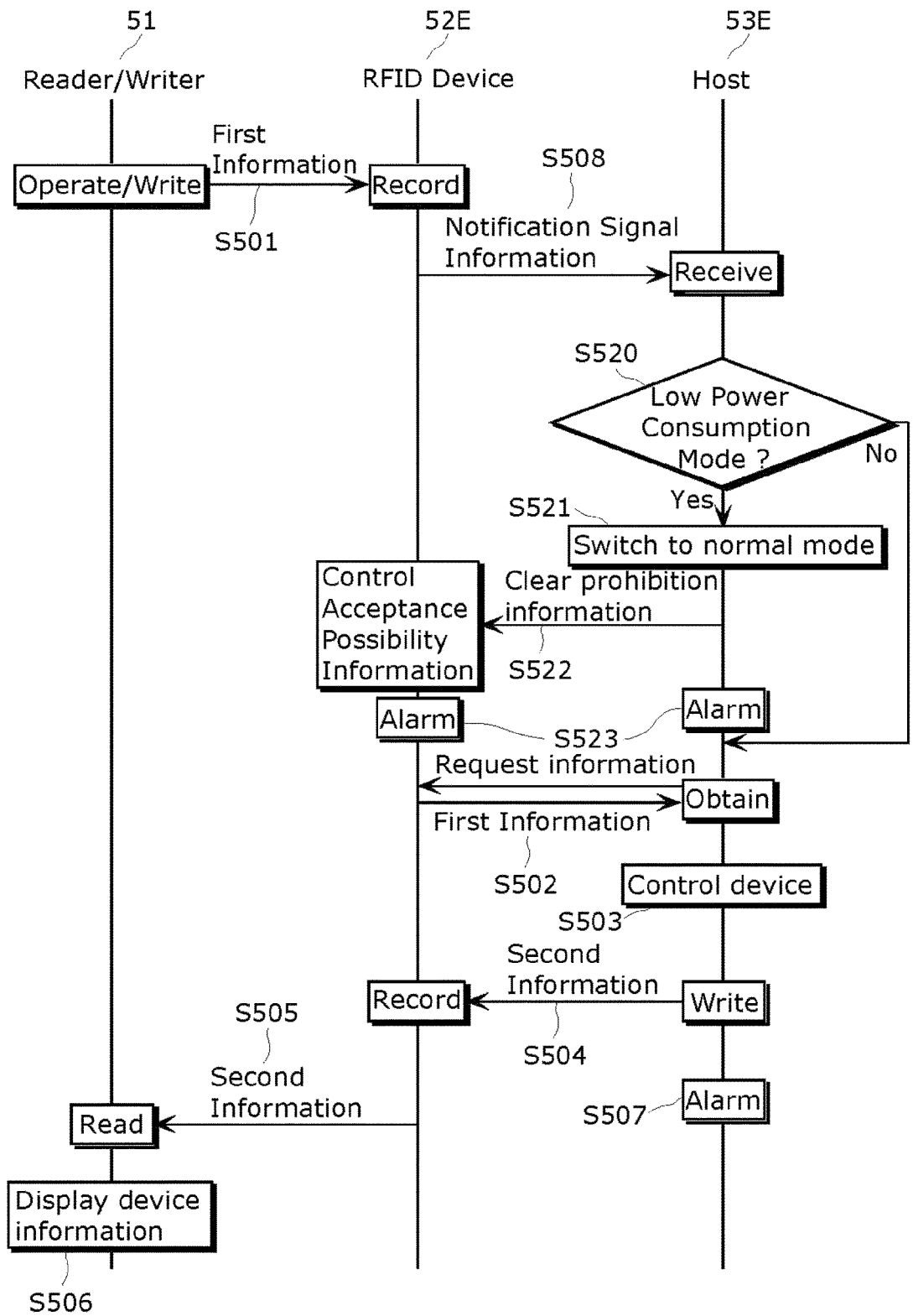
FIG. 38 is a flowchart for explaining processing performed by the wireless communication system according to Embodiment 4.

A flow of the processing performed by the RFID-embedded apparatus 100E is described with reference to a flowchart of FIG. 38.

The steps S501 and S508 are same as those in the other embodiments.

At step S508, the host 53E receives the notification signal information. After that, at step S520, the operation mode switch unit 538 determines whether or not the current operation mode is the low power consumption mode. If the current operation mode is the low power consumption mode (Yes at S520), then at step S521, the operation mode is switched to the normal mode. Here, although not shown in FIG. 37, the host 53E may further include the operation state determination unit 536, without having the structure where the operation mode switch unit 538 examines the operation mode. With the above structure, the operation mode switch unit 538 can switch the operation mode based on the determination result of the operation state determination unit 536.

After switching to the normal mode, at step S522, the acceptance possibility information control unit 537 clears the NG information from the acceptance possibility information unit 527 of the RFID device 52.

After that, at step S523, both or one of the alarm unit 525 in the RFID device 52 and the alarm unit 534 in the host 53 notifies that the NG information is cleared.

On the other hand, if it is determined that the current operation mode is the normal mode (No at S520), then the operation mode switch unit 538 performs the processing from the step S502.

Subsequently, the steps S502 to S507 are the same as the steps S502 to S507 in FIG. 29.

As described above, according to the present embodiment, when the host 53E that is an electrical apparatus receives a notification signal from the RFID device 52E while the host 53E is changed to the low power consumption mode to reduce power consumption, the host 53E can switch the low power consumption mode to the normal mode. Therefore, when the first information is written from the reader/writer 51 to the RFID device 52E, the host 53E can immediately performs processing according to the first information.

More specifically, the host 53E according to the present embodiment includes the operation mode switch unit 538 that switches the low power consumption mode to the operation mode to the normal mode, when a notification signal indicating that the reader/writer 51 writes information into the RFID device 52E is received form the RFID device 52E during operating at the low power consumption mode. When the operation mode of the host 53E is changed to the normal mode, the acceptance possibility information control unit 537 sets information indicating that data access to the host 53E is permitted, into the memory (the acceptance possibility information unit 527) included in the RFID device 52E. It is also possible that the acceptance possibility information control unit 537 deletes information indicating that data access to the host 53E is prohibited, from the memory (the acceptance possibility information unit 527) included in the RFID device 52E.

The operation state of the host 53E may be other mode rather than the low power consumption mode. For example, when the host 53E is powered OFF, the RFID device 52E transmits the notification signal information to change the host 53E to be powered ON to receive the first information.

If the host 53E currently performs some operation or is reserved for other operation, it is possible that the RFID device 52E transmits the notification signal information to the host 53E to cause the host 53E to stop the operation to enable the host 53E to receive the first information.

It should be noted that embodiments 3 and 4 may be combined. More specifically, the host may include: (1) the communication interface for performing wired communication with the RFID device; (2) the operation state determination unit that determines whether the operation mode indicating the internal state during operation of the host is the normal mode or the low power consumption mode at which power consumption during operation is reduced to be lower than that of the normal mode; (3) the acceptance possibility information control unit that sets information indicating that data access to the host is prohibited, into the memory of the RFID device, when the operation state determination unit determines that the operation mode of the host is the low power consumption mode; and (4) the operation mode switch unit that switches low power consumption to the normal mode when a notification signal indicating that information is written from the reader/writer to the RFID device is received from the RFID device during operation at the low power consumption mode.

In this case, the acceptance possibility information control unit may set the information indicating that data access to the host is permitted, into the memory included in the RFID device, when the operation mode of the host is changed to the normal mode. It is also possible that the information indicating that data access to the host is prohibited is deleted from the memory included in the RFID device.

More specifically, it is considered that there are two kinds of pieces of the first information provided from the reader/writer 51. One of them is the first information used to transmit the notification signal information from the RFID device to the host, as described at step S508 in FIG. 38. The other one is the first information assuming that data writing to the RFID device is prohibited when NG information is set in the acceptance possibility information unit 527, as described at step S512 in FIG. 35.

It is possible to selectively use the two kinds of pieces of first information, and to therefore cause the user of the reader/writer 51 to determine whether or not to invoke the operation mode switch unit 538 of the host.

In Embodiments 3 and 4, the host receives the notification signal information from the RFID device, and then transmits the information request to obtain the first information. However, the RFID device may include a part of the first information into the notification signal information and transmit the resulting notification signal information. It is therefore possible to reduce a communication amount of the information request.

It is also possible that the host determines, based on the indication of the first information, whether or not to include a part of the first information into the notification signal information that is received from the RFID device and then transmit the resulting notification signal information. For example, it is possible that a request for real-time information rerated to host control or indicating an error state is transmitted in the latter manner, while non-real-time information is transmitted in the former manner.

It should also be noted that the host according to Embodiments 1 to 4 may be any electrical apparatus connected to or having the RFID device (electronic tag), such as a home appliance used at home or an electrical device used in office, factory, or institution.

The reader/writer may be a mobile phone or information device having a Near Field Communication (NFC) function.

It should be noted that the processing units included in the RFID device, the host, and the reader/writer according to Embodiments 1 to 4 are implemented into a Large Scale Integration (LSI) which is typically an integrated circuit. These may be integrated separately, or a part or all of them may be integrated into a single chip.

Here, the integrated circuit is referred to as a LSI, but the integrated circuit can be called an IC, a system LSI, a super LSI or an ultra LSI depending on their degrees of integration.

It should also be noted that the technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the functional blocks as an integrated circuit.

It should be noted that all or part of the functions of the RFID device, the host, and the reader/writer according to Embodiments 1 to 4 may be implemented by executing a program by a processor such as a CPU.

More specifically, the program causes a computer to execute the method of controlling the RFID device. The method includes: obtaining a command from the reader/writer via the contactless interface; determining a mode; executing data access between the reader/writer and the memory as instructed in the command if the communication mode is determined as the first communication mode, and executing data access between the reader/writer and the host as instructed in the command if the communication mode is determined as the second communication mode.

Furthermore, the present invention may be the above-described program, or a recording medium on which the program is recorded. Of course, the program may be distributed via a transmission medium such as the Internet.

It is also possible to combine at least part of the functions of the RFID device, the host, the reader/writer, and their variations according to the above-described Embodiments 1 to 4.

Those skilled in the art will be readily appreciate that various modifications are possible in the exemplary embodiments without materially departing from the novel teachings and advantages of the present invention.

All of the numeric values used in the above description are merely examples for describing the present invention more specifically. The present invention is not limited to these numeric values. Furthermore, the logical level indicated as high/low and the switching state indicated as ON/OFF are also merely examples for describing the present invention more specifically. Different combinations of the logical levels or the switching levels can produce the same results as described above.

The connection relationships between the structural elements are also merely examples for describing the present invention more specifically. Other connection relationships are possible to implement the functions of the present invention.

INDUSTRIAL APPLICABILITY

The present invention relates to an RFID device or the like which includes a contactless interface and a contact interface.

REFERENCE SIGNS LIST

1 contactless IF (contactless interface)
2 contact IF (contact interface)
3, 3A memory
4, 4A command processing unit
10, 10A, 32, 52, 52C, 52D, 52E RFID device
11, 51, 200, 200A reader/writer
12, 100, 100A, 100B, 100C, 100D, 100E RFID-embedded apparatus
20, 20A, 34, 53, 53C, 53D, 53E host (host CPU)
21, 31 RF antenna
33 storage unit 41 CLK line
42 DATA line
43 SEL line
44 IRQ line
222 display unit
224 control unit
226 communication unit
300, 300A RFID system
350 image of refrigerator
352 progress bar
511, 521 wireless communication unit
512 reader unit
513 writer unit
514 control unit
515 operation unit
516, 525, 534 alarm unit
522 wired communication unit
523 storage unit
524 RFID device control unit
526 notification signal transmission unit
527 acceptance possibility information unit
531 first information obtainment unit
532 second information writing unit
533 host control unit
535 notification signal receiving unit
536 operation state determination unit
537 acceptance possibility information control unit
538 operation mode switch unit
ANT1, ANT2 antenna

The invention claimed is:

1. A radio frequency identification (RFID) device comprising:
 a contact interface for wired communication with a host outside the RFID device;
 a contactless interface for contactless communication with a reader/writer outside the RFID device;
 a command processing unit configured to obtain a command from the reader/writer via the contactless interface and process the command, the command instructing a data exchange; and
 a memory that holds data,
 wherein the command processing unit is configured to selectively switch the data exchange between a first data exchange and a second data exchange, based on address information that is included in the obtained command and that designates a destination of the data exchange,
 in the first data exchange, data communication is performed between the reader/writer and the memory by connecting the RFID device to the reader/writer via the contactless interface, and
 in the second data exchange, data communication is performed between the reader/writer and the host via the RFID device by (i) connecting the RFID device to the reader/writer via the contactless interface and connecting the RFID device to the host via the contact interface, (ii) receiving data by the RFID device from one of the reader/writer and the host, and (iii) transferring the received data to the other one of the reader/writer and the host.

2. The RFID device according to claim 1,
 wherein the command processing unit is configured, when the command processing unit obtains, from the host, the command instructing to read data, to read the data from a region in the memory used in the first data exchange between the reader/writer and the memory.

3. The RFID device according to claim 1,
 wherein the command processing unit is configured, when the command processing unit obtains, from the host, the command instructing to write data, to write the data into a predetermined region in the memory.

4. The RFID device according to claim 1,
 wherein the memory further holds flag information indicating whether the second data exchange between the reader/writer and the host is permitted or prohibited, and
 the command processing unit is configured to transmit the flag information to the reader/writer, and after the transmission, perform the second data exchange between the reader/writer and the host.

5. The RFID device according to claim 4,
 wherein the flag information is updated by the host based on an operation state of the host.

6. The RFID device according to claim 5,
 wherein the command processing unit is configured to prohibit the second data exchange between the reader/writer and the host, when the flag information indicates that a data exchange from the outside to the host is prohibited.

7. The RFID device according to claim 5,
 wherein, when the flag information indicates that at least one of a data exchange for writing data into the host and a data exchange for reading data from the host is prohibited from among data exchanges to the host, the command processing unit is configured to prohibit the data exchange prohibited in the flag information from among the data exchange for writing data into the host and the data exchange for reading data from the host.

8. The RFID device according to claim 1,
 wherein the address information includes destination information indicating whether or not to use encryption in a data exchange between the reader/writer and the RFID device, and
 the command processing unit is configured to encrypt data to be transmitted in the contactless communication between the reader/writer and the RFID device and decode received data, when the command processing unit obtains, from the reader/writer, a command including the destination information indicating that encryption is to be used in the data exchange between the reader/writer and the RFID device.

9. An RFID-embedded apparatus comprising:
 a host unit; and
 an RFID unit,
 wherein the RFID unit includes:
  a contact interface for wired communication between the RFID unit and the host unit;
  a contactless interface for contactless communication between the RFID unit and a reader/writer outside the RFID-embedded apparatus;
  a command processing unit configured to obtain a command from the reader/writer via the contactless interface and process the command, the command instructing a data exchange; and
  a memory that holds data,
 wherein the command processing unit is configured to selectively switch the data exchange between a first data exchange and a second data exchange, based on address information that is included in the obtained command and that designates a destination of the data exchange,
 in the first data exchange, data communication is performed between the reader/writer and the memory by connecting the RFID unit to the reader/writer via the contactless interface, and in the second data exchange, data communication is performed between the reader/writer and the host via the RFID device by (i) connecting the RFID unit to the reader/writer via the contactless interface and connecting the RFID unit to the host via the contact interface, (ii) receiving data by the RFID device from one of the reader/writer and the host, and (iii) transferring the received data to the other one of the reader/writer and the host.

10. The RFID-embedded apparatus according to claim 9, wherein the command processing unit is configured, when the address information designating the destination indicates that the second data exchange between the reader/writer and the host is to be selected, to notify the host unit via the contact interface that the second data exchange is to be performed, and the host unit is configured to supply driving power to the RFID unit, when the host unit obtains the notification.

11. The RFID-embedded apparatus according to claim 9, wherein the contactless interface (a) obtains first driving power from the reader/writer by electromagnetic induction, (b) detects existence of an electromagnetical field stronger than a predetermined threshold, and when the existence is detected, notifies a result of the detection to the host unit via the contact interface, and the host unit is configured to supply second driving power different from the first driving power to the RFID unit, when the host unit obtains the notification.

12. A method of controlling an RFID device, the RFID device including: a contact interface for wired communication with a host outside the RFID device; a contactless interface for contactless communication with a reader/writer outside the RFID device; and a memory that holds data, and the method comprising:

obtaining a command from the reader/writer via the contactless interface, the command instructing a data exchange; and selectively switching the data exchange between a first data exchange and a second data exchange, based on address information that is included in the command obtained in the obtaining and that designates a destination of the data exchange, thereby performing the selected data exchange, wherein in the first data exchange, data communication is performed between the reader/writer and the memory by connecting the RFID device to the reader/writer via the contactless interface, and in the second data exchange, data communication is performed between the reader/writer and the host via the RFID device by (i) connecting the RFID device to the reader/writer via the contactless interface and connecting the RFID device to the host via the contact interface, (ii) receiving date by the RFID device from one of the reader/writer and the host, and (iii) transferring the received date to the other one of the reader/writer and the host.

* * * * *